US011176773B2

(12) United States Patent
Crispino et al.

(10) Patent No.: US 11,176,773 B2
(45) Date of Patent: Nov. 16, 2021

(54) GAMING DEVICE WITH A USER INTERFACE INCORPORATING A FEATURE INDICATOR

(71) Applicant: Aristocrat Technologies Australia Pty Limited, North Ryde (AU)

(72) Inventors: Oliver Crispino, Rosemeadow (AU); Natalie Bryant, Cherrybrook (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 91 days.

(21) Appl. No.: 16/589,881

(22) Filed: Oct. 1, 2019

(65) Prior Publication Data

US 2020/0111298 A1 Apr. 9, 2020

(30) Foreign Application Priority Data

Oct. 5, 2018 (AU) ................................ 2018241188

(51) Int. Cl.
*G06F 17/00* (2019.01)
*G07F 17/32* (2006.01)
*G07F 17/34* (2006.01)

(52) U.S. Cl.
CPC ...... *G07F 17/3213* (2013.01); *G07F 17/3267* (2013.01); *G07F 17/34* (2013.01)

(58) Field of Classification Search
None
See application file for complete search history.

(56) References Cited

U.S. PATENT DOCUMENTS

| | | | | |
|---|---|---|---|---|
| 7,803,045 B2 | 9/2010 | Wadleigh | | |
| 8,444,467 B2 | 5/2013 | Englman | | |
| 8,672,752 B2 | 3/2014 | Gagner | | |
| 9,082,264 B2 * | 7/2015 | Fujisawa | ............. | G07F 17/3267 |
| 2002/0183105 A1 * | 12/2002 | Cannon | ............... | G07F 17/3267 463/16 |
| 2004/0043815 A1 * | 3/2004 | Kaminkow | ............. | G07F 17/34 463/25 |
| 2008/0032784 A1 * | 2/2008 | Englman | ................. | G07F 17/34 463/21 |
| 2008/0108411 A1 * | 5/2008 | Jensen | .................... | G07F 17/32 463/20 |
| 2008/0167115 A1 * | 7/2008 | Singer | ...................... | G07F 17/32 463/20 |

(Continued)

*Primary Examiner* — Paul A D'Agostino
(74) *Attorney, Agent, or Firm* — Weaver Austin Villeneuve & Sampson LLP

(57) ABSTRACT

A gaming device is provided that includes a plurality of game windows, each game window having an identical array of symbol positions displayed therein. Symbols are selected for each column of symbol positions, and the columns are then each evaluated to determine if the selected symbols for a column meet a predetermined criterion, e.g., all symbols for the column being the same. If the selected symbols for a column meet the criterion, and the selected symbols of the corresponding column in the other display window do not, the corresponding column may be caused to change its selected symbols to match those in the column that has the selected symbols that meet the criterion. If all of the columns have selected symbols that meet the criterion after such evaluations and potential selected symbol changes are performed, then an award may be provided.

21 Claims, 34 Drawing Sheets

(56) References Cited

U.S. PATENT DOCUMENTS

| | | | | |
|---|---|---|---|---|
| 2009/0197659 | A1* | 8/2009 | Christensen | G07F 17/3276 463/16 |
| 2009/0227351 | A1* | 9/2009 | Yoshizawa | G07F 17/3244 463/20 |
| 2009/0233691 | A1* | 9/2009 | Yoshizawa | G07F 17/3267 463/20 |
| 2009/0298570 | A1* | 12/2009 | Tsukahara | G07F 17/3286 463/20 |
| 2010/0197385 | A1* | 8/2010 | Aoki | G07F 17/3262 463/27 |
| 2011/0105218 | A1* | 5/2011 | Anderson | G07F 17/32 463/20 |
| 2012/0122547 | A1 | 5/2012 | Aoki | |
| 2013/0331173 | A1* | 12/2013 | Jaffe | G07F 17/3288 463/21 |
| 2015/0057068 | A1* | 2/2015 | Burghard | G07F 17/34 463/20 |
| 2015/0248810 | A1* | 9/2015 | Wortmann | G07F 17/34 463/20 |
| 2017/0018143 | A1* | 1/2017 | Nakamura | G07F 17/3244 |
| 2017/0213415 | A1* | 7/2017 | Nakamura | G07F 17/34 |

* cited by examiner

300

| | Reel position | Reel 1 (321) | Reel 2 (322) | Reel 3 (323) | Reel 4 (324) | Reel 5 (325) |
|---|---|---|---|---|---|---|
| 301 | 1 | Pic 1 | 10 | Pic 3 | Q | Pic 1 |
| 302 | 2 | Wild | Q | K | A | 10 |
| 303 | 3 | J | K | 10 | 10 | A |
| 304 | 4 | Q | A | Q | Pic 2 | Pic 2 |
| 305 | 5 | 10 | Pic 2 | K | J | A |
| 306 | 6 | A | 9 | Pic 1 | Wild (331) | Q |
| 307 | 7 | Pic 2 | Wild | J | 9 | K |
| 308 | 8 | A | Pic 3 | K | 10 | Pic 2 |
| 309 | 9 | Q | Q | 9 | A | 9 |
| 310 | 10 | K | 10 | Q | Q | Wild |
| 311 | 11 | J (341) | A | 10 | J | 9 |
| 312 | 12 | 10 (342) | Wild | Wild | K | Q |
| 313 | 13 | Pic 3 (343) | K | A | Wild | 10 |
| 314 | 14 | Wild | J | A | Pic 3 | Wild |
| 315 | 15 | 9 | 10 | Wild | Pic 1 | A |

343 342 341

Figure 3

800

| | Reel strip position | Reel 1 | Reel 2 | Reel 3 | Reel 4 | Reel 5 |
|---|---|---|---|---|---|---|
| | | 821 | 822 | 823 | 824 | 825 |
| 801 | 1 | Character 4 | 10 | Character 3 | Q | Character 1 |
| 802 | 2 | Character 1 | Q | K | A | 10 |
| 803 | 3 | Character 1 | K | 10 | 10 | A |
| 804 | 4 | Character 1 | A | Q | Character 2 | Character 2 |
| 805 | 5 | Character 1 | Character 5 | K | Character 4 | A |
| 806 | 6 | Character 1 | Character 2 | Character 1 | Character 4 | Character 4 |
| 807 | 7 | Character 2 | Character 2 | J | Character 4 | Character 4 |
| 808 | 8 | A | Character 2 | Character 5 | 10 | Character 4 |
| 809 | 9 | Q | Q | 9 | A | 9 |
| 810 | 10 | K | 10 | Character 3 | Q | Character 5 |
| 811 | 11 | J | A | Character 3 | J | Character 5 |
| 812 | 12 | Character 3 | Character 2 | Character 3 | Character 4 | Character 5 |
| 813 | 13 | Character 3 | Character 2 | Character 3 | Character 4 | Character 5 |
| 814 | 14 | Wild | J | A | Character 3 | Character 5 |
| 815 | 15 | 9 | 10 | Character 3 | Character 1 | A |

Figure 8

| | | 1120 | 1130 |
|---|---|---|---|
| | Reel strip position | Index Reel | Increment Reel |
| 1101 | 1 | | |
| 1102 | 2 | I | + |
| 1103 | 3 | | |
| 1104 | 4 | I | |
| 1105 | 5 | I | |
| 1106 | 6 | | + |
| 1107 | 7 | I | |
| 1108 | 8 | | |
| 1109 | 9 | | |
| 1110 | 10 | | |

Figure 11

GAMING DEVICE WITH A USER INTERFACE INCORPORATING A FEATURE INDICATOR

RELATED APPLICATION(S)

The present application claims benefit of priority to Australian Patent Application No. 2018241188, filed Oct. 5, 2018, and entitled "A GAMING DEVICE WITH A USER INTERFACE INCORPORATING A FEATURE INDICATOR," which is hereby incorporated by reference herein in its entirety.

FIELD

The present application relates to gaming devices, methods of operating gaming devices, and gaming systems.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

SUMMARY

Gaming devices, methods of operating gaming devices and gaming systems are described.

In a described gaming device, feature indicators are incorporated into a user interface that indicate which features of the game playable with the gaming device are activated by different wagering options. In one example, the indicators light up if the corresponding feature is activated by the wagering option. The indicators can be located close to buttons for selecting between the wagering options.

In an example embodiment, there is provided a gaming device that includes a user interface having a plurality of feature indicators associated with respective ones of a plurality of features of a game playable with the gaming device. The gaming device may also include a processor and memory storing instructions. When the instructions are executed by the processor, they may cause the processor to receive a selection of a wagering option from among a plurality of wagering options, wherein the wagering options include at least two wagering options associated with different subsets of the plurality of features, and control each of the feature indicators to indicate whether or not the feature associated with the respective feature indicator is selected by selection of the wagering option.

In another described gaming device, voice-over messages are incorporated into the presentation of game play. In described gaming devices, the gaming device chooses between multiple voice-over messages when the same game event occurs to avoid messages becoming repetitive. In other described gaming devices, when two events occur at the same time that each have associated voice-over messages, the gaming device uses rules to choose between them to enable the voice-over message to be tailored to the context.

In an example embodiment, a described gaming device includes a speaker, a processor, and memory storing a plurality of voice-over messages in association with respective ones of a plurality of game events, wherein at least two voice-over messages are associated with a first game event and instructions. When the instructions are executed by the processor, they cause the processor to conduct a game, determine that the first game event has occurred during conduct of the game, select between the at least two voice-over messages associated with the first game event in accordance with a selection rule associated with the first game event, and play the selected voice-over message using the speaker.

In another example embodiment, a described gaming device includes a speaker, a processor, and memory storing one or more voice-over messages in association with respective ones of a plurality of game events including a first event and a second event; the memory also stores instructions. When the instructions are executed by the processor, they cause the processor to conduct a game, upon the first game event occurring during conduct of the game without occurrence of the second event, play a voice-over message associated with the first event using the speaker, and upon the second game event occurring during conduct of the game in conjunction with the first event, play a voice-over message associated with the second event using the speaker.

Another described gaming device has a prize wheel which can be leveled-up so that it has higher prizes. The leveling-up process is combined with a process for determining an index which controls which prize or prizes will be awarded from the prize wheel. A set of reels are spun over a series of free spins to determine the prize awarding index. Each reel strip, also referred to herein as an index reel strip, either has index symbols or increment symbols. When the reels are spun, symbols may be selected for display in a second symbol position associated with each reel. When one of these symbols ends up in a second symbol position, the reel it is associated with is held in place during future spins of other reels during the game feature. At the end of the free spins, the number of increment symbols in the second symbol positions may determine which level of prize wheel is used and may then be transformed into index symbols. The index symbols may indicate what prize or prizes will be awarded from the prize wheel once the prize wheel stops spinning relative to the index symbols. In one embodiment, in each subsequent reel spin, the remaining index reel strips for non-held reels have re-randomized associations with respective ones of second symbol positions.

An example gaming device includes a display, a processor, and a memory storing instructions. When the instructions are executed by the processor, they cause the processor to control the display to display a first set of N first symbol positions, and a second set of N second symbol positions, each second symbol position adjacent a first symbol position. The processor conducts a defined number of reel spins in respect of the second symbol positions using a set of N index reel strips including a plurality of regular index reel strips, each of which includes an index symbol at at least one reel strip position of the respective reel strip, and a plurality of prize increment index reel strips, each of which includes a prize increment symbol at at least one reel strip position. In a first reel spin, each of the N index reel strips are spun to a stopping position, and in each subsequent reel spin, any of the N index reel strips which were stopped with an index symbol or a prize increment symbol at a second symbol position are held in place while the remaining index reel strips are re-spun. The processor determines a composition of a prize wheel based on the number of prize increment symbols displayed at the conclusion of the defined number of reel spins, wherein each increment symbol results in an increment of at least one prize of the prize wheel relative to a base prize wheel. The processor spins and stops the determined prize wheel so that prizes of the prize wheel are displayed at respective ones of the first symbol positions. The processor conducts a prize evaluation based on each prize displayed at a first symbol position that is adjacent a second symbol position at which a prize increment symbol or an index symbol was selected during the defined number of reel spins, and makes a prize award based on the prize evaluation.

In another described gaming device, a pattern of WILD symbols can be added to the selected symbol of a spinning reel game. The pattern is selected from a set of patterns. The patterns can have different numbers of WILD symbols and some have clusters of WILD symbols designed to have a high likelihood of enhancing an underlying game outcome.

An example gaming device includes a display, a processor, and a memory storing (a) a set of patterns of WILD symbols, each pattern defining where a plurality of WILD symbols are to be added to an array of symbol positions, (b) a set of reel strips, and (c) instructions. When the instructions are executed by the processor, they cause the processor to control the display to display the array of symbol positions, wherein the array includes a plurality of columns of symbol positions and respective ones of the reel strips are associated with respective ones of the columns. The processor selects symbols from the reel strips for the symbol positions of the columns with which the respective reel strips are associated and display the selected symbols at the symbol positions. Upon a trigger condition being met, the processor randomly selects a pattern of the set of patterns. At least when the WILD symbols of the selected pattern will result in an additional or improved winning outcome when the selected symbols are modified to incorporate the WILD symbols as defined by the pattern, the processor modifies the symbol array to incorporate the WILD symbols of the selected pattern. The processor makes an award for each winning combination in the modified symbol array.

In another described gaming device there are stacks of symbols in the reel strips. In some embodiments, these stacks of symbols are represented as single character symbols when selected for display. For example, as a 5×1 character symbol. Two games are conducted concurrently in separate game windows. If a stack of symbols occupies all symbol positions of a given column of symbol positions, the symbols of a corresponding column of symbol positions in the other window are changed to match. In an embodiment, a bonus prize is awarded if all columns of symbol positions in each game window have stacks of symbols after this process. In this embodiment, it is possible to be awarded the prize in some cases even if only half of the columns of symbol positions originally contain stacks of symbols. In an embodiment, the symbols are modified, for example, to be wild symbols before the symbols of the corresponding column of symbol positions in the other window are changed to match.

An example gaming device includes a display, a processor, and a memory storing (a) a set of reel strips and (b) instructions. When the instructions are executed by the processor, they cause the processor to control the display to display two game windows, each having an identical array of symbol positions, wherein each array includes a plurality of columns of symbol positions. The processor independently selects symbols from the set of reel strips for each array of symbol positions. Upon the selected symbols of one or more columns of symbol positions in either of the two game windows meeting a criterion, the processor changes, if necessary, the subset of symbols for a corresponding column of symbol positions to match the selected symbols meeting the criterion, and upon each of the columns of each of the two game windows meeting the criterion, the processor makes a designated award.

Another example gaming device includes a display, a processor; and a memory storing (a) a set of reel strips and (b) instructions. When the instructions are executed by the processor, they cause the processor to control the display to display two game windows, each having an identical array of symbol positions, wherein each array includes a plurality of columns of symbol positions, independently select symbols from the set of reel strips for each array of symbol positions, upon the selected symbols of one or more columns of symbol positions in either of the two game windows meeting a criterion, modify the selected symbol of the one or more columns of symbol positions meeting the criterion and, if necessary, make the same modification to the subset of symbols at a corresponding column of symbol positions, and evaluate both game windows for winning combinations.

Another described gaming device randomly associates reel strips with symbol positions prior to each reel spin in a spin and hold type game. Some of the reel strips carry symbols that will modify game play, such as the increment symbols described above which will increment a prize wheel. The number of reel strips carrying the symbols that will modify game play may place a limit in the number of modification such as the number of prize wheel increments. Combining this with randomizing the association of the reel strips with symbol positions enables control of the maximum occurrences of a game play modification symbol without forming an association between the game play modification symbol and specific symbol positions An example gaming device includes a display, a processor; and a memory storing instructions. When the instructions are executed by the processor, they cause the processor to control the display to display a set of symbol positions and conduct a plurality of reel spins in respect of the symbol positions using a set of N reel strips, the set of N reel strips including (a) X first reel strips and (b) Y second reel strips, each second reel strip including at least one game play modification symbol that modifies game play if selected in a symbol position after a reel spin. In a first reel spin, each of the N reel strips are spun to a stopping position, and in each subsequent reel spin, at least each second reel strip which was stopped with the game play modification symbol selected for display in a symbol position after a previous spin is held in place while, prior to each reel spin, at least the remaining non-held second reel strips (which are not held in place) are randomly associated with a subset of the set of symbol positions. The game play may then be modified in accordance with each game play modification symbol selected for display in a symbol position, wherein the number of Y second reel strip places a limit on a number of game play modifications that may be made.

BRIEF DESCRIPTION OF THE DRAWINGS

FIG. 3 illustrates an example reel strip layout;

FIG. 8 is a further example reel strip layout;

FIG. 11 shows example index and increment reel layouts;

DETAILED DESCRIPTION

Figure 1:
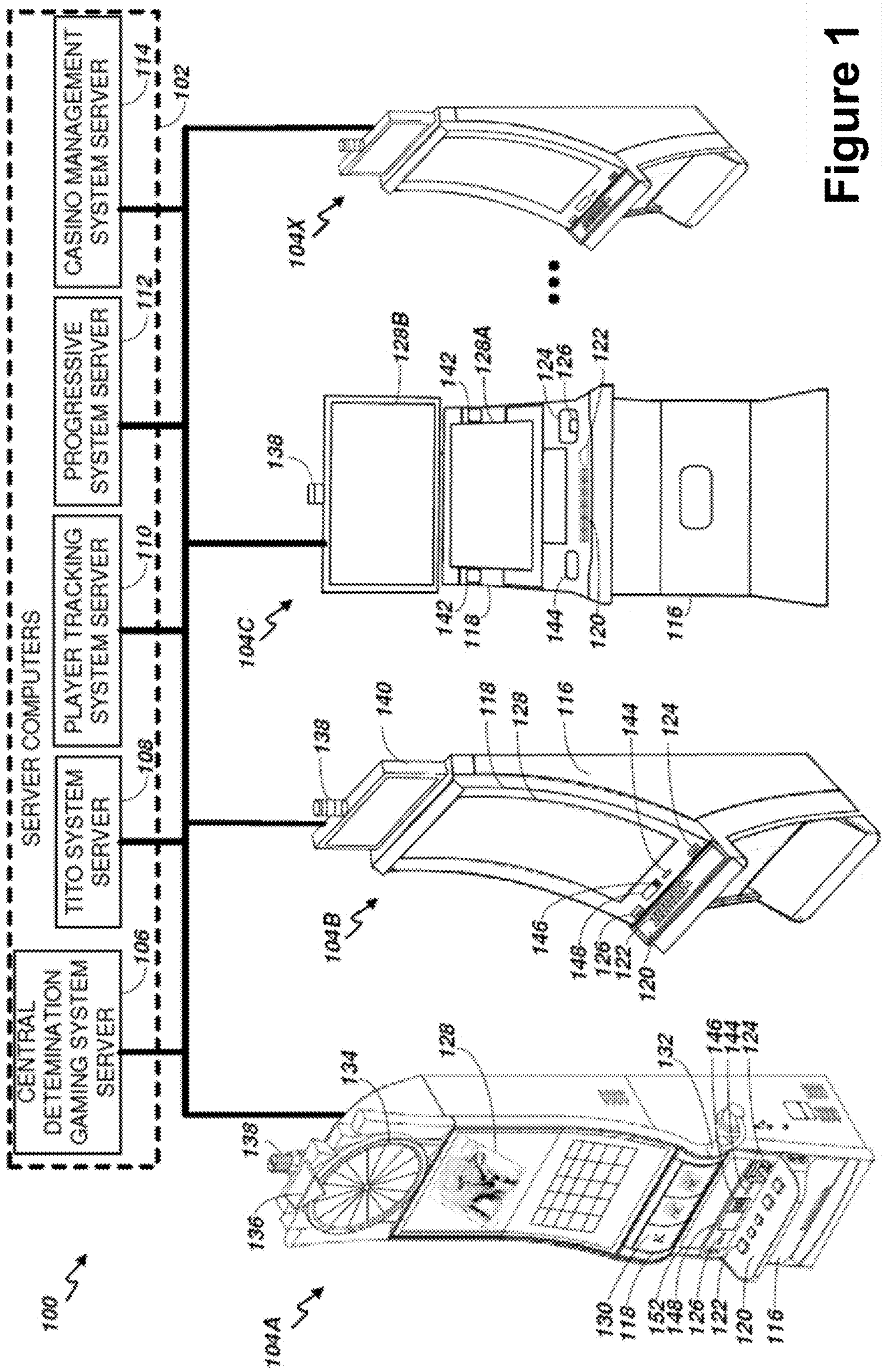
FIG. 1 is an exemplary diagram showing several EGMs networked with various gaming related servers.

FIG. 1 illustrates several different models of EGMs which may be networked to various gaming related servers. Various embodiments of the present disclosure can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices such as, but not limited to, a smart phone, a tablet, a laptop, or a game console.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, the present disclosure may, in one or more embodiments, be practiced on a stand-alone gaming device such as gaming device 104A, gaming device 104B or any of the other gaming devices 104C-104X. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a Relm XL™ model gaming device manufactured by Aristocrat® Technologies, Inc. As shown, gaming device 104A is a reel machine having a gaming display area 118 including a number (typically 3 or 5) of mechanical reels 130 with various symbols displayed on them. The reels 130 are independently spun and stopped to show a set of symbols within the gaming display area 118 which may be used to determine an outcome to the game. In embodiments where the reels are mechanical, mechanisms can be employed to implement greater functionality. For example, the boundaries of the gaming display area boundaries of the gaming display area 118 may be defined by one or more mechanical shutters controllable by a processor. The mechanical shutters may be controlled to open and close, to correspondingly reveal and conceal more or fewer symbol positions from the mechanical reels 130. For example, a top boundary of the gaming display area 118 may be raised by moving a corresponding mechanical shutter upwards to reveal an additional row of symbol positions on stopped mechanical reels. Further, a transparent or translucent display panel may be overlaid on the gaming display area 118 and controlled to override or supplement what is displayed on one or more of the mechanical reel(s).

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A. In some embodiments a ticket reader can be used which is only capable of reading tickets. In some embodiments, a different form of token can be used to store a cash value, such as a magnetic stripe card.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking server system 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
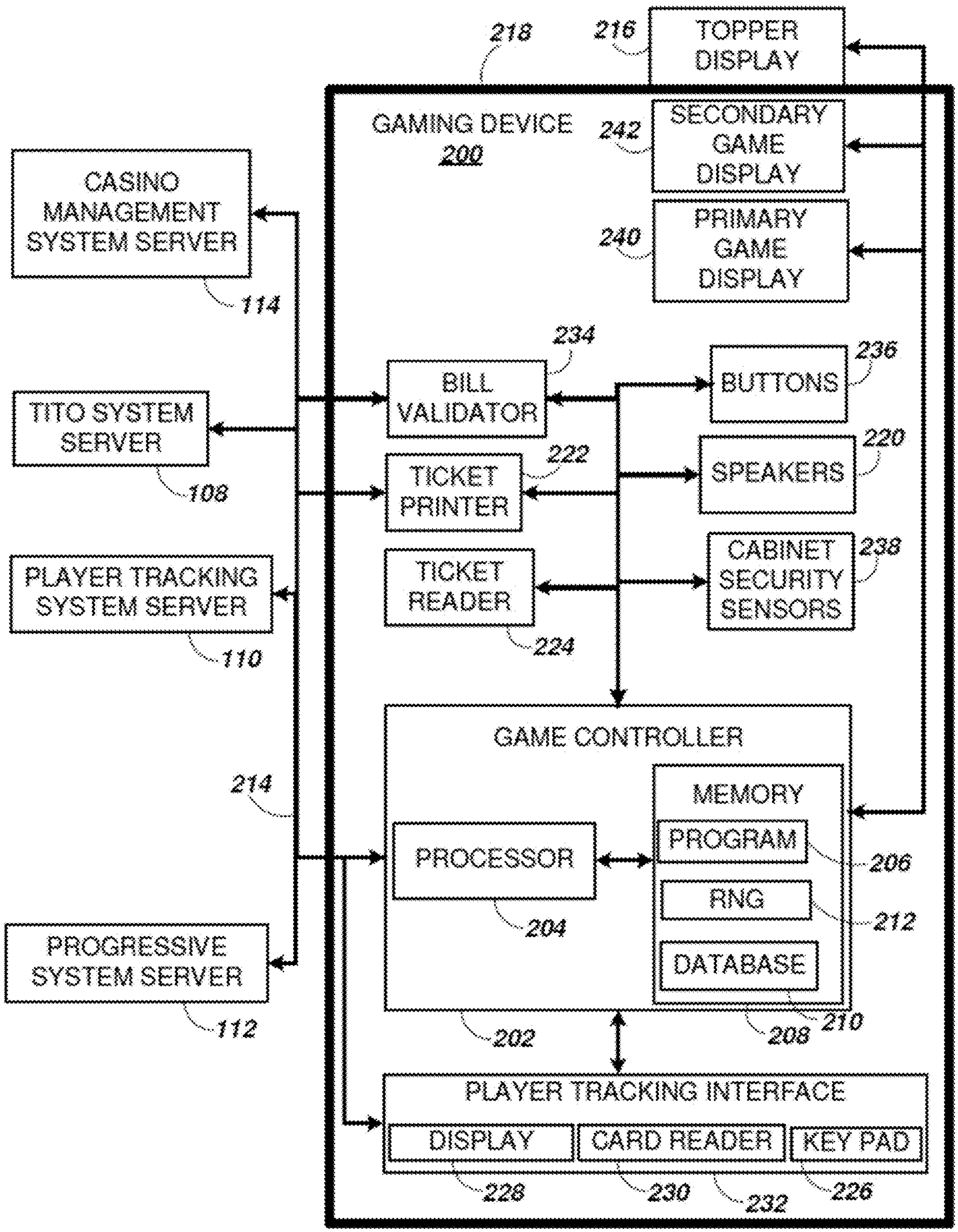
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video blackjack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance. In some embodiments, the random number generator 212 is a pseudo-random number generator.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on the game displays 240, 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other input device which enables a player to input information into the gaming device 200. In some embodiments, a player's selection may apply across a plurality of game instances. For example, if the player is awarded additional game instances in the form of Free Games, the player's prior selection of the amount bet per line and the number of lines played may apply to the Free Games. The selections available to a player will vary depending on the embodiment. For example, in some embodiments a number of pay lines may be fixed. In other embodiments, the available selections may include different numbers of ways to win instead of different numbers of pay lines.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Figure 1A:
FIG. 1A shows a further EGM.

FIG. 1A illustrates a further gaming device 104D. This gaming device 104D has a user interface which is provided by a touch screen display 121 on which virtual buttons are displayed such that a virtual button deck is provided. Play again buttons 122A,122B are also provided which enable the player to initiate a further play at the same wager. In embodiments of the disclosure, gaming device displays two game windows 129A, 129B and game play of a spinning-reel game is conducted concurrently in each game window 129A, 129B irrespective of what wager is placed.

Figure 5A:
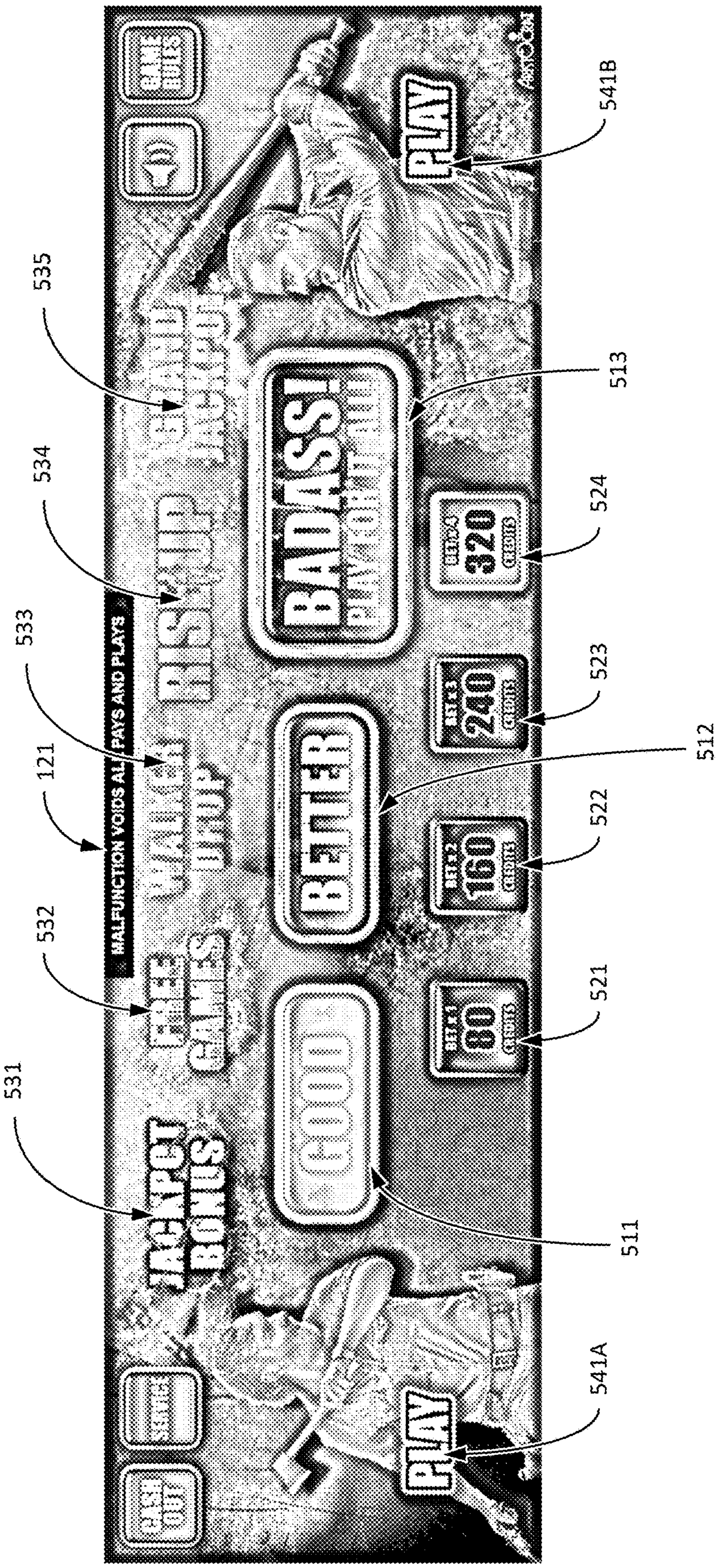
FIGS. 5A to 5C show example user interfaces.
Figure 5B:
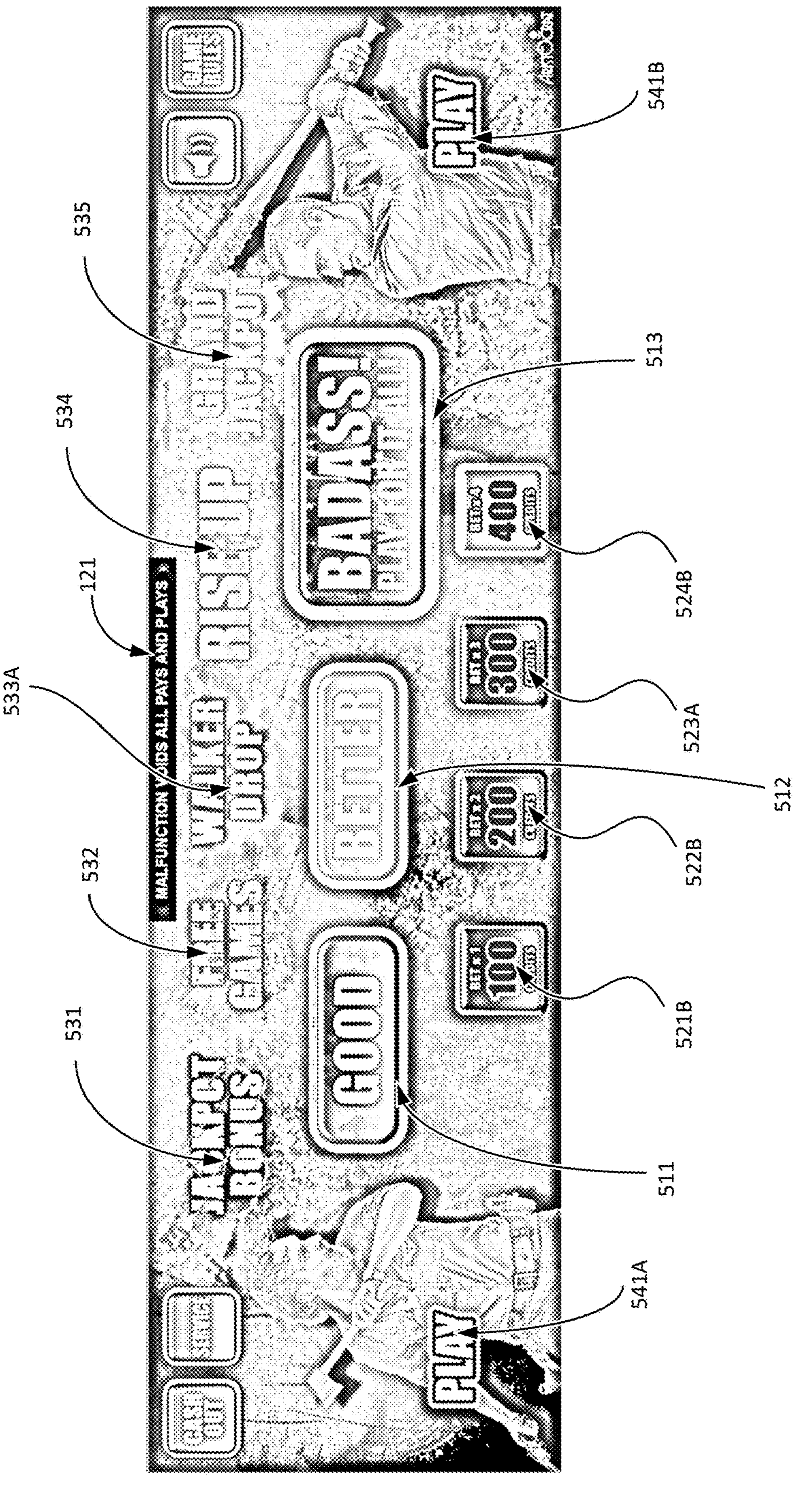
Figure 5C:
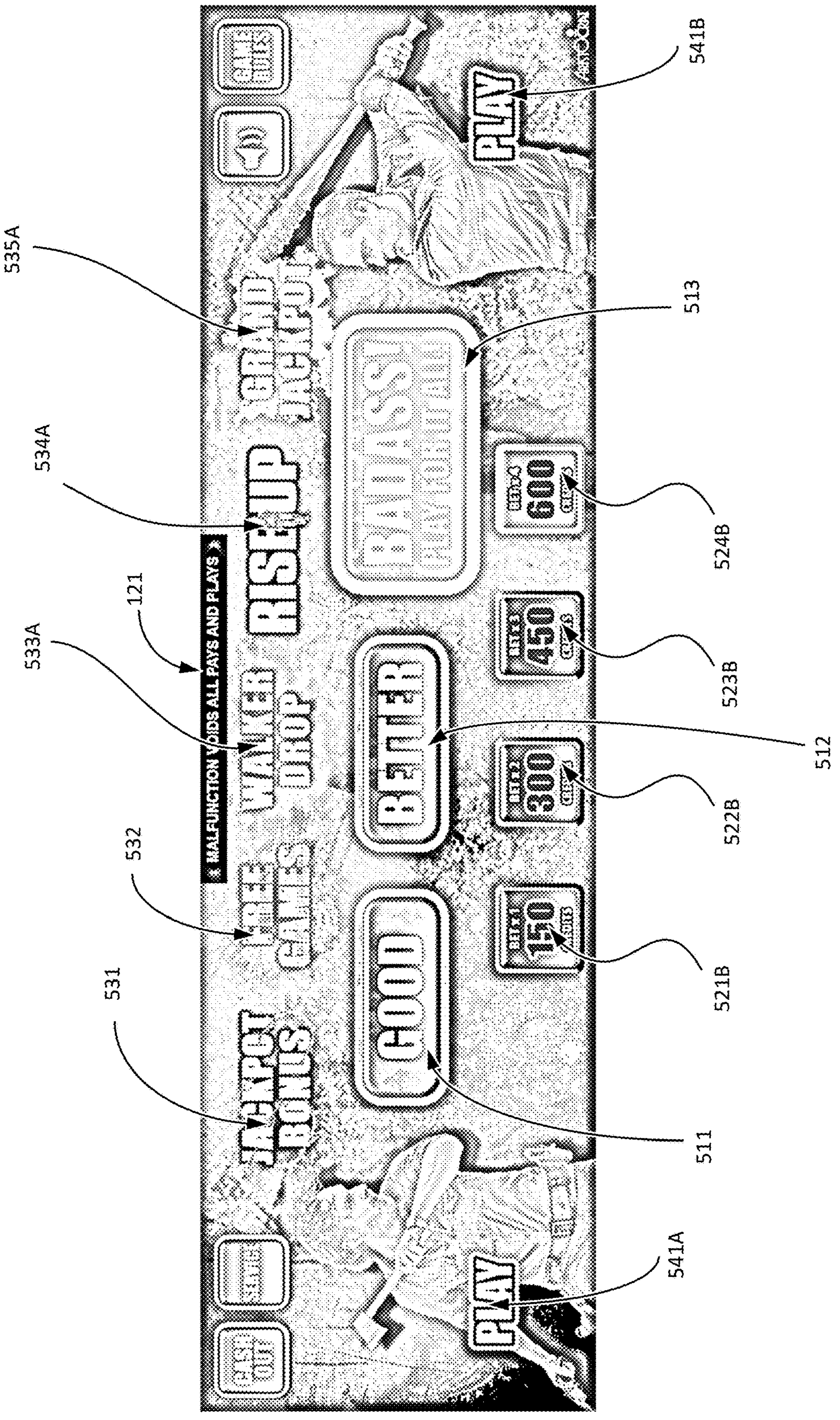

FIGS. 5A to 5C show details of the user interface displayed on touch screen display 121 of gaming device 104D in a number of different states corresponding to different ones of three wagering options being selected.

FIG. 5A shows the user interface 121 in a first state. The user interface has three wagering option buttons 511, 512, 513 corresponding to a first or "Good" wagering option 511, a second or "Better" wagering option 512 and a third or "Badass" wagering option 513. The wagering option selection causes the processor 204 to activate different sets of features during play of the game. Feature indicators 531-535 are provided to indicate which features are active responsive to particular wagering option selections. Thus, each of the wagering options 511-513 is associated with a different subset of the plurality of features.

Further, the player is able to apply a wager multiplier to their underlying wager, which in the example of FIG. 5A has a base cost of 80 credits and dynamic wager multiplier buttons 521-524 are provided which show the player the total wager corresponding to each of the selectable bet multiplier.

As indicated above, FIG. 5A corresponds to a user interface state where the player has selected the first or "Good" wagering option 511. The "Jackpot Bonus" feature indicator 531 and the "Free Games" feature indicator 532 are lit (or otherwise differentiated from the appearance of the feature indicators 533, 534, and 535, which are not activated by virtue of this selection) as a result of the player's selection of the "Good" wagering option 511. Further, the display of the "Good" wagering option is altered relative to the "Better" and "Badass" wagering options in order to make it apparent to the player that that is the wagering option they have selected. Similarly, the "Bet ×4" indicator 524 is lit up to show the player's wagering selection. The feature indicators corresponding to the "Walker Drop" 533, "Rise Up" 534 and "Grand Jackpot" 535 features are greyed out in FIG. 5A to indicate that they are not activated by selection of the "Good" 511 wagering option. A player can commence a play with these features activated and the selected bet multiplier selections by pressing either one of play buttons 541A or 541B.

FIG. 5B shows the user interface 121 when the player has selected the second or "Better" wagering option 512 such that display of the "Better" wagering option is different from the display of the "Good" and "Badass" options 511,513. A modified "Walker Drop" feature indicator 533A is displayed which is "lit up," e.g., similar to the "Jackpot Bonus" and "Free Games" features discussed above, to indicate to the player that this is also selected by this option in addition to the "Jackpot Bonus" feature and the "Free Games" feature. The "Walker Drop" feature indicator is located close to the "Better" wagering option to make it easy for the player to see that it has been activated by the selection. The "Rise Up" 534 and "Grand Jackpot" 535 features are greyed out in FIG. 5B to indicate that they are not activated by the selection of the "Better" 512 wagering option.

Updated dynamic bet multiplier buttons 521A-524B are displayed which have had their values altered to be multiples of 100 credits. That is, adding the Walker Drop feature adds a base cost of 20 credits to the wager. It will be appreciated that the subset of features in the "Better" wagering option 512 is different to that in the "Good" wagering option 513 because it additionally includes the "Walker Drop" feature.

FIG. 5C shows a further state of the user interface 121 where the player has selected the third, "Badass" wagering option 513. With this selection, each of the feature indicators 531, 532, 533A, 534A, 535A are lit up to show that all of the features have been activated. That is, there is a different set again of features associated with the "Badass" wagering option 513. Updated dynamic wagering buttons 521B-524B are displayed to reflect that the underlying wager now costs 150 credits. In this example, the 600 credit button 524B is lit up to indicate that it has been selected.

Accordingly, it will be apparent that the user interface has properties that make it clear to the user as to how it should be used and in particular that enable the user to understand the impact of their selections. In particular, it is clear to the player what the additional cost of the "Better" and "Badass" wagering options is, as well as what benefits are provided by lighting up or otherwise highlighting additional feature indicators in response to the player selecting these wagering options. Conversely, if the player changes from, for example, the "Badass" option to the "Good" option, it is immediately apparent to the player that they are no longer entitled to a number of the features. As a result, the player is better able to form a view as to whether they are getting value from a specific wagering option.

While FIGS. 5A-5C illustrate a virtual button deck, other embodiments provide a physical button deck where the "Good," "Better," and "Badass" options are provided by physical buttons that are lit up based on the player's selection and the indicators are provided by lighting lights underlying, for example, a transparent overlay. Dynamic wager multiplier buttons 521-524 can be implemented using, for example, electronic buttons that incorporate a small LCD display. Alternatively, the buttons for selecting a bet multiplier may just display the bet multiplier.

In still further embodiments, the subset of features are allocated to wagering options in different ways. In one example, a set of wagering options may be associated with features such that each feature can only be accessed by activating the specific wagering options. For example, in a modification to the example described in relation to FIGS. 5A to 5C, the "Jackpot Bonus" and "Free Games" features could be associated only with the "Good" wagering option, the "Walker Drop" feature could be associated only with the "Better" wagering option, and the "Rise Up" and "Grand Jackpot" features could be associated only with the "Badass" wagering option. In a further alternative, there could be, for example, overlap in the features offered by the "Good" and "Better" options but the "Good" and "Badass" options may not have any feature overlap. In such an example, the "Better" and "Badass" options could, however, have overlapping subsets of features.

Figure 6:
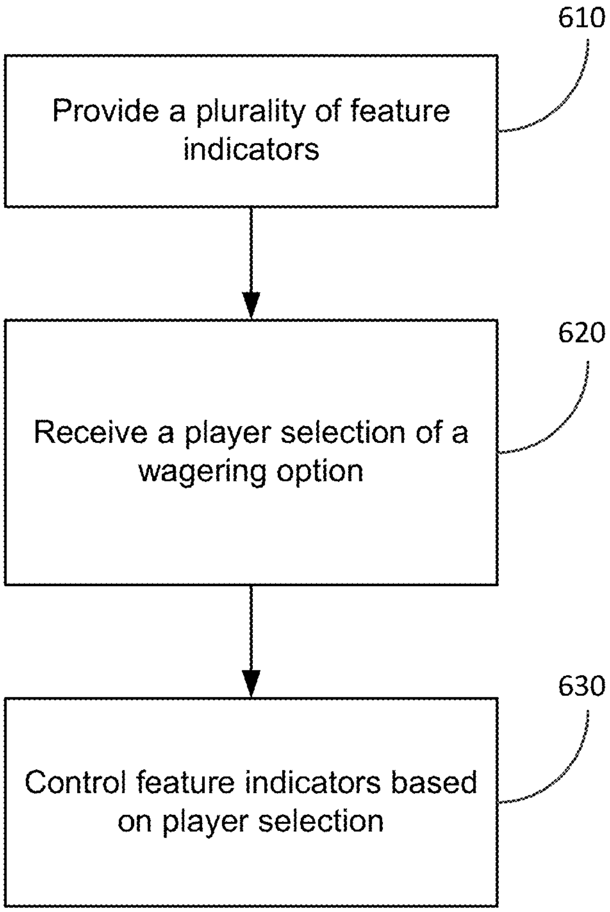
FIG. 6 is a flowchart of an embodiment.

Referring to FIG. 6, there is shown a flow chart of an embodiment. In an embodiment, the method includes providing 610 a plurality of feature indicators, receiving 620 a player selection of a wagering option and controlling 630 the feature indicators 531-535 based on the player's selection to indicate whether or not the features are activated by the selected wagering option.

Figure 4:
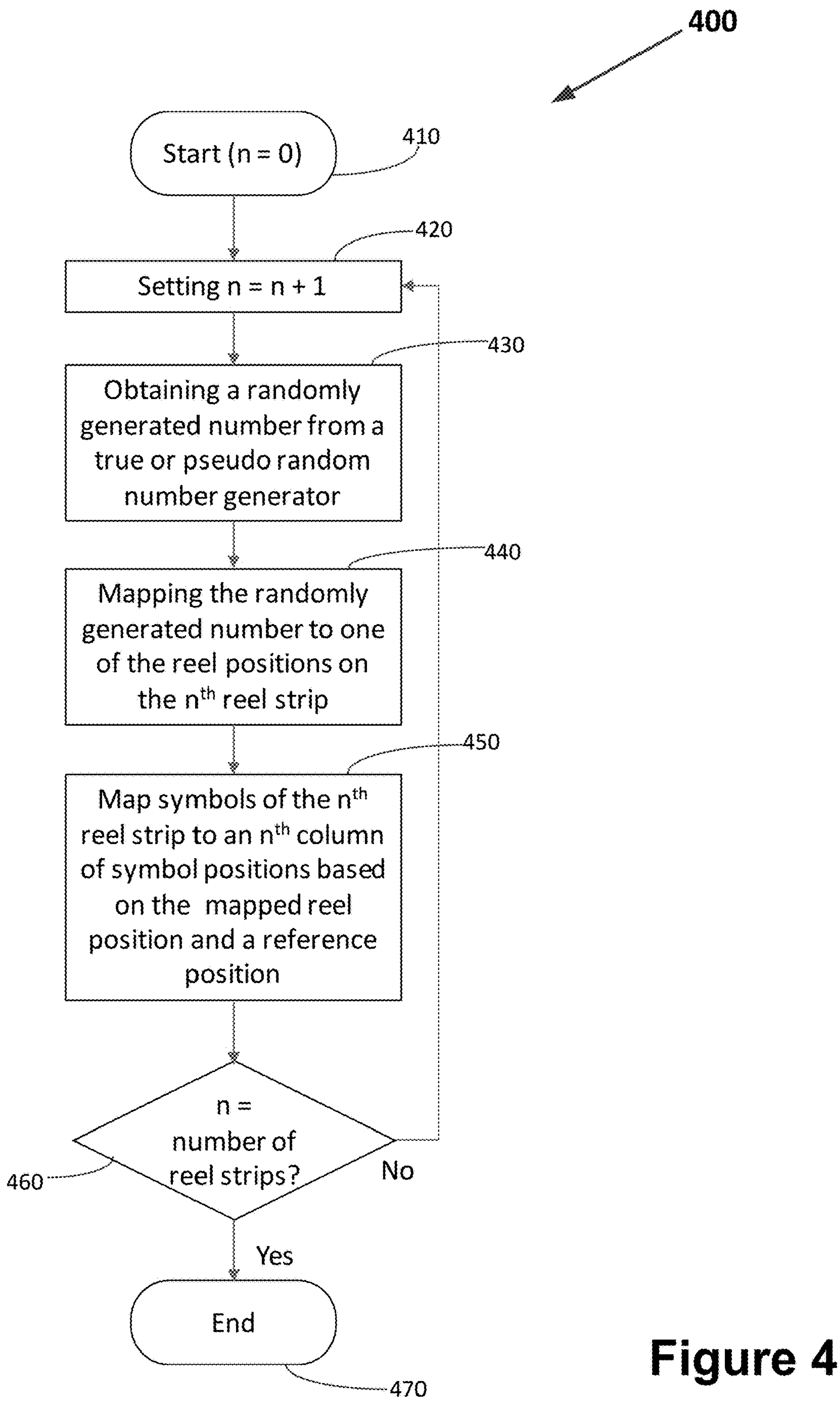
FIG. 4 is a flow chart of a symbol selection method.

FIGS. 3 and 4 illustrate a general example of how symbols can be selected as part of conduct of a spinning-reel game, e.g., such as a spinning-reel game that may be provided by gaming device 104D of FIG. 1A. Persons skilled in the art will understand how this technique can be adapted to the specific game conducted by the gaming device 200 or the gaming device 104D.

FIG. 3 illustrates an example of a set 300 of five reel strips 321, 322, 323, 324, 325. In the example, each reel strip has fifteen reel strip positions 301-315. Each reel strip position of each reel has a symbol. For example, a "WILD" symbol 331 occupies the sixth reel strip position 306 of the fourth reel 324. Other reels strips to those illustrated in FIG. 3 can be used, for example, reel strips where two or more WILD symbols are placed at consecutive reel strip positions of a reel strip. In other examples, the reel strips could have between 30 and 100 reel strip positions. The actual length of the reel strips would depend on factors such as the number of WILD symbols (in general, the more WILDS there are, the longer the reel strip needs to be to maintain the target RTP), and volatility (in general, the higher the prize value is, the longer the reel strip needs to be to lower the hit rate to maintain the target RTP). In some embodiments, the game windows 129A, 129B use the same set 300 of five reel strips 321-325. In other embodiments, the game windows 129A, 129B use different sets of five reel strips.

FIG. 4 is a flow chart of a method 400 carried out by the processor 204 to select symbols from reel strips. At step 410, the processor 204 starts the process of selecting symbols with a counter (n) set at zero as symbols have not yet been selected from any reel strips. At step 420, the processor 204 increments the counter. In the first iteration, the counter is set to 1 to reflect that symbols are to be selected from a first reel strip. At step 430 the processor obtains a randomly generated number from a true or pseudo random number generator 212. At step 440 the processor maps the generated number to one of the reel positions of the $n^{th}$ reel strip. In the first iteration, this is the first reel strip. To map the generated number to one of the reel positions, the possible values that can be returned from the RNG 212 are divided into ranges and associated with specific ones of the reel positions in memory 208. In one example, these ranges are stored as a look-up table. In one example, the ranges are each the same size so that each of the reel strip positions has the same chance of been selected. In other examples, the ranges may be arranged to weight the relative chances of selecting specific reel strip positions. The reel strips may be of different lengths.

At step 450, the processor 204 maps symbols of the nth reel strip to and nth column of symbol display positions based on the mapped reel position and a reference position. In an example, the reference position is the bottom position of the symbol positions of each column of symbol positions. In this example, the selected reel position (and hence the symbol at this position) is mapped to the bottom symbol position of the column. In an example, there are four other symbol positions in the column of symbol positions and hence symbols at four neighboring reel strip positions are also mapped to the symbol positions of the column. Referring to the example reel strips of FIG. 3, if the value returned by the RNG 212 is mapped to reel position 313, then for the first reel strip 321, "Pic3" symbol 343 is mapped to a bottom symbol position, "10" symbol 342 is mapped to a middle symbol position, and "J" symbol is mapped to a top symbol position.

At step 460, the processor 204 determines whether symbols have been selected for all of the reel strips and mapped to all n columns of symbol positions in a game window, and if not the processor reverts to step 420 and iterates through steps 430, 440 and 450 until it is determined at step 460 that symbols have been selected from all n reel strips and mapped to all n columns of symbol positions in a game window after which the symbol selection process ends 470.

Different numbers of symbols may be mapped to different numbers of symbol positions.

After the symbols of all reel strips have been mapped to symbol position in a game window, the processor 204 controls display 240 to display them at the symbol positions.

Figure 7:
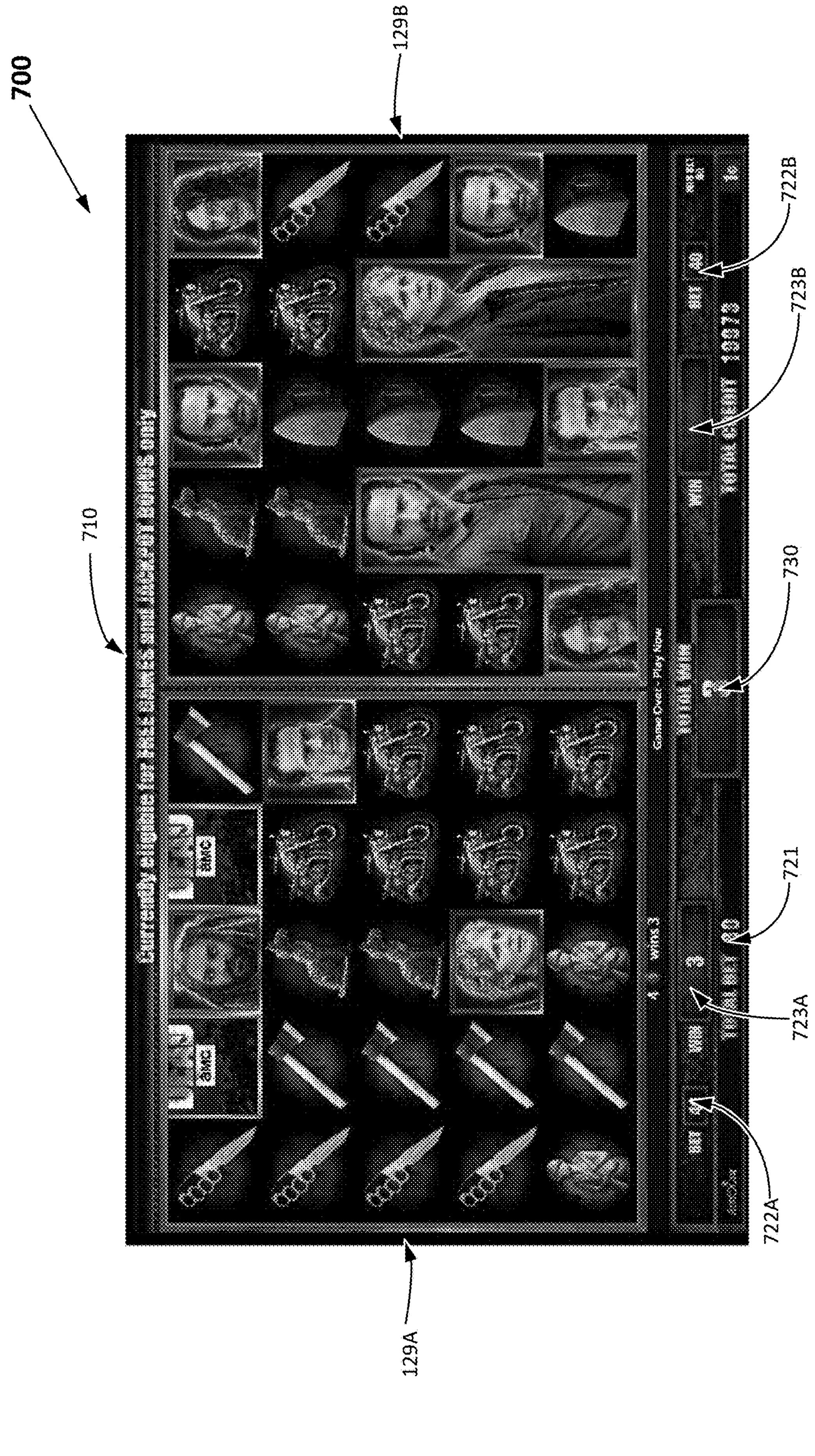
FIG. 7 is a screen display of an example base game outcome.

Referring to FIG. 7, there is shown an example of a screen display 700 showing two gaming windows 129A,129B when a player is playing the base game portion of a game offered on gaming device 104D, for example, after the player has selected the first or "Good" wagering option. In this respect, a status message "Currently eligible for Free Games and Jackpot Bonus only" 710 is displayed across the top of the first game window 129A and second game window 129B to reinforce to the player that the selection of the "Good" wagering option has only activated these features.

As shown in the screen display 700 of FIG. 7, when the player places a wager using any one of the above described wagering options, the player plays games in each of two gaming windows 129A,129B. In example embodiments of the disclosure, symbols are initially selected for each game window independently of each other. However, as will be apparent from the further description below, there are elements of game play that allow the two windows to interact in order to generate additional interest for the player. As shown in FIG. 7, the two game windows presented to the player as having separate bet amounts (which will always be the same) 722A and separate win meters 723A, 723B. The game windows also display the total amount bet 721 and the total credit. Further, a total win 730 is displayed. In other embodiments, the display may show a single bet amount and single win amount rather than separate amounts for each window. Status message 710 can be altered to show alternate messages. In one example, when the first wagering option is selected, another message that can be displayed is "Play Badass to be eligible for everything" to remind the player that they can change their wagering option to add additional features. Thus, the status message 710 interacts with the feature indicators to assist the player to understand exactly what set of features they are currently playing. Other messages can be displayed when the player has selected one of the other wagering options. For example, "Playing for all bonuses and jackpots!" when the player has selected the Badass wagering option.

In an example embodiment, the same set of reel strips are used for each window. As will be apparent from reviewing FIG. 7, each game window contains a 5×5 matrix of symbol positions. Thus, five reel strips are used and five symbols are selected for each of the columns of symbol positions. To do so, a technique corresponding to that described in FIGS. 3 and 4 can be employed in relation to window 129A and repeated in relation to window 129B.

In some implementations, stacks of character symbols may be included in the reel strips. FIG. 8 is an illustrative example of part of a set 800 of reel strips which illustrates how stacks of character symbols can occupy a portion of the reel strip positions 801-815 of each of first to fifth reels 821-825. In the example of FIG. 8, only the first fifteen reel strip positions 801-815 of each of the reel strips are shown and the reel strips are longer so that they can each have multiple stacks of five character symbols. Further, as the embodiments of the disclosure can be applied with a wide variety of different themes, generic symbols are shown in FIG. 8 rather than symbols corresponding to the theme of the game shown in FIG. 7.

In embodiments of the disclosure, character symbols are present on each of the reels. In one example, there are five different character symbols. Each of the symbols appears on each of the reel strips so that they can form part of winning combinations. The character symbols can be arranged in stacks of symbols on the reel strips. For example, as shown on reel 1 821, there are five consecutive character 1 symbols at reel strip positions 2 to 6 802-806. There are three consecutive character 2 symbols at positions 6 to 8 806-808 on reel 2 822 as well as two consecutive character 2 symbols at positions 12 and 13 812,813 on reel 2 822. That is, there can be more than one stack of character symbols on a reel, and even multiple stacks of the same character symbols on a reel (separated from each other by another symbol or other symbols). Other stacks of symbols are shown in FIG. 8, for example: on reel 3 823 there is a stack of four character 3 symbols at positions 10-13 810-813; on reel 4, there is a stack of three character 4 symbols at positions 5-7 805-807 and two character 4 symbols at positions 12 and 13 812-13; on reel 5 there is a stack of five character 5 symbols at positions 810-14; on reel 1 821, there is a stack of two character 3 symbols at positions 812,813; etc. While character symbols can be arranged in stacks on any of the reels strips, in the example, there are only 5×1 stacks of individual ones of the character symbols on individual ones of the reel strips. In the example, there are 5×1 stacks of character 1 symbols on reel 1 821, 5×1 stacks of character 2 symbols on reel 2 822, 5×1 stacks of character 3 symbols on reel 3 823, 5×1 stacks of character 4 symbols on reel 4 824, and 5×1 stacks of character 5 symbols on reel 5 825. This characteristic of the reel strips is used in the "Rise Up" feature as described below. In this respect, the reels strips described in relation to FIG. 8 are examples of reels strips that are used when the "Badass" wagering option is selected. When the "Good" or "Better" wagering options are selected, there are no 5×1 stacks of character symbols on the reel strips, instead, the largest stacks of character symbols are 4×1 stacks.

While the character symbols are treated as individual symbols in the reel strip, once they are selected for display in game window 129A or game window 129B, the character symbols may be displayed as a unitary or single, large character symbol occupying or spanning across multiple symbol positions.

Figure 9A:
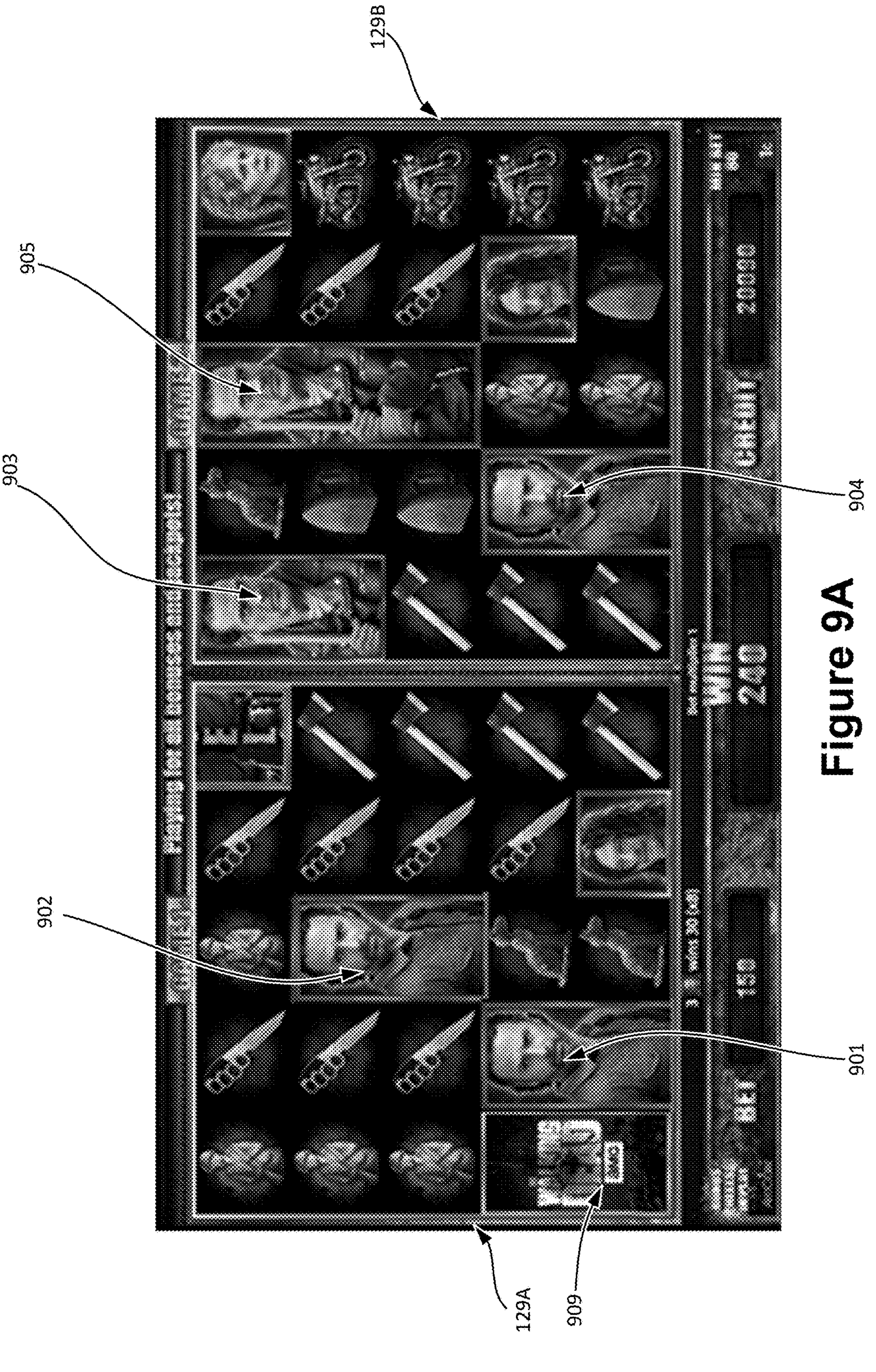
FIGS. 9A and 9B are example screen displays.

In this respect, an example is shown in FIG. 9A where a number of stacks of character symbols have landed. Referring to window 129A, a stack of wild symbols (represented by "The Walking Dead" logo) has landed in the first column of the window 129A but is shown as a single 2×1 symbol 909. Similarly, 2×1 stacks of a common character symbol have landed in the second, third, and seventh columns and are shown as a 2×1 character symbols 901,902, and 904. Other character symbols 903, and 905 are shown elsewhere within the windows 129A and 129B. In some embodiments of the disclosure, where a part of a stack of character symbols lands within a window 129A,129B, the head of the character is always displayed as the top symbol of the stack irrespective of whether the "top" or "bottom" part of the stack is selected for display within one of the windows 129A,129B. For example, the display of 3×1 character symbol 905 could result from 3 symbols of a stack of 5 character symbols being selected by the processor 204 for display in window 2 129B. As a result, the character symbols are immediately recognizable to the player irrespective of where a stack of symbols lands.

Figure 9B:
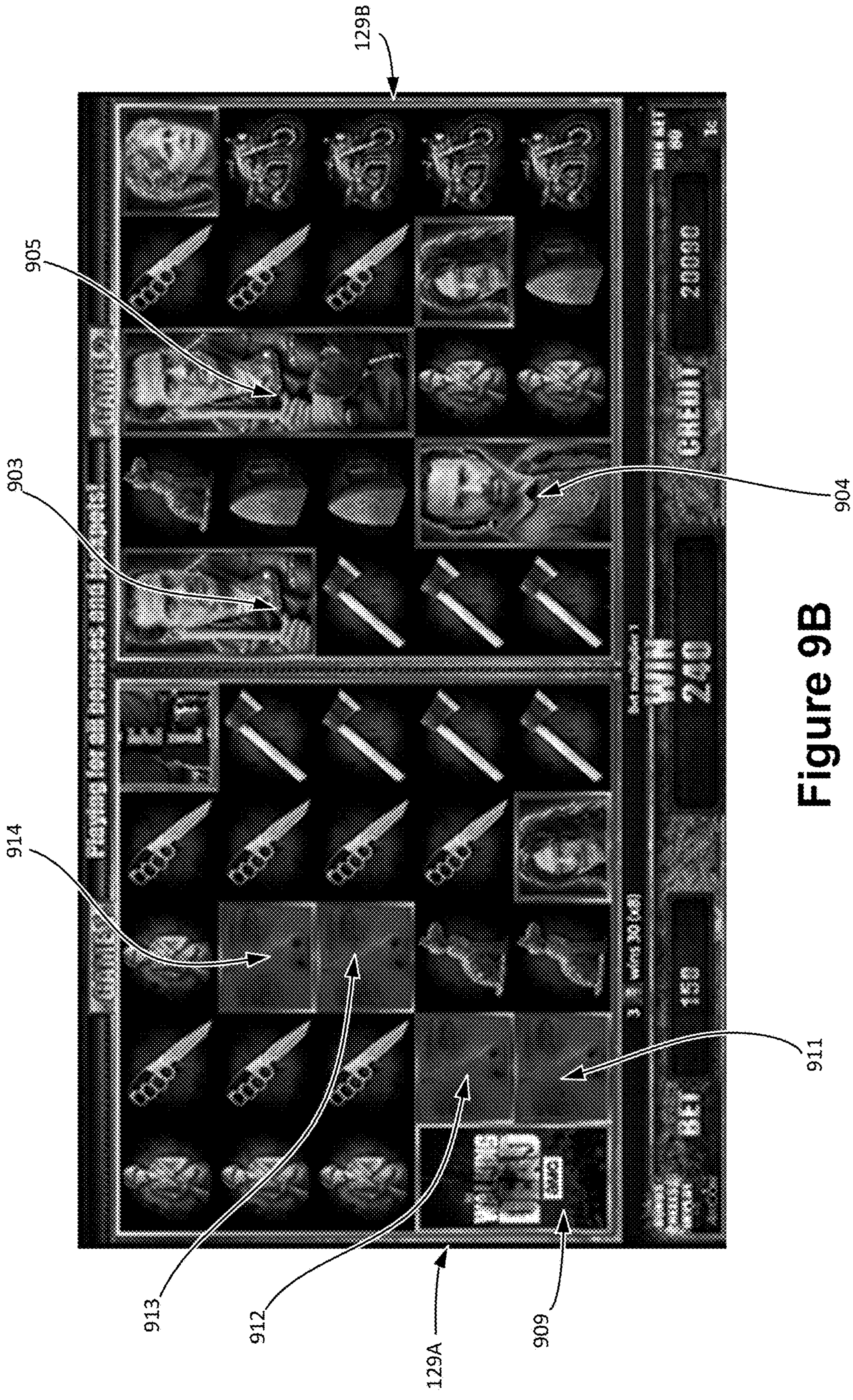

In an example embodiment of the disclosure where a character symbol forms part of a winning combination, e.g., of symbols across the columns of a display window, it is changed to a 1×1 symbol size to highlight a win. For example, referring to FIG. 9B, in the first window 129A, 2×1 character symbols 901, 902 have been transformed into single symbols 911-914 to show that they are part of winning combinations with wild symbol 909. As character symbols 903, 904, 905 do not form part of a winning combination, they are left unchanged.

Figure 10:
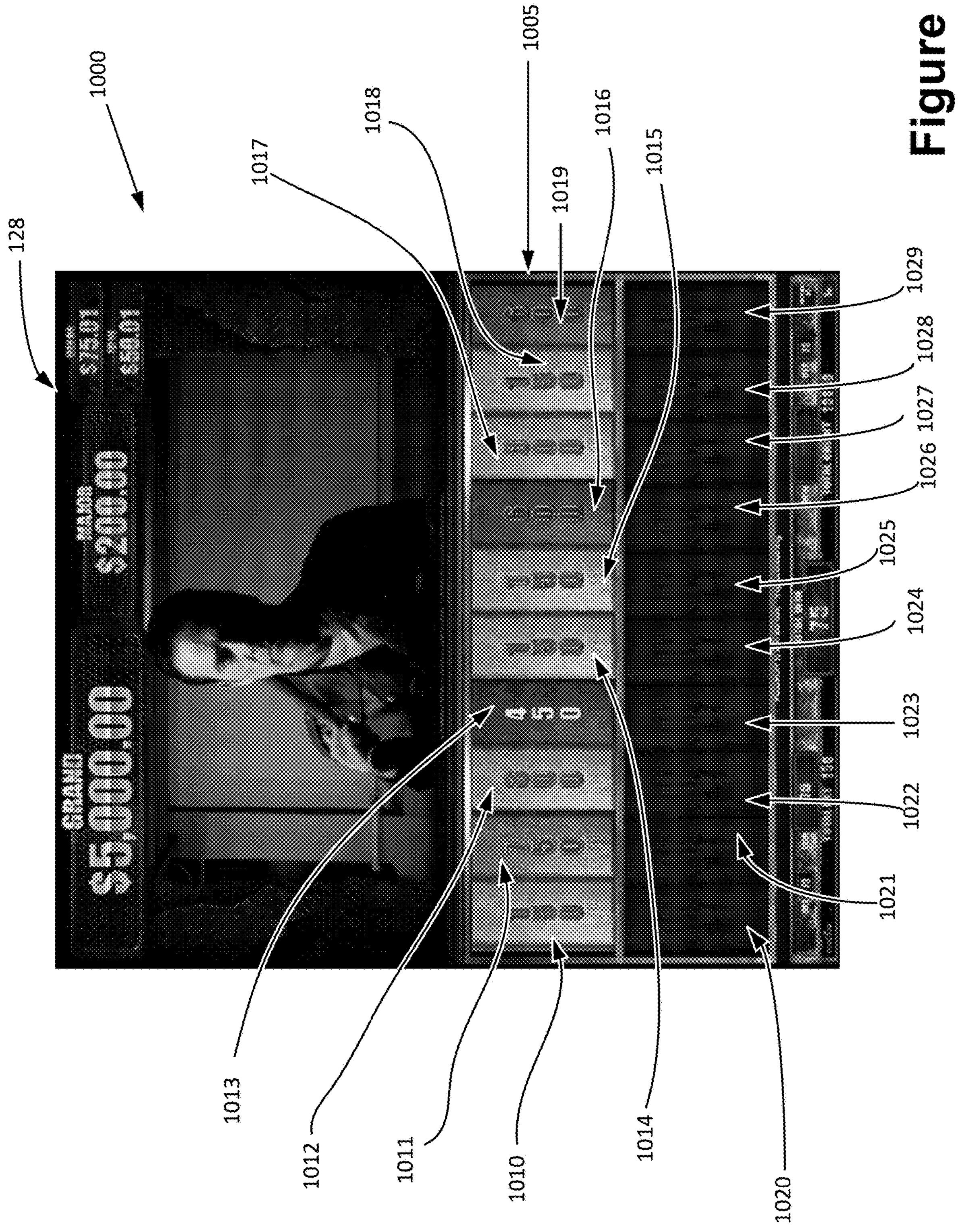
FIG. 10 is an example screen display.

Referring now to FIG. 10, there is shown an example of a screen display 1000 of the "Jackpot Bonus" feature that can be triggered by a trigger condition being met during the base game. In the Jackpot bonus feature, a prize wheel can be leveled-up so that it has higher prizes. The leveling-up process is combined with a process for determining an index which controls which prize or prizes will be awarded from the prize wheel. The potential to level-up increases anticipation during play of the game. Screen display 1000 shows the "Jackpot Bonus" feature when it has been activated but play is yet to be started. The screen display 1000 replaces game windows 129A and 129B. A portion of prize wheel 1005 is displayed having a plurality of prizes displayed at respective ones of first symbol positions or prize positions 1010-1019. Below the prizes are ten, second symbol positions 1020-1029. It will be apparent that these symbol positions 1020-1029 correspond in a one to one manner to the prize positions 1010-1019. In embodiments of the disclosure, if at the conclusion of the Jackpot Bonus feature, index symbols are selected for display at individual second symbol positions 1020-1029, they indicate that a prize from the prize wheel stopped at the neighboring prize positions 1010-1019 will be awarded. Thus, the presence of an index symbol in a second symbol position may serve to act as an indicator that whatever prize symbol ultimately ends up being positioned next to the index symbol after the wheel is spun as a prize that is won (or potentially won) as a result of the wheel spin (as noted below, in some instances, only the highest-value prize indicated by an index symbol may be won from such a wheel spin).

Figure 15:
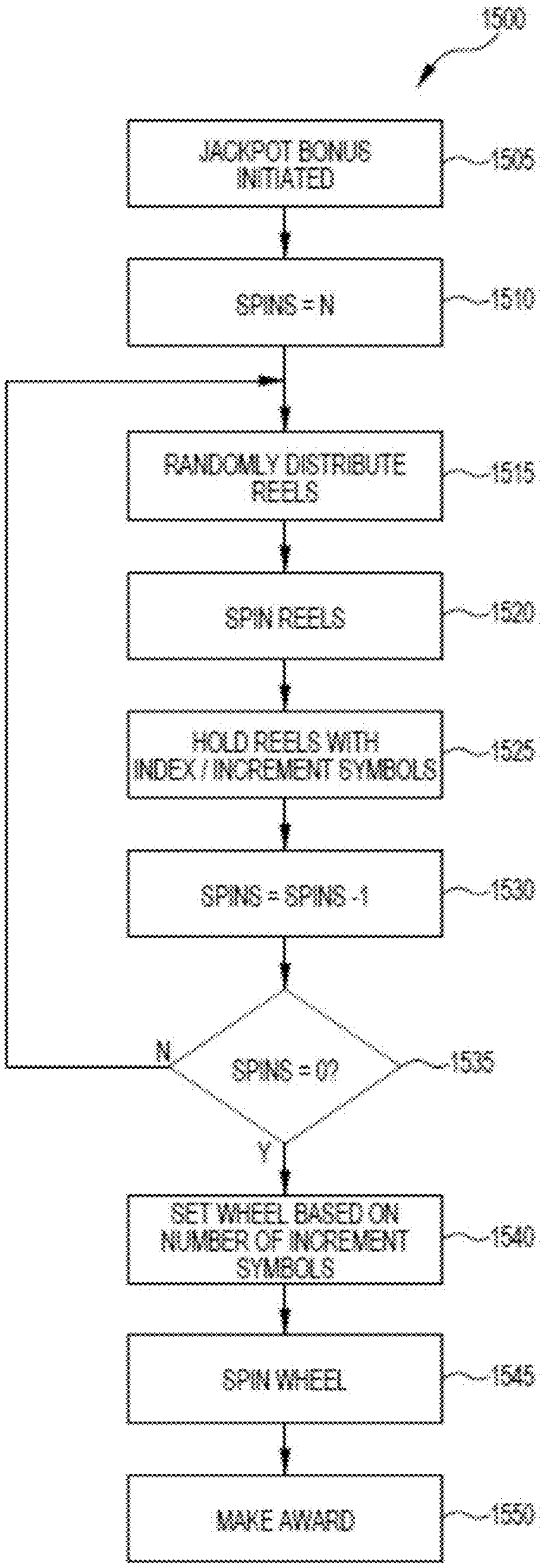
FIG. 15 is a flow chart of an embodiment.

Referring to FIG. 15, there is shown a flow chart 1500 of the "Jackpot Bonus" method of an embodiment. At step 1505, the "Jackpot Bonus" is initiated resulting in the screen display 1000 shown in FIG. 10. At step 1510, a spin counter is set to an initial number of spins N. In one example, N=3 such that 3 spins are conducted. At step 1515, index reel strips from a set of index reel strips are randomly assigned to the second symbol positions 1020-1029. As index symbols are held for each second symbol position 1020-1029, the index reel strips having those held index symbols may be removed from the set of index reel strips that are randomly assigned to the second symbol positions 1020-1029 that do not have a held index symbol for the remaining spins. The set of index reel strips includes a defined number of regular index reel strip(s) and increment reel strip(s). Randomly associating the index reel strips with second symbol positions 1020-1029 enables an increment symbol to be selected at any one of the second symbol positions 1020-1029 while at the same time controlling the number of increments that can occur to the prize wheel.

As described in further detail in relation to FIG. 25 below, the technique of randomly associating reel strips with symbol positions can also be used in other hold and spin games where it is desirable to control the maximum occurrences of a particular symbol without forming an association between the particular symbol and specific symbol positions. In particular, randomly associating reel strips with symbol positions may be particularly useful where it is desirable to place a limit on the number of modifications that will occur to game play such as increments to the prize wheel, multipliers applied to winning amounts, etc.

Referring to FIG. 11, there are shown examples of an index reel strip 1120 and an increment reel strip 1130 that can be used to form the set of index reel strips. In this example both the regular index reel strip 1120 and the increment reel strip 1130 have ten reel strip positions 1101-1110. In one example, the ten reel strip positions 1101-1110 of regular index reel strip 1120 are either occupied by an index symbol or a blank symbol. In this example, there are index symbols at reel strip positions 2, 4, 5, and 7 (1102,1104,1105,1107). Similarly, reel strip positions 1101-1110 of increment reel strip 1130 are either occupied by an increment symbol or a blank. In this example, there are increment symbols at reel strip positions 2 and 6 (1102, 1106). The regular index and increment reel strips of FIG. 11 are only examples of regular index/increment reel strips and the reel strips can be longer, for example, 30-100 symbol reel strip positions in length. Further, the makeup of individual regular index reel strips and increment reel strips can be different. That is, there can be different distributions of index symbols on different regular index reel strips and different distributions of increment symbols on different increment reel strips. In one example, there are ten unique index reel strips used in the "Jackpot Bonus" feature and seven of the reel strips are regular index reel strips while the other three index reel strips are increment reel strips. In another example, each of the increment reel strips is the same and each of the regular index reel strips is the same.

Referring to FIG. 15, at step 1520 the reels are spun: that is, the processor 204 selects new stopping positions for each of the reel strips using a technique similar to that described in relation to FIGS. 3 and 4 and animates them as spinning to the stopping positions. At step 1525, the processor 204 "holds" any reel strips having index or increment symbols displayed at one of second symbol positions 1020-1029 in place by, for example, removing the reel strips from the selection pool so that they can't be selected again. Removing the increment reel strips from the set of reel strips that are spun in subsequent spins of "Jackpot Bonus" game round ensures that the number of increments to the prize wheel is capped so as to not exceed the total number of increment symbols that could potentially be obtained during the jackpot bonus; the "held" reel strips are generally prevented from being "spun" again for the duration of the N spins. After any reel strips are held (or if no new reel strips are held for a given spin), the processor 204 then decreases the spin counter at step 1530.

At step 1535, the processor 204 determines whether all the spins have been conducted and if not reverts back to step 1515 to perform a further step of randomly assigning the remaining reel strips in the selection pool to those of the second symbol positions 1020-1029 for which a reel strip is not held. In an alternative embodiment, the processor 204 only randomly assigns the reel strips while at least one increment reel strip has not been held (if an increment reel strip has been held, then the reel strips are no longer randomly reassigned between second symbol position for each spin, but instead remain associated with the second symbol positions that they were associated with when the increment reel strip was held). In one example, the random assignment of reel strips to second symbol positions may be achieved by the processor 204 only randomly associating increment reel strips with second symbol positions and then associating the regular reel strips with second symbol positions in a defined order. In this example, the regular reel strips are, in effect, still randomly associated with second symbol positions because the random association of increment reels strips with second symbol positions will have a random effect on the second symbol positions with which the regular reel strips can be associated. In this respect, it will be appreciated that once all of the increment reels have been held, the other reels will be difficult to tell apart because they carry only index symbols.

When it is determined at step 1535 that all of the spins have been conducted, the processor 204, at step 1540, sets a prize wheel to be used based on a number of increment symbols displayed in the second symbol positions. In the example embodiment, there are three increment reel strips and each increment results in at least one prize being incremented. In some example, a fixed prize may be incremented by being changed to a jackpot prize. The jackpot prize may be a static or progressive jackpot. In some examples, a jackpot prize may have a plurality of different prize levels and a weighting table is used by processor to determine which prize level is won if the jackpot prize is awarded. In the example embodiments, prize increments are provided by storing a series of prize wheels in memory 208, where each higher prize wheel in the series has at least one prize that is incremented relative to one or more prizes of the prior prize wheel in the series.

In one example, each of four different prize wheels, with the four different prize wheels including a base prize wheel and three possible higher prize level wheels, are stored in memory 208, and the leveling-up process involves selecting which of the wheels is to be used based on whether 0, 1, 2 or 3 increment symbols are selected for the second symbol positions 1020-1029. In an example, the higher level wheels are colored bronze, silver and gold (for the highest level) to assist the player to understand the extent of the improvement they have achieved after the wheel has been leveled-up.

An advantage of using separate prize wheels is that this allows enhancements of some prizes to be relatively significant. If for example, on the other hand, a multiplier applied to the current prize wheel was used, the increments would have to be very small or by the time a number of multiplications had occurred the prizes would become too large. That is, the use of separate prize wheels allows a number of prizes to be significantly enhanced as the wheels level-up. In alternate examples, there may be 2-4 level-ups, however, 3 level-ups provide a reasonable balance between the prizes on the base wheel being attractive and the leveled-up prizes being significant.

In one example, the processor 204 is configured to animate each leveling-up of the prize wheel separately in order to communicate the extent of the leveling-up to the player and increase excitement for the player. In the example described above, the level-up process occurs after all the spins have been depleted. An advantage of carrying out all the level-ups at this point is that the nature of the level-up process is clearer to the player than if it were performed after each individual spin. In the example embodiment, after the level-up process is complete, each of the increment symbols is transformed into an index symbol. In one example, the increment symbols are flaming baseball bats and the index symbols are normal baseball bats, such that the flames on the flaming bats go out after the level-up process is conducted in respect of each bat.

Figure 12:
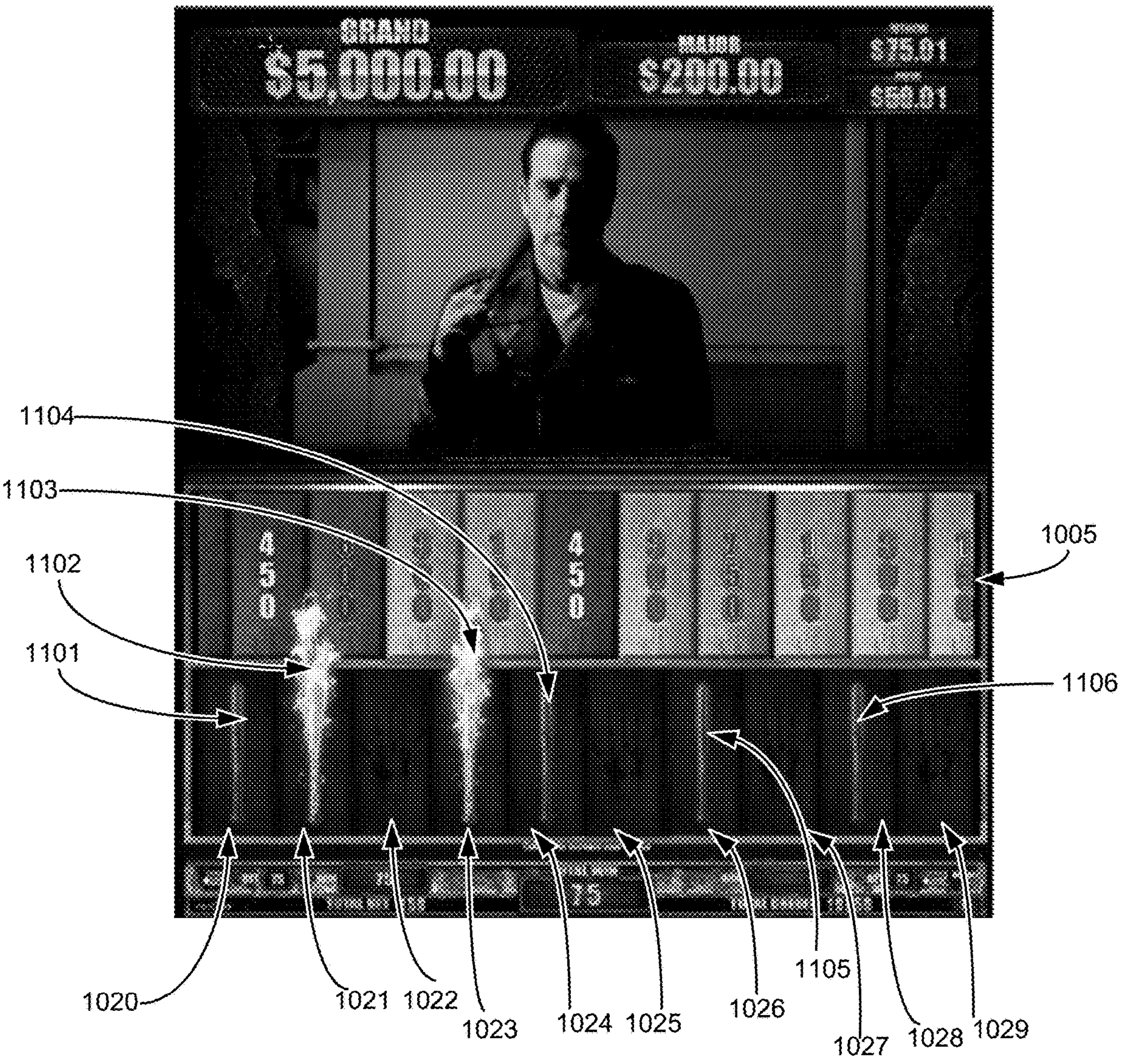
FIG. 12 is an example screen display.

FIG. 12 shows an exemplary screen display immediately after step 1535 but before the wheel has been set. In this example, index symbols 1101, 1104, 1105 and 1106 have been selected at second symbol positions 1020, 1024, 1026 and 1028 and prize increment symbols 1102,1103 have been selected at second symbol positions 1021 and 1023.

Figure 13:
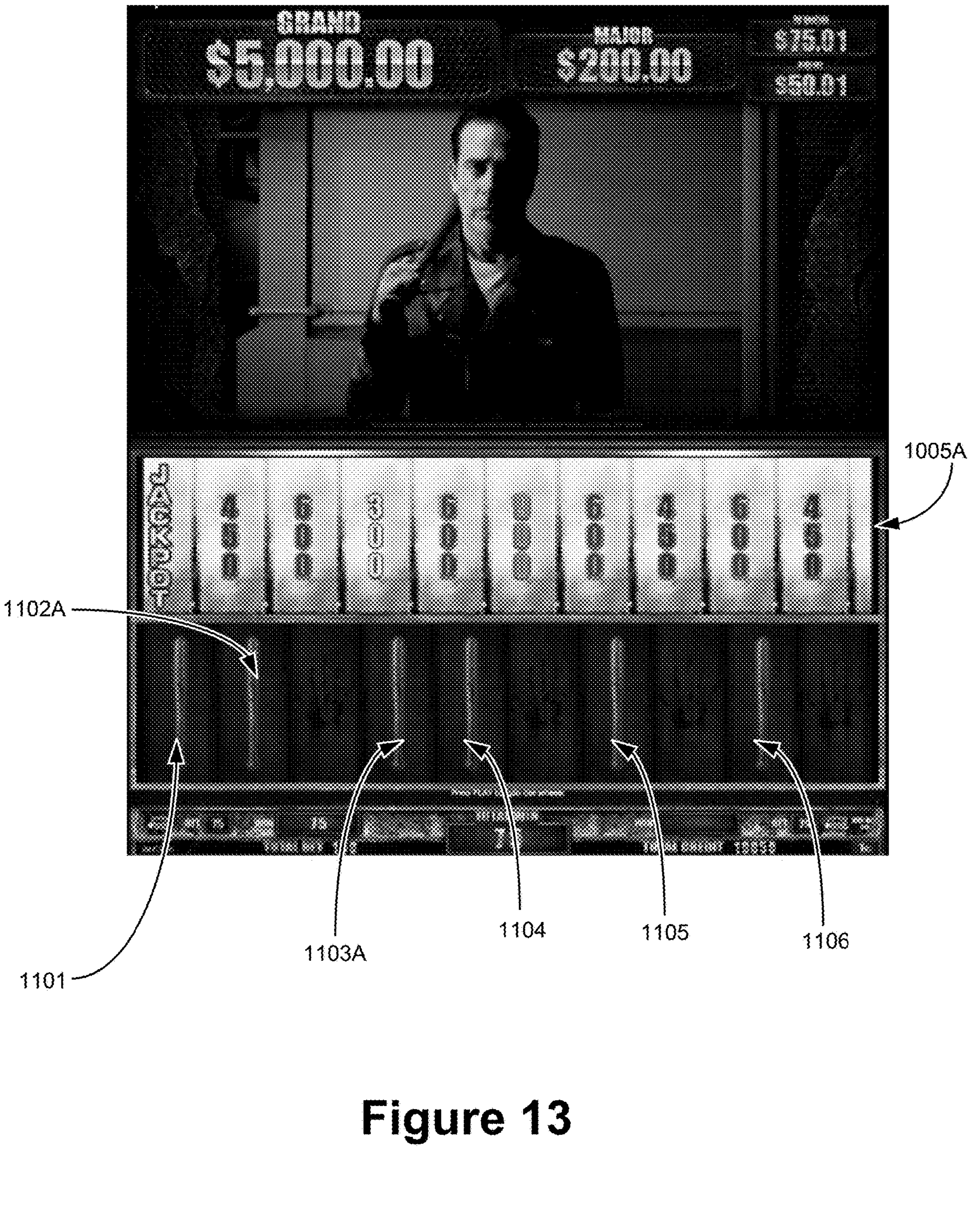
FIG. 13 is an example screen display.

FIG. 13 shows an exemplary screen display where step 1540 has been completed in order to provide an updated prize wheel 1005A. Further prize increment symbols 1102, 1103 shown in FIG. 12 have been transformed by processor 204 into prize index symbols 1102A and 1103A in FIG. 13.

At step 1545, the processor 204 proceeds to spin the prize wheel 1005A. In one example, the player is required to press the play button in order to initiate the spin of the prize wheel. The process of spinning a prize wheel is analogous to that of spinning a reel strip in that the processor 204 selects a stopping position for the prize wheel 1005A relative to first symbol positions 1010-1019.

Figure 14:
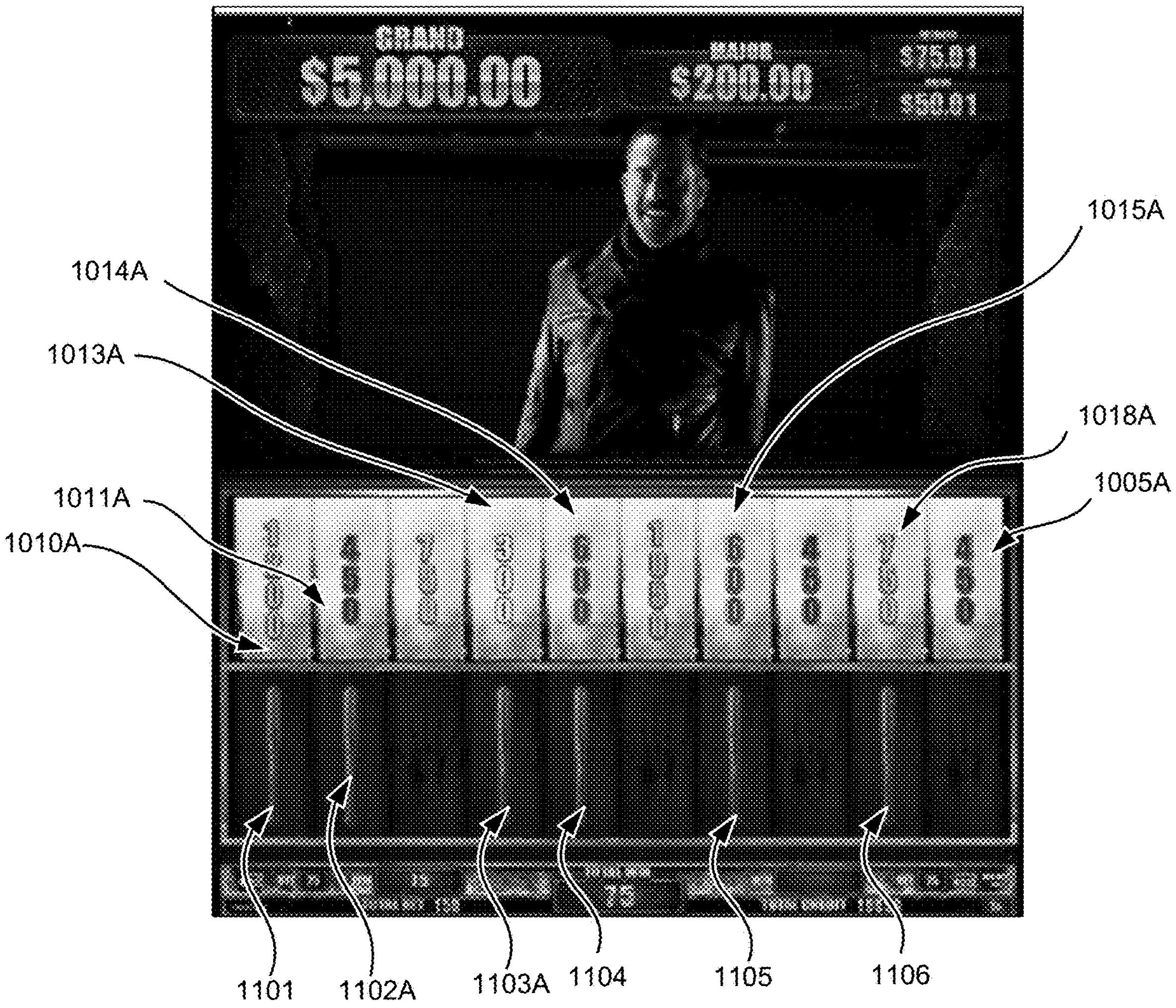
FIG. 14 is an example screen display.

FIG. 14 is an example screen shot after the prize wheel 1005A has been spun and come to a stop. The processor 204 determines an award of prizes based on the correspondence between the index symbols 1101, 1102A, 1103A, 1104, 1105 and 1106 displayed in the second set of symbol positions and the prizes at the corresponding, adjacent first symbol positions. Thus, in this example, the processor 204 makes award 1550 which is based on the prize as shown at first symbol positions 1010A, 1011A, 1013A, 1014A, 1016A and 1018A.

In this embodiment, the processor 204 awards the total of the amounts shown at these positions in credits. That is, 1200 credits+450 credits+300 credits+600 credits+600 credits+750 credits=3800 credits. In a typical example, each of the prizes is added independently to the win meter, in a defined order, for example, left to right. In an example, the defined order may be to evaluate all alternative fixed credit amount prizes left to right followed by all jackpot or bonus prizes left to right.

In an alternative example, the processor 204 only awards the largest indexed prize.

While the examples described in relation to FIGS. 10-15 employ ten first and second symbol positions, other numbers of first and second symbol positions can be used for example, 6-14 symbol positions.

It will be appreciated in the above description the number of first symbol positions of the wheel corresponds at least to the number of second symbol positions at which index symbols can be selected. This enables the player to readily appreciate the relationship between the two sets of symbol positions but in other embodiments, more first symbol positions of the prize wheel are shown than can be indexed by way of a second symbol position. Further, while the combinations of the horizontally spinning wheel and the vertically spinning index/increment reel strips assist the player to understand the relationship between the wheel and the reel strip other orientations could be used provided the index and prize wheel symbol positions are related in a way that the player can understand the indexing process. For example, the prize wheel could be spun vertically, e.g., about a horizontal axis, by the processor 204 and the index/increment reel strips spun horizontally, e.g., about a vertical axis.

Embodiments of the disclosure may employ voice-over messages to accompany game play. In some embodiments a "voice-over message" is a sound excerpt extracted from another medium. For example, a catch-phrase or an amusing line said by a character in popular television show, cable show, streaming show, or movie; or a song lyric from a music recording. Game designers seek to relate such voice-over messages to the theme or game-play of a game that is conducted by the gaming device. Employing such voice-over messages can enhance a game's popularity relative to other games by building on the popularity of the other medium or of the character/person that says the line or sings the lyric. However, there is also a risk that players will become bored or irritated by voice-over messages, particularly if the voice-over messages are overly repetitive or insufficiently matched to the context of the game. In this respect, finding appropriate voice-over messages can be challenging, for example, there may be limited lines said by a specific character that are short enough to be matched to the game theme. Embodiments of the disclosure provide a gaming device that provides more complex control over the use of voice-over messages. As a result, the gaming devices of the embodiment can mitigate against voice-over messages becoming overly repetitive and/or enable voice-over messages to be targeted to the context.

Table 1 sets out example voice-over messages in the scenarios in which the messages are played and different mechanics which are employed in order to exercise additional control over the voice-over messages. In Table 1, the "bats" refer to index symbols, the "reels" refer to reels using the index reel strips discussed above, and "improvement" refers to a leveling up of a wheel.

TABLE 1

| Voice-over (VO) message | Scenario | Mechanic |
| --- | --- | --- |
| Here it is, the grand prize game<br>Little Pig, Little Pig Let me in | Transition into feature game | Randomly select one of the 2 VOs and play in synch with the transition sequence |
| Are you going to make me count?<br>Not making a decision is a BIIIIIG decision<br>Do NOT make me have to ask | Waiting for reel spin to start | If spin button is not pressed in 20 seconds randomly select one of the 3 VOs. Repeat every 20 seconds but exclude the played VOs when selecting which one to play. |
| Slim pickings in here! | After the first reel spin only if there are 0 bats displayed | After all reels stop spinning for the first free spin. If there is no bat displayed play this voice-over specifically. This condition overrides the random selection based on number of improvements. |
| They get the spirit award for sure! | After the third reel spin only if there are 0 bats displayed | After all reels stop spinning for the third free spin. If there is no bat displayed play this voice-over specifically. This condition overrides the random selection based on number of improvements. |

TABLE 1-continued

| Voice-over (VO) message | Scenario | Mechanic |
|---|---|---|
| Look at you doctor smarty pants! | After a reel spin if there was at least one improvement in that spin and the spin results in a total of exactly 8 bats displayed | After all reels stop spinning during any one of the 3 spins. If there are 8 bats displayed play this voice-over specifically. This condition overrides the random selection based on number of improvements, but this message is played once only per feature removing the message from the list for subsequent spins. |
| I said it before and I'll say it again, you sir are special! | After a reel spin if there was at least one improvement in that spin and the spin results in a total of exactly 9 bats displayed | After all reels stop spinning during any one of the 3 spins. If there are 9 bats displayed play this voice-over specifically. This condition overrides the random selection based on number of improvements, but this message is played once only per feature removing the message from the list for subsequent spins. |
| OWW! You are such a Badass! | After a reel spin if there was at least one improvement in that spin and the spin results in a total of exactly 10 bats displayed | After all reels stop spinning during any one of the 3 spins. If there are 10 bats displayed play this voice-over specifically. This condition overrides the random selection based on number of improvements, but this message is played once only per feature removing the message from the list for subsequent spins. |
| Oh my, that is a no-no!<br>No . . . Nope! | After a reel spin if no bats were spun up in THAT spin regardless of how many are there from previous spins during the feature game | After all reels stop spinning during any one of the 3 spins. Randomly select and play one of the voice-overs applicable for the number of bats that landed on that spin and then remove it from the list so it cannot be selected again this feature. |
| Oh Goodie!<br>Wow!<br>Good, yeah | After a reel spin if exactly one bat was spun up in THAT spin regardless of how many are there from previous spins | After all reels stop spinning during any one of the 3 spins. Randomly select and play one of the voice-overs applicable for the number of bats that landed on that spin and then remove it from the list so it cannot be selected again this feature. |
| Atta Boy!<br>Lay your eyes on this!<br>Well hello there! | After a reel spin if exactly two bats were spun up in THAT spin regardless of how many are there from previous spins | After all reels stop spinning during any one of the 3 spins. Randomly select and play one of the voice-overs applicable for the number of bats that landed on that spin and then remove it from the list so it cannot be selected again this feature. |
| I just got a feelin'!<br>I do believe Lucille is getting a little jealous! | After a reel spin if exactly three bats were spun up in THAT spin regardless of how many are there from previous spins | After all reels stop spinning during any one of the 3 spins. Randomly select and play one of the voice-overs applicable for the number of bats that landed on that spin and then remove it from the list so it cannot be selected again this feature. |
| Oh BOOM!<br>Lucille is thirsty! She is a Vampire Bat! | After a reel spin if four or more bats were spun up in THAT spin regardless of how many are there from previous spins | After all reels stop spinning during any one of the 3 spins. Randomly select and play one of the voice-overs applicable for the number of bats that landed on that spin and then remove it from the list so it cannot be selected again this feature. |
| First ones free!<br>I am a stand up guy! | If no bats are spun up in either window after all 3 spins have completed | If no bats have landed in either window after all 3 spins randomly allocate a bat to the applicable window(s) and synch the VO to the accompanying animation and video sequence |
| I've got an idea . . . Eenie meenie miney<br>mo . . . (etc) . . . you are it! | Wheels speed up then slow down and stop | Synchronised with the video sequence in top screen. The wheel spin speed needs to be synched to the audio which has the wheel effects built into it. |

TABLE 1-continued

| Voice-over (VO) message | Scenario | Mechanic |
|---|---|---|
| N/A (bat/splat sound effects) | Bat swing/splat to highlight prize outcome when adding to the banner | Looping video, bat animation and sound effects need to play for each prize in succession moving across the wheels from left to right |
| Dum Dum Dum Duuuuummmm!! | Jackpot level reveal | Played after all prizes highlighted and BEFORE revealing the jackpot level. 1 or 2 jackpot levels revealed. Synchronizes to video. |
| Today was a productive damn day | When the Grand Jackpot banner is displayed | Plays when the jackpot banner appears and over the top of the special jackpot banner tune which plays for the duration of the banner display |
| Now that is the look I wanted to see | When the MAJOR jackpot banner is displayed | Plays when the jackpot banner appears and over the top of the special jackpot banner tune which plays for the duration of the banner display |
| Easy peasy lemon squeezy | When the MINI or MINOR jackpot banner is displayed | Plays when the jackpot banner appears and over the top of the special jackpot banner tune which plays for the duration of the banner display |

It will be apparent from Table 1 that voice-over messages can be integrated into a game in a manner that is specific to the context. Voice-over messages can be integrated with other contexts, for example, made specific to a wager selection using the user interface of FIGS. 5A to 5C.

Figure 16:
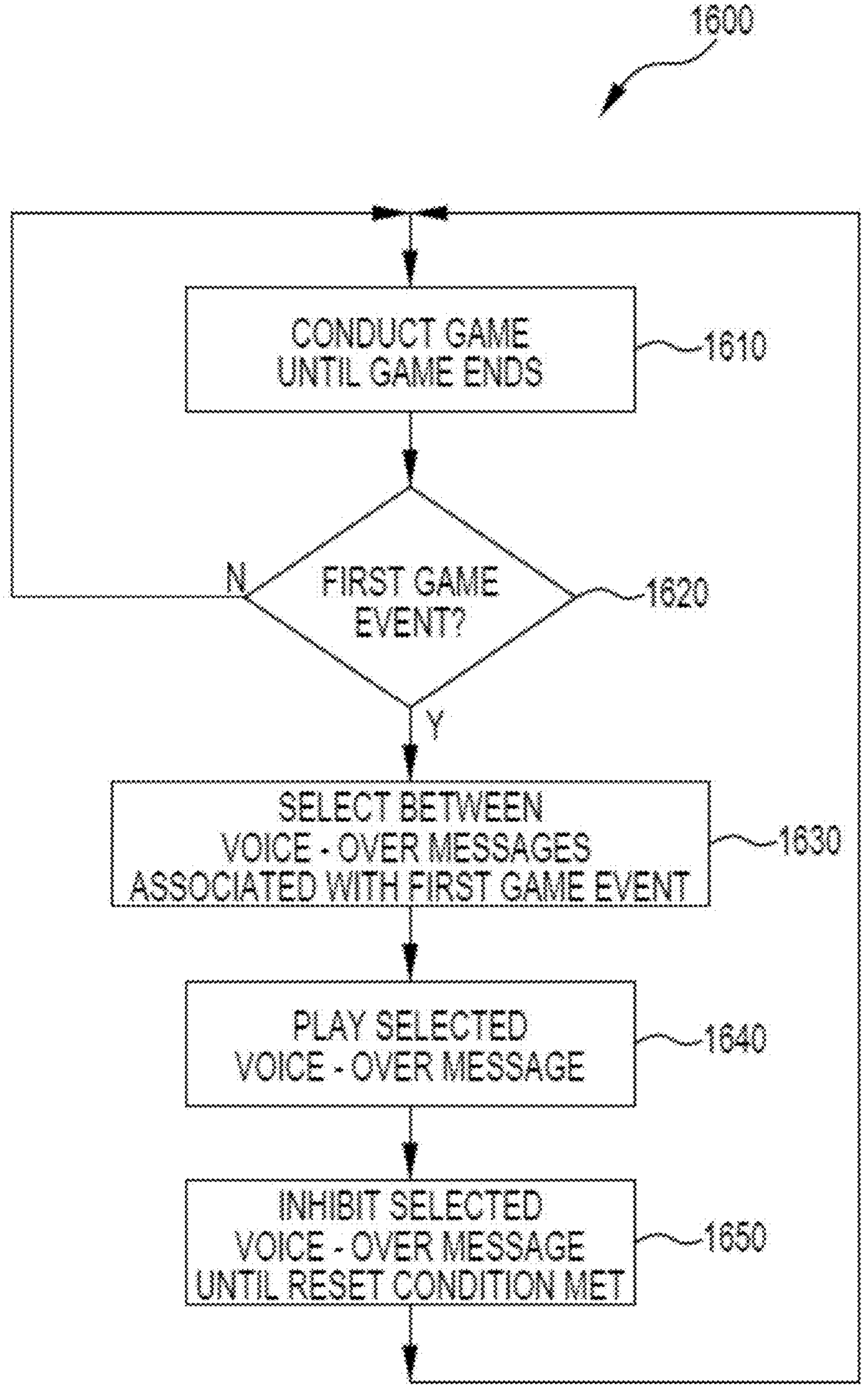
FIG. 16 is a flow chart of an embodiment.

FIG. 16 shows an example of a method of an embodiment which is implemented by processor 204 in order to reduce the repetitive nature of voice-over messages. Step 1610 which specifies that the processor 204 conducts the game until a game ends is used to indicate that the process of selecting a voice-over message can occur a number of times within a single game conducted by the gaming machine, that is, in the example of FIG. 16, the first event can occur multiple times within a single game. At step 1620, the processor determines whether a first game event has occurred 1620. If the answer is no, the processor 204 continues to monitor for the first game event until it occurs or the game ends. It will be appreciated that in embodiments of the disclosure, the processor 204 can monitor for a number of different events concurrently. Once the first game event occurs, at step 1630, the processor selects between voice-over messages associated with the first game. For example, an example game event may include waiting for the index/increment reel spin to start in the Jackpot Feature described above, the processor 204 may select randomly between the voice-over messages "Are you going to make me count?", "Not making a decision is a BIIIIIG decision" and "Do NOT make me have to ask". In this example, a voice-over message can be repeated every 20 seconds by randomly selecting one of three voice-over messages as set out in Table 1 and inhibiting at 1650 the selected voice-over message from being selected again at step 1650 until a reset condition is met, such as each of the messages has been played at least once. This reduces the risk of the game becoming repetitive.

Figure 17:
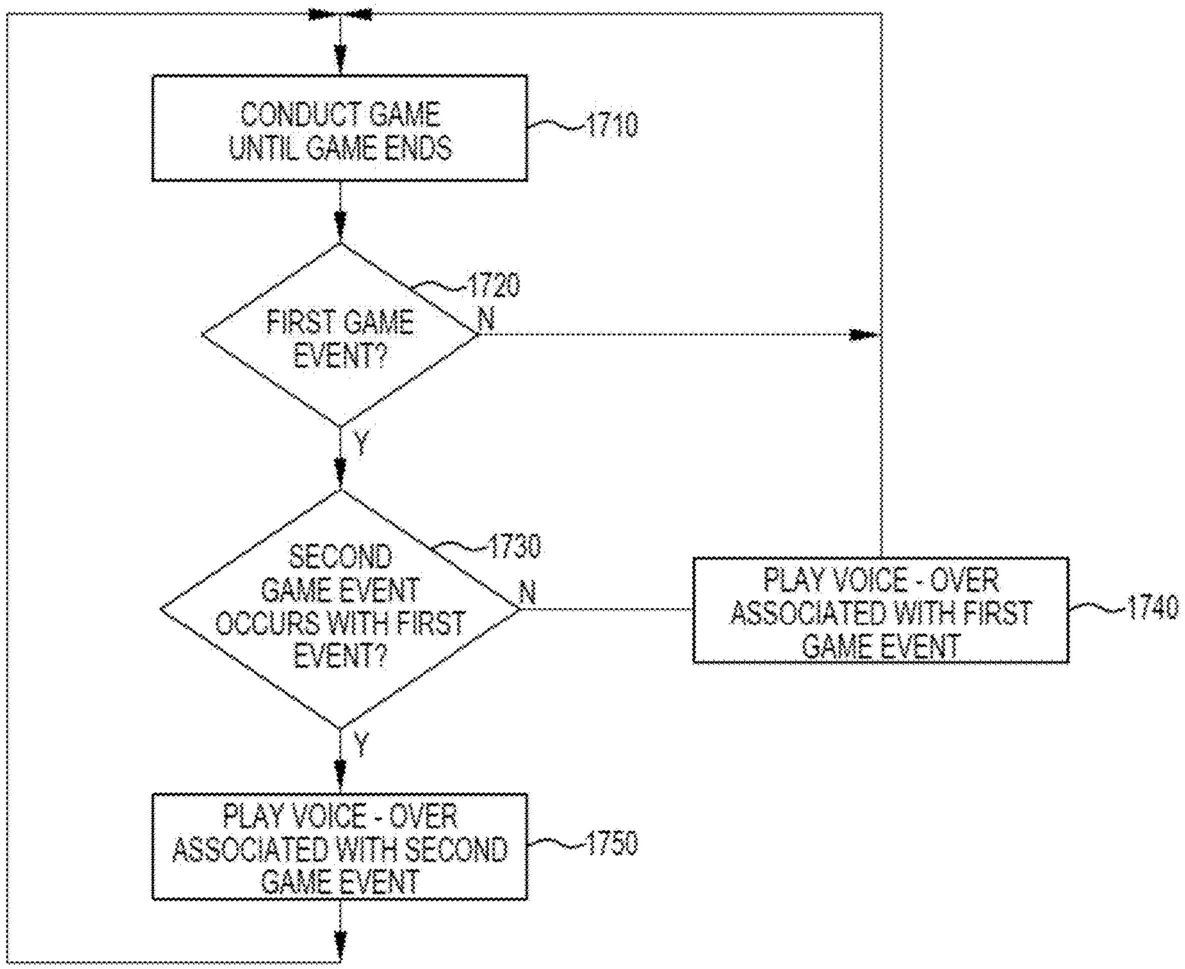
FIG. 17 is a flow chart of an embodiment.

FIG. 17 illustrates a further method, which can be operated independently of, or in conjunction with, the method of FIG. 16 in order to ensure the message more accurately matches the context. In this example, step 1710 shows that the processor 204 conducts 1710 the game until the game ends to indicate that a first game event can occur multiple times during the game. At step 1720, the processor determines whether a first game event occurs. If the first game event does not occur, the process reverts to steps 1710 until the first game event occurs or the game ends. Once the first game event occurs, it is determined by processor 204 at step 1730 whether the second game event occurs with the first game event. If the answer is no, then at step 1740, the processor 204 controls a speaker to play the voice-over message associated with a first game event. Alternatively, if the second game event occurs with the first game event, the processor 204 overrides playing the first voice-over associated with a first game event and instead plays the voice-over message associated with a second game event at step 1750. Thus, messages specific to the context of the first and second game events occurring concurrently can be played. In this respect, an example is provided in that if after a reel spin there was at least one improvement in that spin and the spin results at a total of exactly eight bats, the voice-over message "Look at you Doctor smarty pants!" is played which would override a message based on the number of improvements. For example, the "Oh Goodie" message which is usually played by the processor 204 if a single bat is spun up.

Figure 18A:
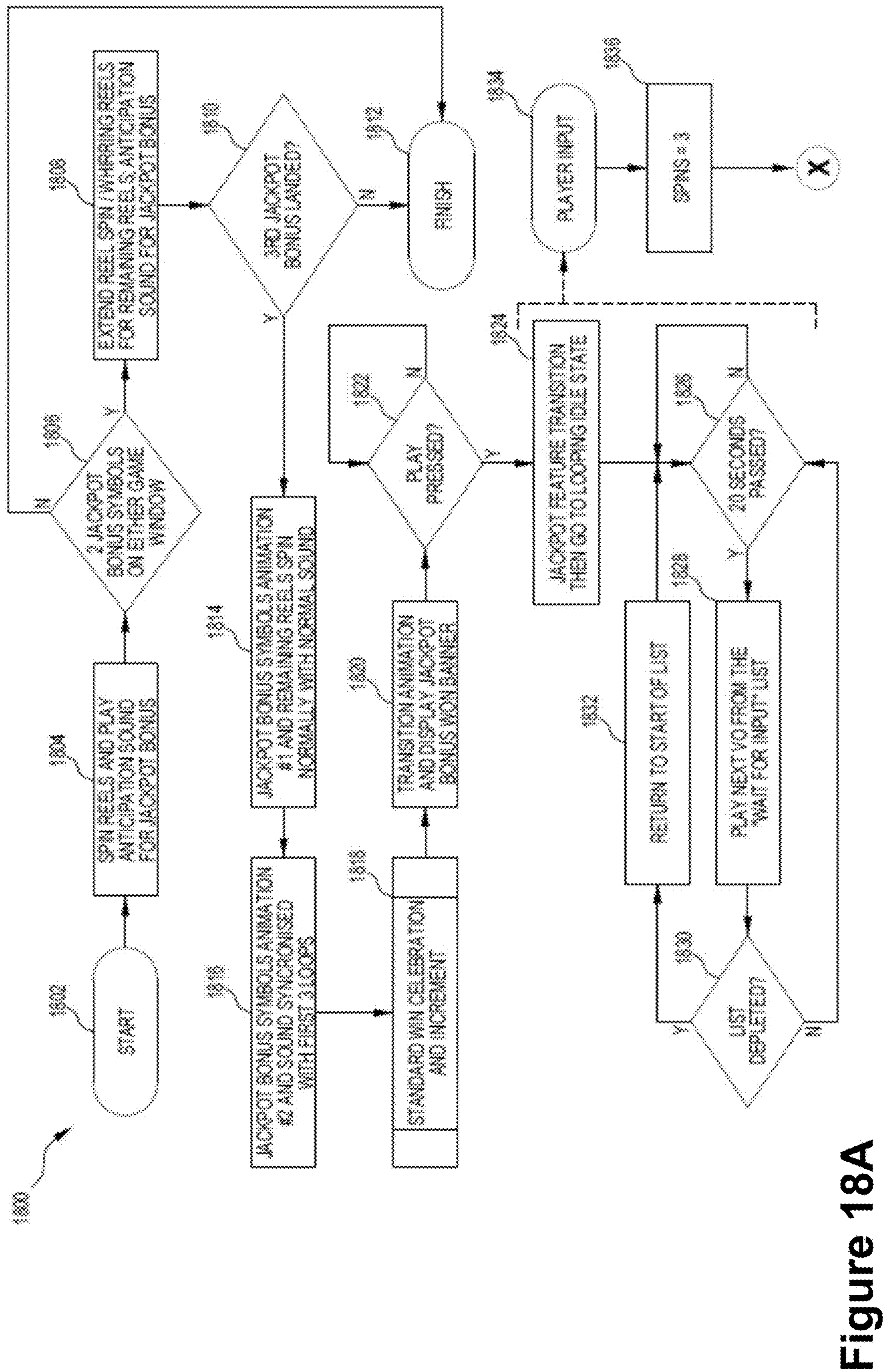
FIGS. 18A to 18C show a flow chart of an embodiment.
Figure 18B:
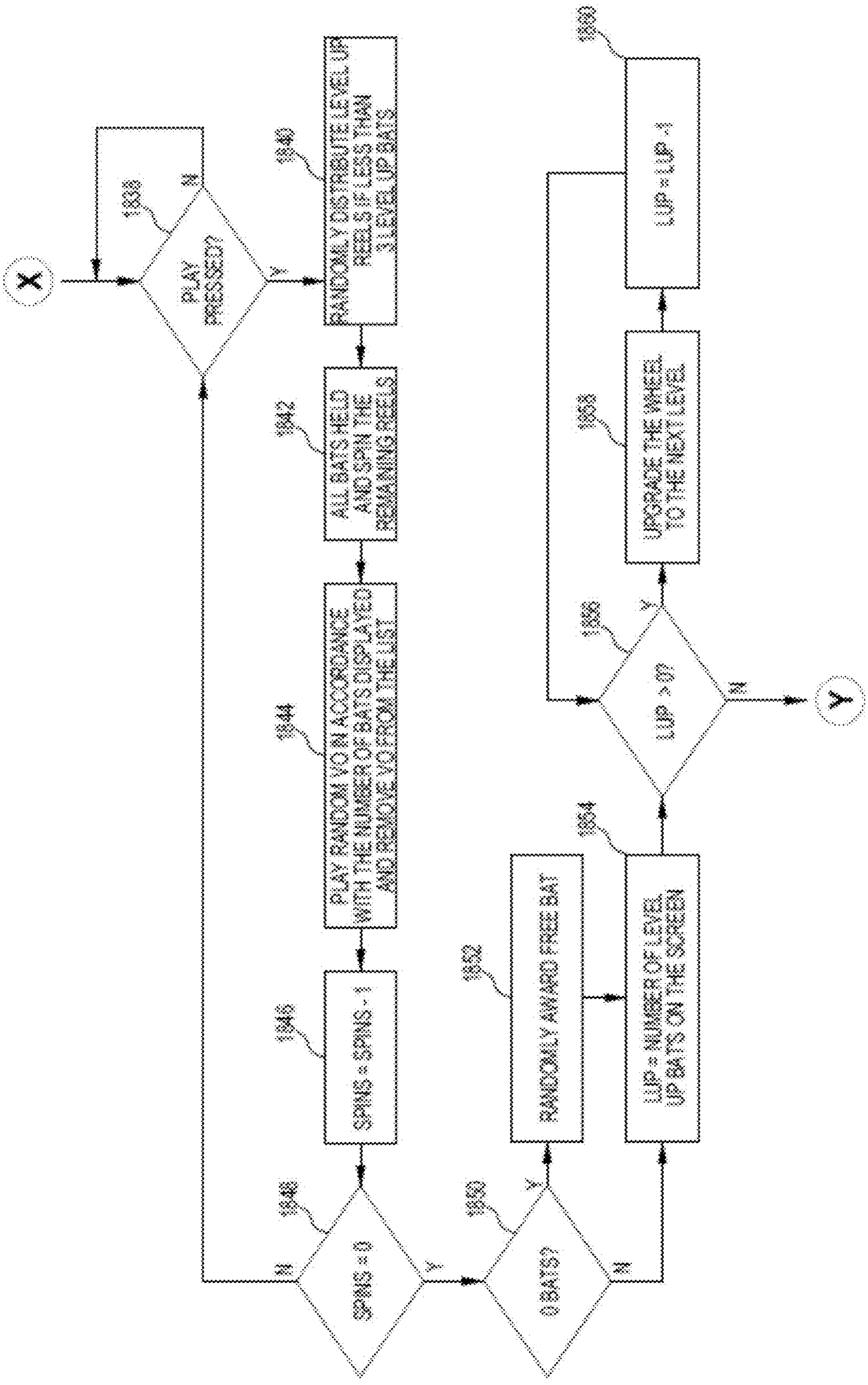
Figure 18C:
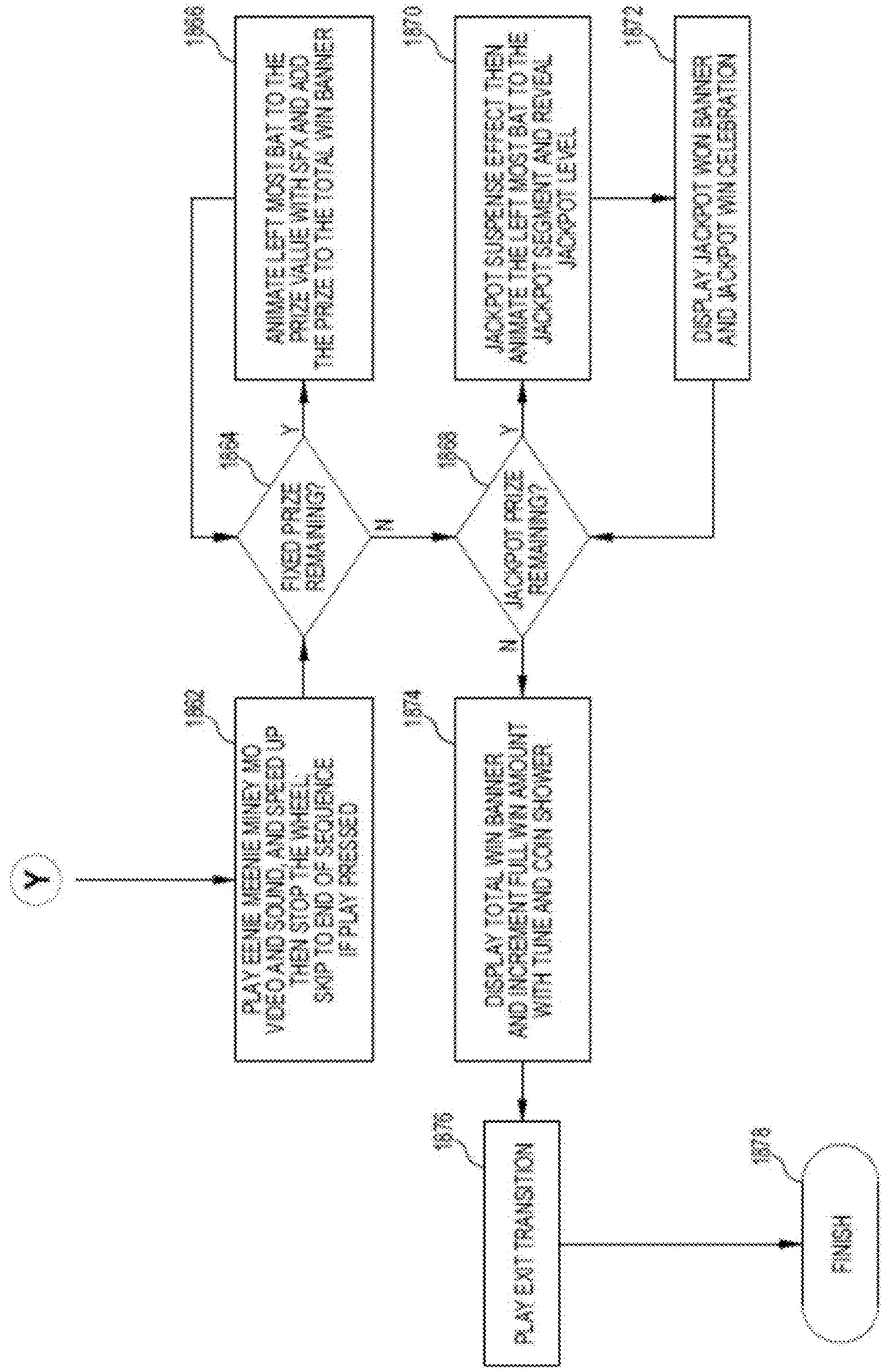

FIGS. 18A to 18C show a flow chart 1800 which shows how the above voice-over message method can be integrated into game play that incorporated the above described Jackpot Bonus feature using bats as regular index symbols and flaming bats as increment symbols. At step 1802, the game starts and a base game is conducted which involves spinning the reels 1804 and playing anticipation sounds if any Jackpot Bonus symbols appear. At step 1806, it is determined whether two Jackpot Bonus symbols appear on either game window 129A,129B. If not, the process finishes at step 812. If two Jackpot Bonus symbols appear, an extended reel spin is implemented by the processor 204 at step 1808 which includes controlling a speaker to output anticipation sounds. At step 1810, the processor 204 determines whether a third Jackpot Bonus symbol has landed in either game window 129A, 129B. If not, the process finishes at step 812.

When there is a third Jackpot Bonus symbol, at step 1814 the processor 204 controls display 240 to output a Jackpot Bonus symbol animation and the remaining reels are spun to a stop. At step 1816, processor 204 controls display 240 to output is a further Jackpot Bonus symbol animation. Payouts are made by the processor 204 for the base game at step 1818. A transitional animation is displayed at step 1820 to move, for example, to the display screen 1000 shown in FIG. 10.

At step 1822, it is determined by the processor 204 whether play has been pressed in order to initiate the Jackpot Bonus feature game. At step 1824, a jackpot feature transition animation is played before going into a looping idle state. At step 1826 it is determined whether 20 seconds have passed. If 20 seconds have passed, then the next voice-over message from the "wait for input" list described above is played. When the list is depleted at step 1830, that is, each of the voice-over messages has been inhibited from play, a reset condition is met and, at step 1832, the processor 204 returns to the start of the list. When it is determined at step 1834 that a player input has been received, then the number of spins on the spin counter is set to 3 at step 1836 by the processor 204.

Referring to FIG. 18B, at step 1838, there is a loop during which processor 204 determines whether play has been pressed by the player. At step 1840, the processor 204 randomly assigns at least the increment reel strips across the second symbol positions. That is, the processor 204 uses random number generator 212 to randomly assign the increment reel strips to specific ones of the second symbol positions. The index reel strips are assigned to remaining second symbol positions. In an alternative embodiment, both the index and increment reel strips are assigned randomly to second symbol positions. At step 1842, all bats (normal or flaming) are held and the remaining reels are spun. On the first spin, there will be no held bats from a previous spin and hence all reels are spun by processor 204.

At step 1844, the processor 204 controls a speaker to play a random voice-over message in accordance with the number of bats displayed and remove the played voice-over from the list.

At step 1846, the processor decreases the spin count by one and the process loops back to step 1838 until the number of spins is determined by the processor 204 to be 0 at step 1848.

At step 1850, it is determined by processor 204 whether there are no held bats. If there are no held bats, the processor 204 randomly awards an increment bat or an index bat to one of the second symbol positions. In an alternative, one of the reels is constructed to ensure at least one bat is awarded by being occupied by a bat or a flaming bat symbol at each position.

At step 1854, the processor sets a counter to the number of level-up (increment) bats on the screen and at step 1856, the processor 204 determines whether a number of level-ups is greater than 0. If the answer is yes, the processor 204 upgrades the wheel to the next level and decreases the level-up counter by one at step 1860. As each level-up is applied, the flaming bat symbol that caused that level-up is transformed into a normal bat symbol to indicate that the level-up associated with the flaming bat has been applied. In one example, the flames are animated as moving from the bat to the wheel.

In this way, the player sees the prize wheel increment multiple times if there is more than one level-up. This adds to the excitement of the game and also assists the player to relate leveling-up of the wheel to the appearance of the flaming bats, and hence understand operation of the game.

Referring to FIG. 18C, at step 1862 after all the level-ups have been applied, the processor controls the speaker to play an "Eenie, Meenie, Miney, Mo" video and sound and then spins the prize wheel to a stopping position that the processor selects. At step 1864, award of the prizes from the prize wheel begins by the processor 204 using an index process, e.g., a process such as that discussed earlier herein in which various indexing symbols have been randomly held at various second symbol positions to indicate first symbol positions which will, when the prize wheel stops, provide indicated awards to the player. At step 1864, the processor 204 determines whether there is a fixed prize remaining on the wheel that has been indexed. If there is, at step 1866 the processor 204 animates the left most bat which is acting as an index to the prize value and adds the prize to a total win banner. The process loops through steps 1864 and 1866 until all fixed prizes have been awarded.

At step 1868, the processor determines whether there are any jackpot prizes remaining and, at step 1870, animates the wheel segment corresponding to the left-most bat that corresponds to a jackpot to reveal the jackpot prize. At step 1872, an animation shows award of the jackpot. The process iterates through steps 1868-1872 until all jackpots have been awarded.

At step 1874, a total win is displayed on display 128 before an exit animation is displayed at step 1876 and the feature game finishes at step 1878.

It will be appreciated from the above that the combination of the indexing technique for awarding both prize wheel increments and prizes from a prize wheel in combination with tailored voice-over messages provides a very rich experience to the player as there are complex combinations of index symbols and increments that can arise and the process of collecting the index symbols can vary at least in terms of the voice-overs that accompany it in significant ways because of the different voice-over messages that will be played in different contexts.

Figure 19A:
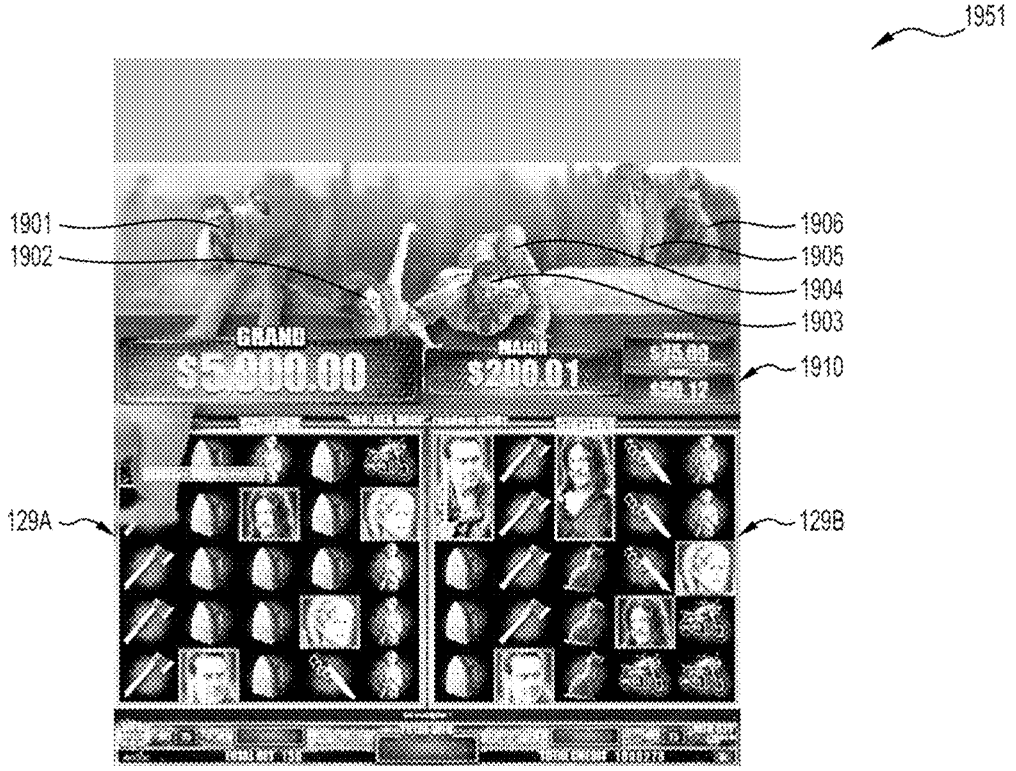
FIGS. 19A through 19C are screen displays of an embodiment.
Figure 19B:
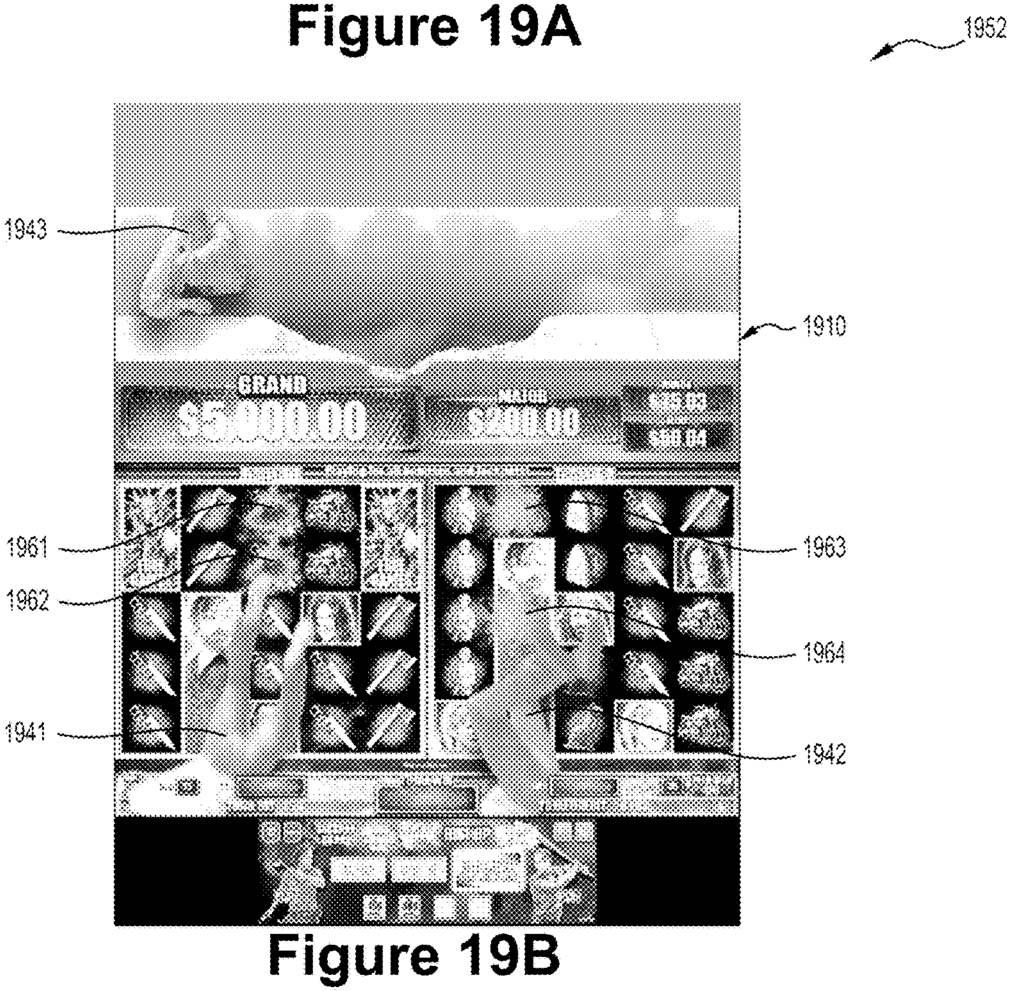
Figure 19C:
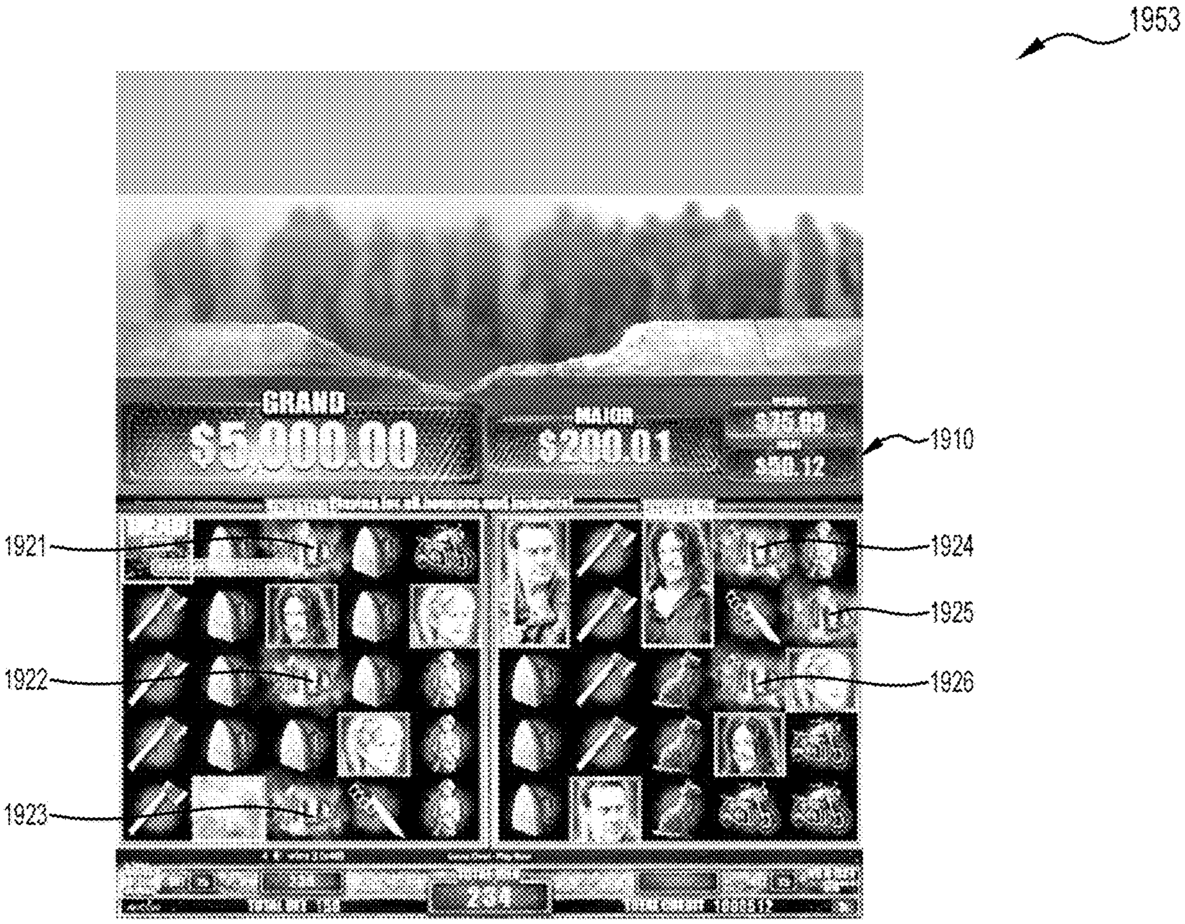

FIGS. 19A, 19B and 19C are screen displays of an embodiment of the "Walker Drop" feature that is added by selecting either the second or third wagering option using the user interface illustrated in FIGS. 5A to 5C.

Figure 21A:
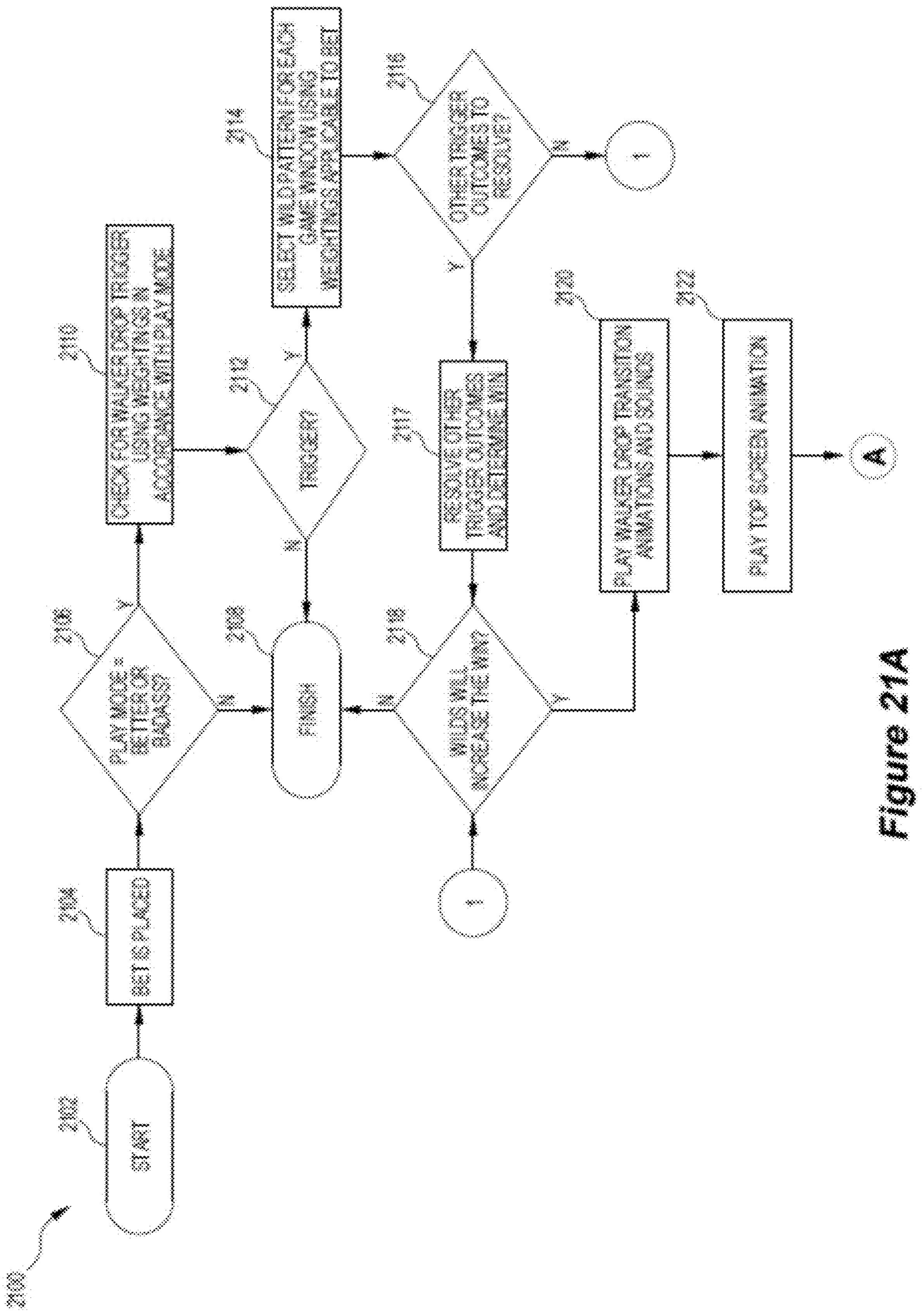
FIGS. 21A and 21B show a flow chart of an embodiment.
Figure 21B:
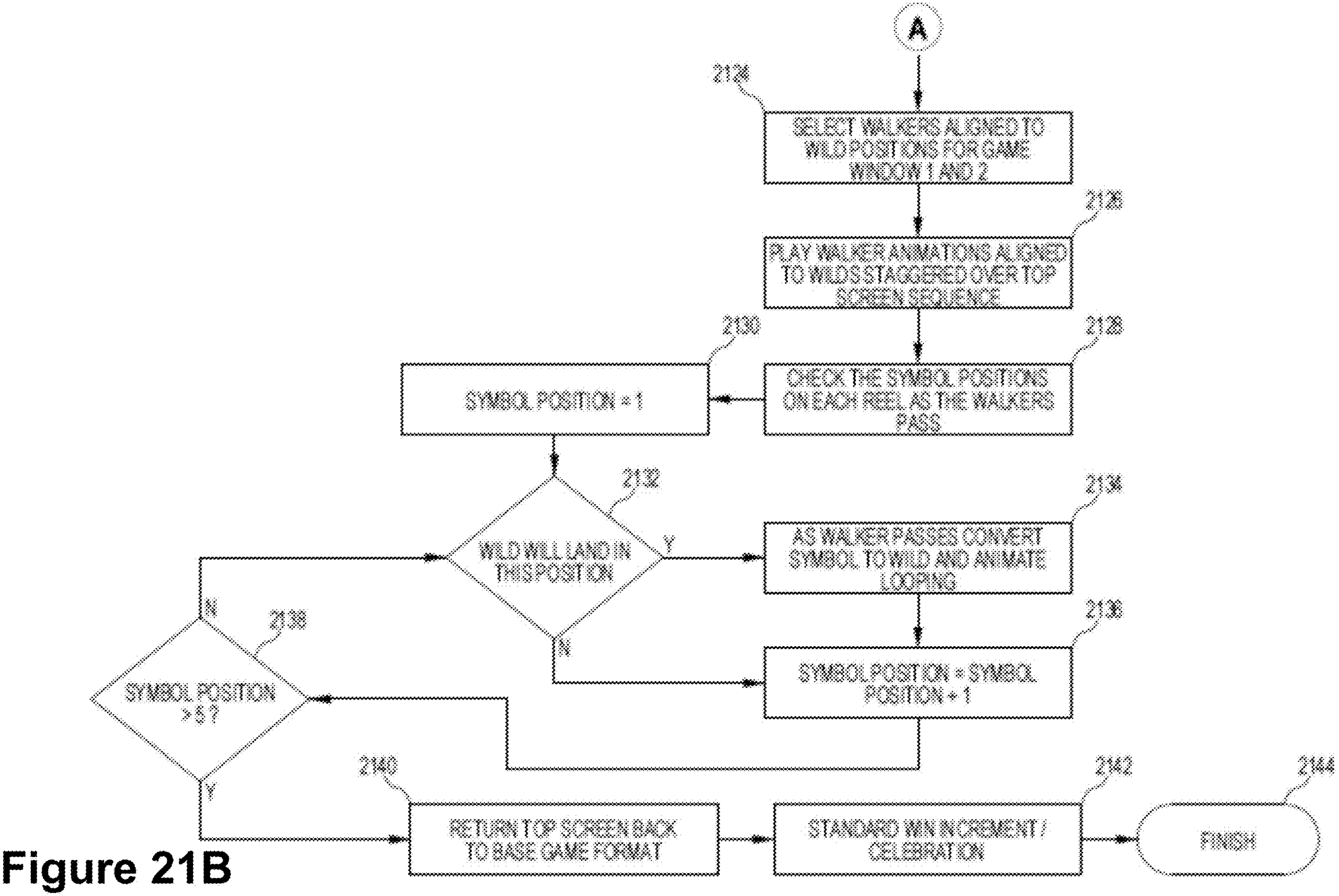

A flow chart 2100 of the method implemented by the processor 204 in order to implement the "Walker Drop" feature is shown in FIGS. 21A and 21B. The process starts at step 2102. At step 2104, a bet is placed by the player. At step 2106, the processor 204 determines whether the selected wagering option is the second or third wagering option. That is, whether the player has selected the "Better" or "Badass" wagering options. If the answer is no, the process finishes 2108 as the "Walker Drop" feature is not activated. If the player has selected the second or third wagering options, at step 2110, during each play of the game, the processor checks whether a "Walker Drop" trigger is met using weightings stored in memory 208 which are associated with each of the play modes.

In one example, the weightings are the same for the "Better" and "Badass" wagering options, for example, a 1 in 40 chance of the play mode being triggered. In other examples, the weightings are different for each of the "Better" and "Badass" wagering options, e.g., a 1 in 40 chance of the play mode being triggered for the "Better" wagering option selection and a 1 in 30 chance of the play mode being triggered for the "Badass" wagering option selection. In order to determine whether the trigger is met, on each play of the game, the processor 204 uses RNG 212 to conduct a random determination. Ranges of values that can be returned by the RNG 212 are assigned to the outcomes in order to achieve the desired probability and the value returned by RNG 212 is compared to the assigned ranges to determine whether to trigger the "Walker Drop" feature.

At step 2112, the processor 204 determines whether a trigger has occurred and if not, the process finishes at step 2108. Upon the trigger condition being met at step 2112, the processor 204 selects, at step 2114, a WILD pattern for each gaming window 129A, 129B using weightings assigned to each WILD pattern in one or more sets of WILD patterns; in some embodiments, the weighting may be at least partially based on the bet. In the embodiment, the same weightings are applied to each WILD pattern irrespective of whether bets are placed under the "Better" or "Badass" wagering options. In other embodiments, the weightings assigned to particular WILD patterns are different depending on the player's selected wagering option.

Figure 20A:
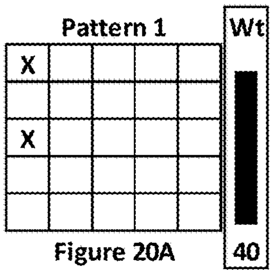
FIGS. 20A through 20AS illustrate a number of example WILD patterns.
Figure 20B:
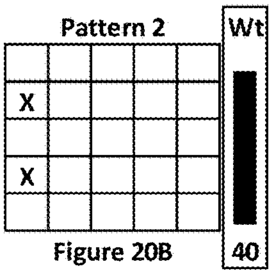
Figure 20C:
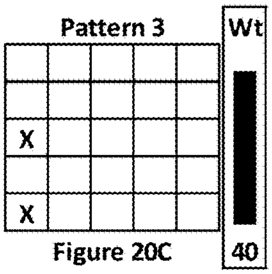
Figure 20D:
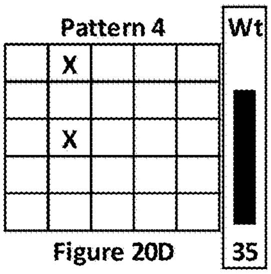
Figure 20E:
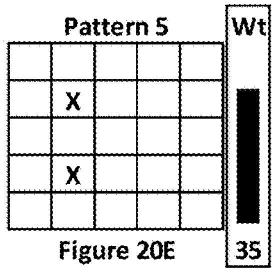
Figure 20F:
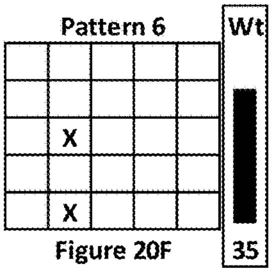
Figure 20G:
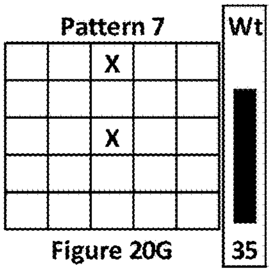
Figure 20H:
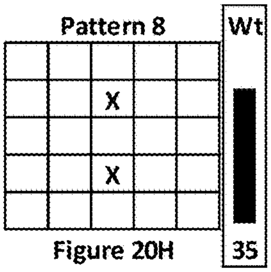
Figure 20I:
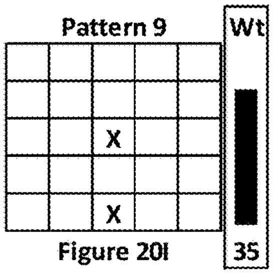
Figure 20J:
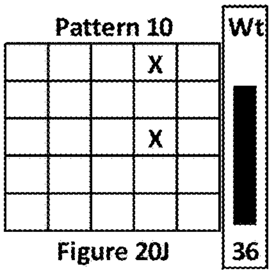
Figure 20K:
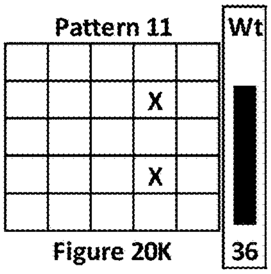
Figure 20L:
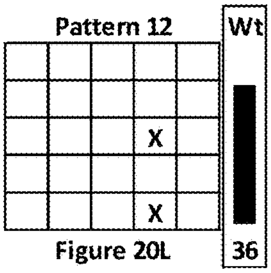
Figure 20M:
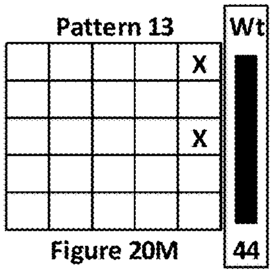
Figure 20N:
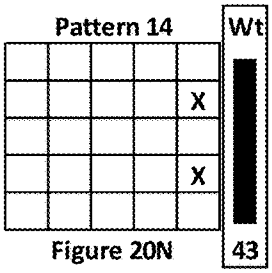
Figure 20O:
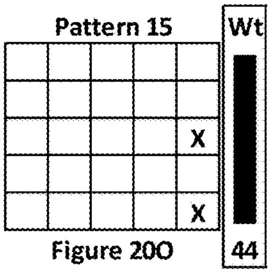
Figure 20P:
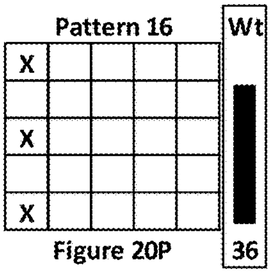
Figure 20Q:
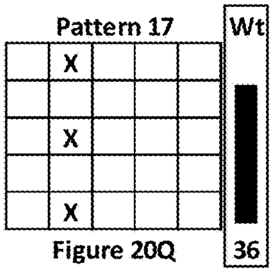
Figure 20R:
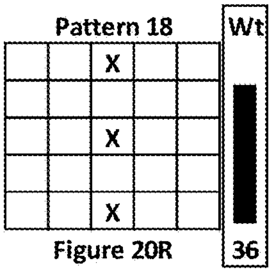
Figure 20S:
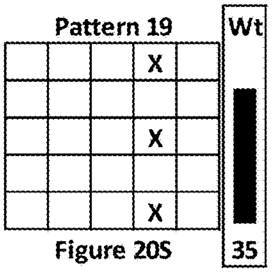
Figure 20T:
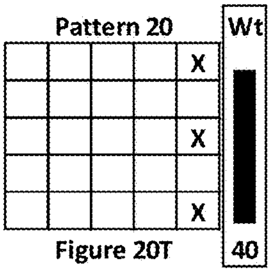
Figure 20U:
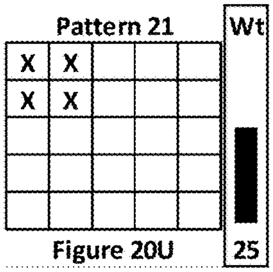
Figure 20V:
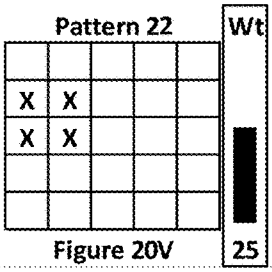
Figure 20W:
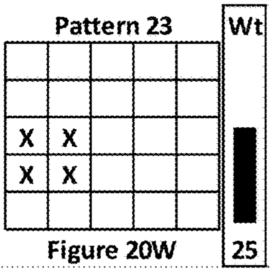
Figure 20X:
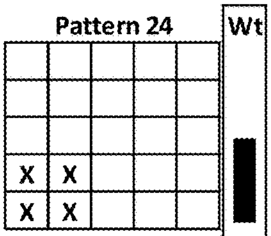
Figure 20Y:
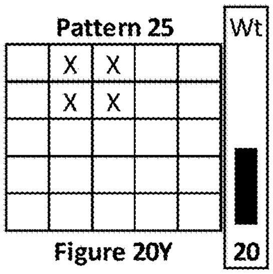
Figure 20Z:
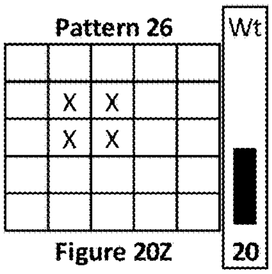
Figure 20A:
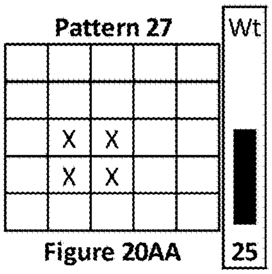
Figure 20A:
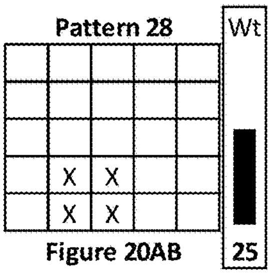
Figure 20A:
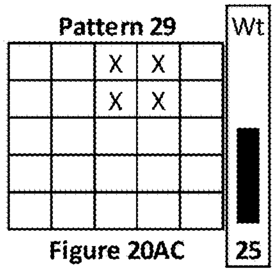
Figure 20A:
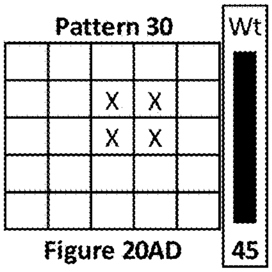
Figure 20A:
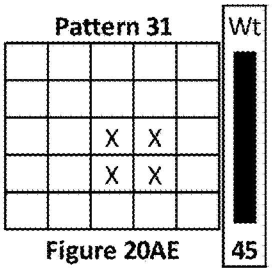
Figure 20A:
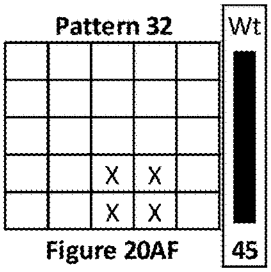
Figure 20A:
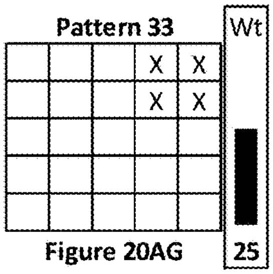
Figure 20A:
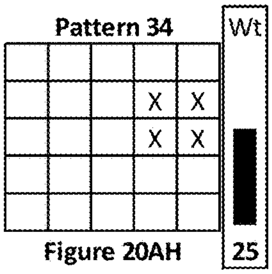
Figure 20A:
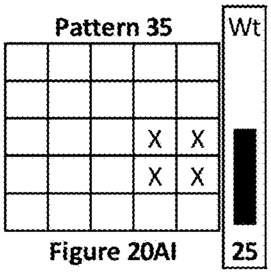
Figure 20A:
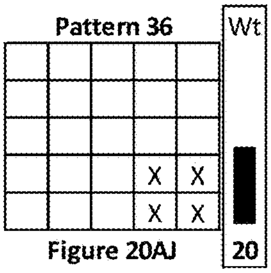
Figure 20A:
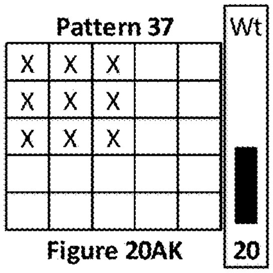
Figure 20A:
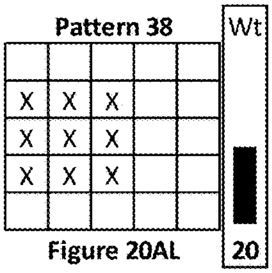
Figure 20A:
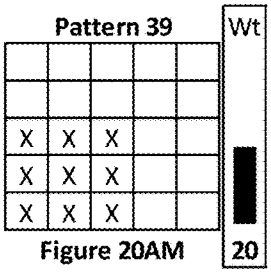
Figure 20A:
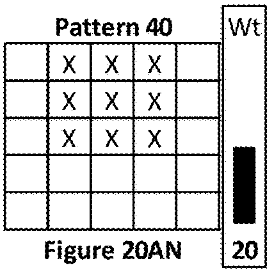
Figure 20A:
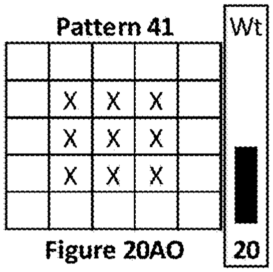
Figure 20A:
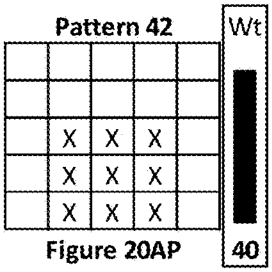
Figure 20A:
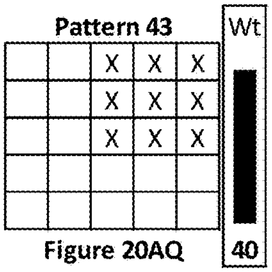
Figure 20A:
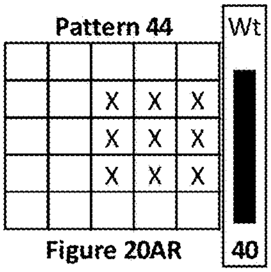
Figure 20A:
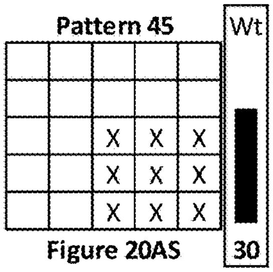

FIGS. 20A to 20AS shows patterns 1 to 45 respectively—i.e., a set of 45 example WILD patterns. Each WILD pattern is dimensioned to correspond to the symbol positions of a gaming window 129A,129B. Each depicted pattern of FIGS. 20A to 20AS is for a 5×5 array of symbol positions and includes an example weighting for that pattern in the "Wt" rectangle to the right of the corresponding Figure. The black bar in each "Wt" rectangle shows, for ease of observation, the relative magnitudes of the weightings, with the largest bars, e.g., in FIGS. 30-32, corresponding to weightings of 45 and the smallest bars, e.g., in FIGS. 25,26, and 36-41, corresponding to weightings of 20; the total value of the weightings for all 45 WILD patterns depicted is 1444. The "X"s in each WILD pattern define in which symbol positions a WILD will be added to the symbol array in each window 129A,129B.

Using patterns, rather than random allocation of the WILDS, assists the gaming device to present the game graphically as it will be described in relation to FIGS. 19A-19C as the WILD symbols can be clustered within the patterns in a way that can fit into a thematic animation. Further, the use of arrangements or particular clusters of symbols can make it clear to the player that when they have achieved a strong cluster of symbols, i.e., one where a lot of symbols are clustered together in the game window(s), a greater enhancement has been made to their game outcomes than where there is a wide spread of the symbols across the game window(s). The use of a set of patterns from which a random selection is made enables the preservation of a random aspect in respect of selection of the pattern but also prevents the game from becoming repetitive. Further, it allows fine grained control over the impact of patterns on the game by enabling individual weightings to be assigned to each pattern.

It will be appreciated that patterns which provide WILD symbols that are closer to the left hand side provide a greater benefit in a game where wins are evaluated left to right, e.g., such as a game that uses "reel power" or "ways" to determine winning symbol combinations (as used in the current example game). Thus, in general, a lower weighting (i.e., lower frequency) gets applied to similar patterns closer to the left hand side of either game window (for left to right paying game), patterns with higher number of wild symbols, and patterns with wilds on the same or adjacent reels (for reel power/ways to win games, e.g., such as are discussed in U.S. Pat. No. 6,093,102, which is hereby incorporated by reference herein in its entirety; for clarity, the terms "reel power" and "ways" are trade names used to refer to features such as those described in U.S. Pat. No. 6,093,102 but are not necessarily used in the text of U.S. Pat. No. 6,093,102) or patterns with wilds on adjacent reels on the same line/row (for payline based games)

However, the weightings of individual patterns do not need to be directly proportional to the how much benefit the pattern is expected to deliver. Instead, weightings of patterns can be adjusted in accordance with the desired hit rates and RTP.

Referring to FIG. 21A, after the WILD patterns have been selected, the processor 204 determines, at step 2116, whether other trigger outcomes have been resolved and, if so, it resolves 2117 trigger outcome(s) and determines any win resulting therefrom before taking further action. The processor 204 determines at step 2118 whether the WILDS will increase the win amount from this play of the game. More specifically, the processor 204 determines independently for each window whether the displayed WILDS will increase the amount won in either window. In this respect, increasing a win includes both improving existing winning combination or creating a winning combination where no winning combination previously existed.

If the displayed WILDS will increase the win, the processor 204 proceeds to step 2120 and plays a "Walker Drop" transition animation (e.g. randomly selected from a list of suitable animations) and sounds followed by a top screen animation 2122 as shown by screen display 1951 in FIG. 19A. Here, walkers (zombies) 1901-1906 are shown in the top screen 1910 portion of the screen display 151 as moving towards a ledge, thus conveying to the player that the walkers are about to fall.

FIG. 19B shows an example of walkers falling. Note, this example of the walkers falling is shown in relation to a different set of underlying symbols but a similar animation may be played to show the walkers 1901-1906 falling when transitioning between FIGS. 19A and 19C.

Referring again to FIG. 19B, a first walker 1941 and a second walker 1942 are shown as already having fallen. Blood splatters 1961-1962 are shown on the screen at the portion of the columns through which they have fallen. That is, two blood splatters are added in the middle reel of game window 129A and two blood splatters are shown in the second-from-left column in reel window 129B.

A further walker 1943 is about to fall and add additional blood splats. These blood splats are then transformed by processor 204 into WILD symbols once the walker finishes their fall. It will be apparent that these blood splatters correspond to the selected WILD symbol patterns as shown in FIGS. 20A-20AS.

In order to achieve this, the processor 204 selects walkers from a set of animations of walkers that are aligned to where the WILD positions are in each of the windows. In one example, the processor selects 2124 a walker for each column that has a WILD symbol in the relevant WILD pattern, such that the walker falls down in front of the column and leaves one or more blood splats that are eventually turned into WILD symbols.

At step 2126, animations are played of the walkers moving towards the columns and falling over the edge and down the front of respective columns.

At step 2128, the processor checks the symbol positions on each reel as the walkers pass by initially setting a symbol position counter to 1 at step 2130 and determining at step 2132 whether a WILD will land in this position. If the answer is yes, as the walker passes, the processor 204 converts the symbol to a WILD, first as a blood splat and then as the WILD symbol itself, e.g., 1921-1926 as shown in FIG. 19C. The processor then increments the symbol position counter at step 2136. At step 2138 the processor 204 determines whether all of the symbol positions have been checked so that the process loops through steps 2132, 2134, 2136 until WILDS have been added in accordance with the WILD pattern. At step 2140, the top screen is returned back to a normal view, and at step 2142, wins are evaluated by the processor 204 before the game finishes at step 2144. It is noted that step 2140 may occur after step 2142. In the embodiment, wins are evaluated by the processor using a ways to win evaluation technique (also known as "Reel Power"). That is, working from left to right, any symbol at any position in the column can be used to form a winning combination.

In another example embodiment, the WILDS could be added to the display irrespective of whether they improve the winning outcome. An advantage of this method is that the player can more readily see that they have achieved a trigger in accordance with the feature selected by the wagering option. That is, that the wagering option is having an effect. A disadvantage is that it may be confusing to the player that they have not received a winning outcome notwithstanding the addition of a WILD pattern to the underlying symbols.

Further, in some examples, additional steps are taken to ensure that WILD symbols added to the display do not prevent another feature from being activated. For example, the free game feature may be activated by a set of scatter symbols appearing in one or both of the windows. In such examples, the processor 204 animates the position at which the WILD is added to change between the WILD and the scatter symbol. Further, in the example embodiment pays are only made for winning combinations after the WILD pattern has been added. In other examples, pays could be made both before and/or after the WILD symbols are added. However, as this would impact the return to player, less desirable winning patterns would need to be provided in such an embodiment in order to retain an appropriate level of return to player.

Figure 22:
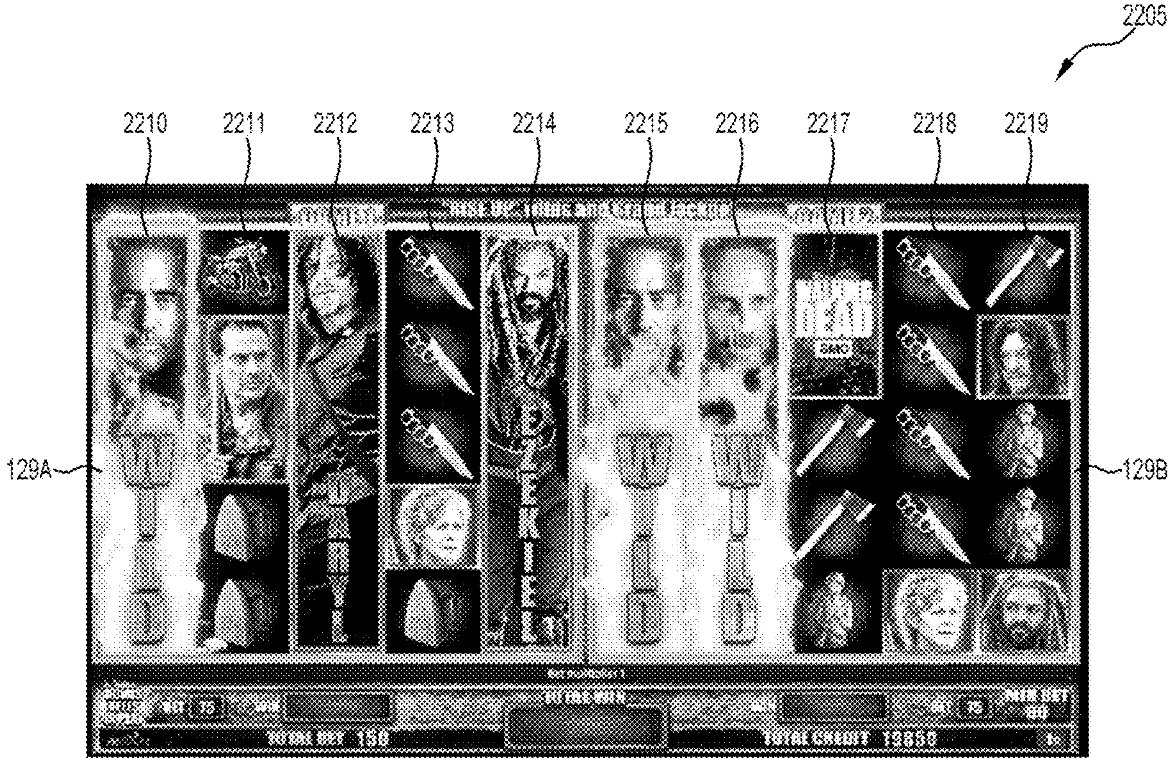
FIG. 22 is a screen display of an embodiment.
Figure 23:
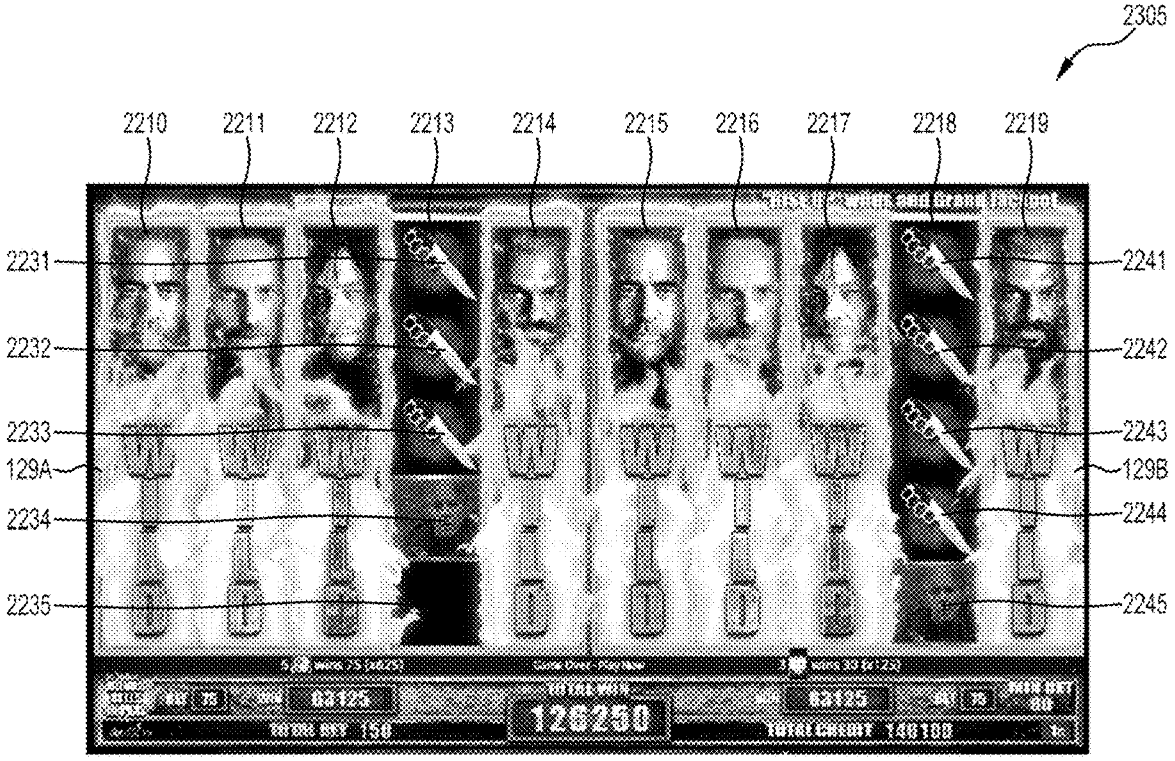
FIG. 23 is a screen display of an embodiment.

The "Rise Up" feature selectable by the "Badass" wagering option is shown in relation to FIGS. 22 to 24. As shown in the flowchart of FIG. 24, the processor 204 starts a game at step 2505 and spins the reels at step 2510. The "Rise Up" feature is caused to be provided by the processor 204 when at least one of the 5×1 character symbols described above lands so that it is entirely displayed within a game window, that is, it occupies all 5 positions of a column of symbol positions. Accordingly, if a 5×1 character symbol is going to land such that it spans all 5 positions in a column, an anticipation sound may be played during the reel spin at step 2510. At step 2515, the processor 204 determines whether one or more 5×1 character symbols have landed in full. If not, the game ends 2520.

As explained further below, if a 5×1 character symbol lands, the character symbol (or the stack of character symbols that the 5×1 character symbol represents) can be duplicated by the processor 204 from one game window of game windows 129A, 129B to another. If, after this duplication is complete, all columns of both windows are entirely populated by 5×1 character symbols then a designated bonus award is made. In this example, a "Grand Jackpot." Before, the processor 204 carries out this duplication, the processor 204 first checks at step 2525 whether there are other trigger outcomes to resolve (e.g., for free games, although the trigger for the "Walker Drop" feature may be disabled), and if there are other trigger outcomes to resolve, the processor 204 resolves them at step 2530. It will be understood that while the example implementation features two game windows, similar features may be provided with gaming machines that offer three, four, or more game windows. In some such implementations, criterion-meeting selected symbols from a particular column may be replicated in the corresponding column(s) of all of the other display windows (or at least in those corresponding columns of those other game windows that do not, themselves, have criterion-meeting selected symbols). In some alternative such implementations, there may be limited replication of criterion-meeting selected symbols. For example, in one implementation, if there are three game windows arranged end-to-end in a line, criterion-meeting selected symbols for a column in any of those three display windows may only be replicated in the corresponding columns of an adjacent game window (or game windows, if in the center game window). Thus, a column of criterion-meeting selected symbols in the left-most game window may be replicated in the corresponding column of the center game window but not replicated in the corresponding column of the right-most game window. Similarly, a column of criterion-meeting selected symbols in the right-most game window may be replicated in the corresponding column of the center game window but not replicated in the corresponding column of the left-most game window, and a column of criterion-meeting selected symbols in the center game window may be replicated in the corresponding columns of both the right-most and the left-most game windows. In some such implementations, the columns of selected symbols in the center-most game window may be evaluated for potential replication in the other two game windows before the columns of the selected symbols in the left- and right-most game windows. This may prevent the center game window from "passing on" replicated columns of symbols from the left-most game window to the right-most game window.

In another similar implementation, an EGM may provide a 2×2 array of game windows, and a column of criterion-meeting selected symbols may be replicated in the corresponding columns of the game windows that are either in the same row of game windows or the same column of game windows. Thus, for example, if a column of criterion-meeting selected symbols is identified in the lower right game window, those criterion-meeting selected symbols may be replicated in the corresponding columns of the upper right game window and the lower left game window, but not the upper left game window. In such implementations, the determination of which columns of symbols may be replicated in corresponding columns of other game windows may be performed for all game windows before any of those columns are actually replicated, thereby avoiding the possibility that, for example, a column of criterion-meeting selected symbols in the lower-right game window will be replicated into the corresponding columns of the upper-right and lower-left game windows, and then, from there, be replicated into the corresponding column of the upper left window.

In yet another implementation, an EGM may provide a 3×3 or larger array of game windows, and criterion-meeting selected symbol replication for such implementations may be carried forth as discussed above, although with some potential differences. For example, instead of replicating a column of criterion-meeting selected symbols in a game window into the corresponding columns of the game windows in the same column and row of game windows as that game window, a more restrained replication process may be practiced in which the column of criterion-meeting selected symbols is only replicated into the corresponding column or columns in those game windows in the same row or column of game windows as that game window and that are also directly adjacent to that game window, i.e., with no other game window in between them and that game window. In other implementations, the replication of columns of criterion-meeting selected symbols may be carried forth for all game windows of in the same column or row of game windows.

As described above, the 5×1 symbols are specific character symbols associated with each of the columns of symbol positions. In the "Rise Up" feature, these 5×1 character symbols will be modified to act as wild symbols if an entire 5×1 character symbol is displayed in a given column. As can be seen in FIG. 22, a special animation is applied to add the word WILD and flame graphics are around the characters to show that they are now acting as wild symbols. As a result, there are likely to be additional or enhanced winning combinations resulting from the modification of the character symbol into a wild symbol, so that even if the player does not win the "Grand Jackpot," they will likely gain a benefit from having activated the "Rise Up" feature. Further, as the 5×1 character symbols may only be modified to wild symbols if they land in full (i.e. occupying all symbol positions of a column and when the "Rise Up" feature is active), it is possible to have multiple 5×1 stacks of symbols on a given reel.

In the game state captured in FIG. 22, the WILD animation has been applied to the 5×1 character symbols in columns 2210, 2215 and 2216 but is yet to be applied to the 5×1 character symbol shown in columns 2212 and 2214. This is because, as explained in relation to the flow chart of FIGS. 24A and 24B below, there is a specific evaluation order which is implemented by the flow chart 2500.

Figure 24A:
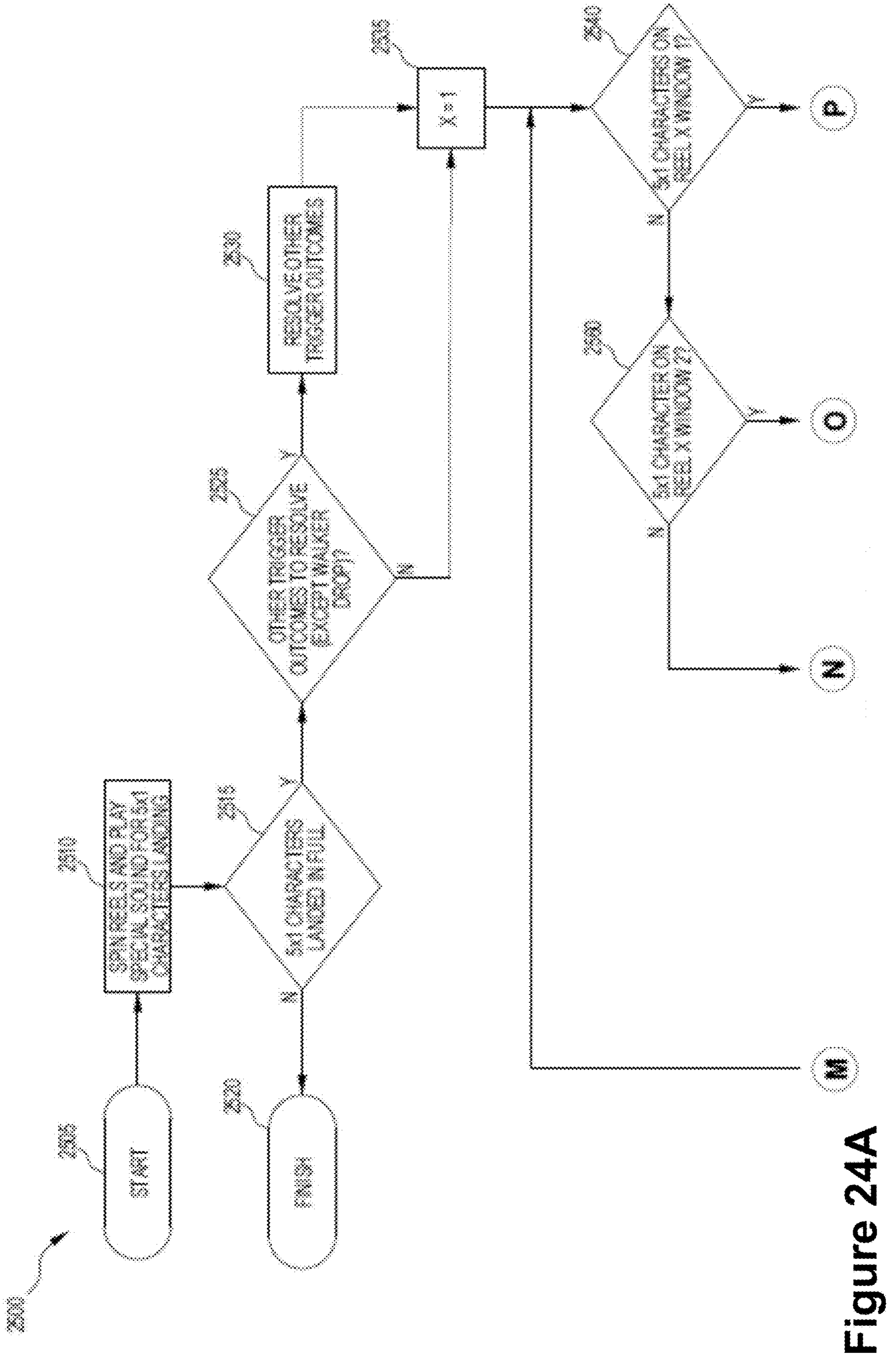
FIGS. 24A and 24B show a flow chart of an embodiment.
Figure 24B:
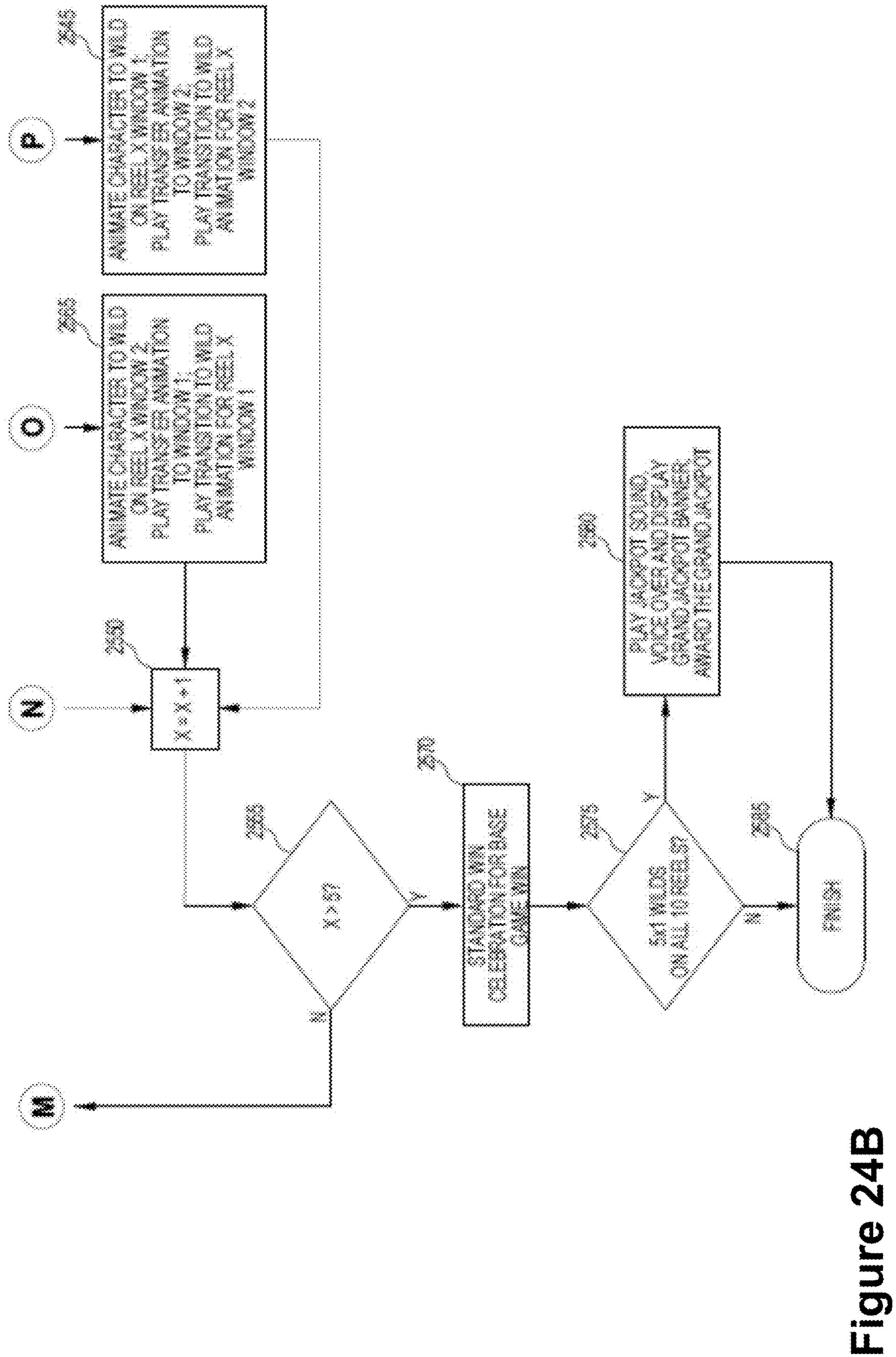

In particular, the process involves evaluating the first reel or column of symbol positions 2210 of the first game window 129A then the first reel 2215 of the second game window 129B before then proceeding to the second reel 2211 of game window 1 and then the second reel 2216 of game window 2. This process proceeds by evaluating the reels of each window in order such that the last reel to be evaluated will be the fifth reel of game window 2. As shown in the flowchart of FIGS. 24A and 24B, at step 2535, the processor sets a reel counter and at step 2540, the processor determines whether a 5×1 character is displayed on reel X in window 1. At the first instance X=1 is set at step 2535 so that the first reel will be evaluated. If the answer is yes at step 2540, the processor applies the special animation described above and then plays a transition to a WILD animation for the corresponding reel in window 2. Referring to FIG. 22, it will be apparent that a WILD symbol animation has been applied in the first column of symbol display positions 2210 and has been transferred to the first column of symbol positions 2215 in the second window.

It will be apparent that an alternative embodiment may take into account the fact that a 5×1 character symbol may already be displayed concurrently in both columns 2210 and 2215 and that an alternative animation can be played at this time. For example, turning both 5×1 character symbols into the special 5×1 Wild symbol simultaneously.

If at step 2540 there is not a 5×1 character on the first reel of the first window, the processor 204 will then determine at step 2560 whether there is a 5×1 character on the corresponding first reel in window 2 and if so, it animates the character to a WILD at step 2565. FIG. 22 shows where this has occurred in respect of the second reel 2216 of the second window 129B at the point where the character symbol has been animated to include the burning WILD animation. This WILD symbol will then be transferred to column 2211.

The process loops until all of the columns have been checked to see if they are occupied by 5×1 symbols as determined by X being >5 at step 2555.

FIG. 23 corresponds to a screen display 2305 at this stage of the game. It will be apparent that at this point of the game there are WILD symbols in each of columns 2210, 2211, 2212, 2214, 2215, 2216, 2217 and 2219.

At step 2570, a win evaluation is carried out based on the outcome.

In FIG. 23, the first game window 129A shows winning outcomes related to the knife symbols 2231, 2232 and 2233 being awarded. As the other symbols 2234,2235 also combine with the WILD symbols to form winning combinations, their awards will be shown during a separate animation. The second game window also shows the awards based on the knife symbol awards for knife symbols 2241, 2242, 2243 and 2244. The awards for the remaining symbol 2245 will be displayed separately.

At step 2575, the processor determines whether there are 5×1 WILD symbols on all reels and if so, the processor plays a jackpot sound and a relevant voice-over and displays the Grand Jackpot banner while awarding the Grand Jackpot. In one example, the Grand Jackpot is the largest available progressive jackpot. In another example, the Grand Jackpot is the largest fixed prize. At step 2585, the process finishes.

It will be appreciated that embodiments of the disclosure have the potential to award the Grand Jackpot with a minimum of five character symbols being selected and also provides an entertaining interaction between the two game windows.

Figure 25:
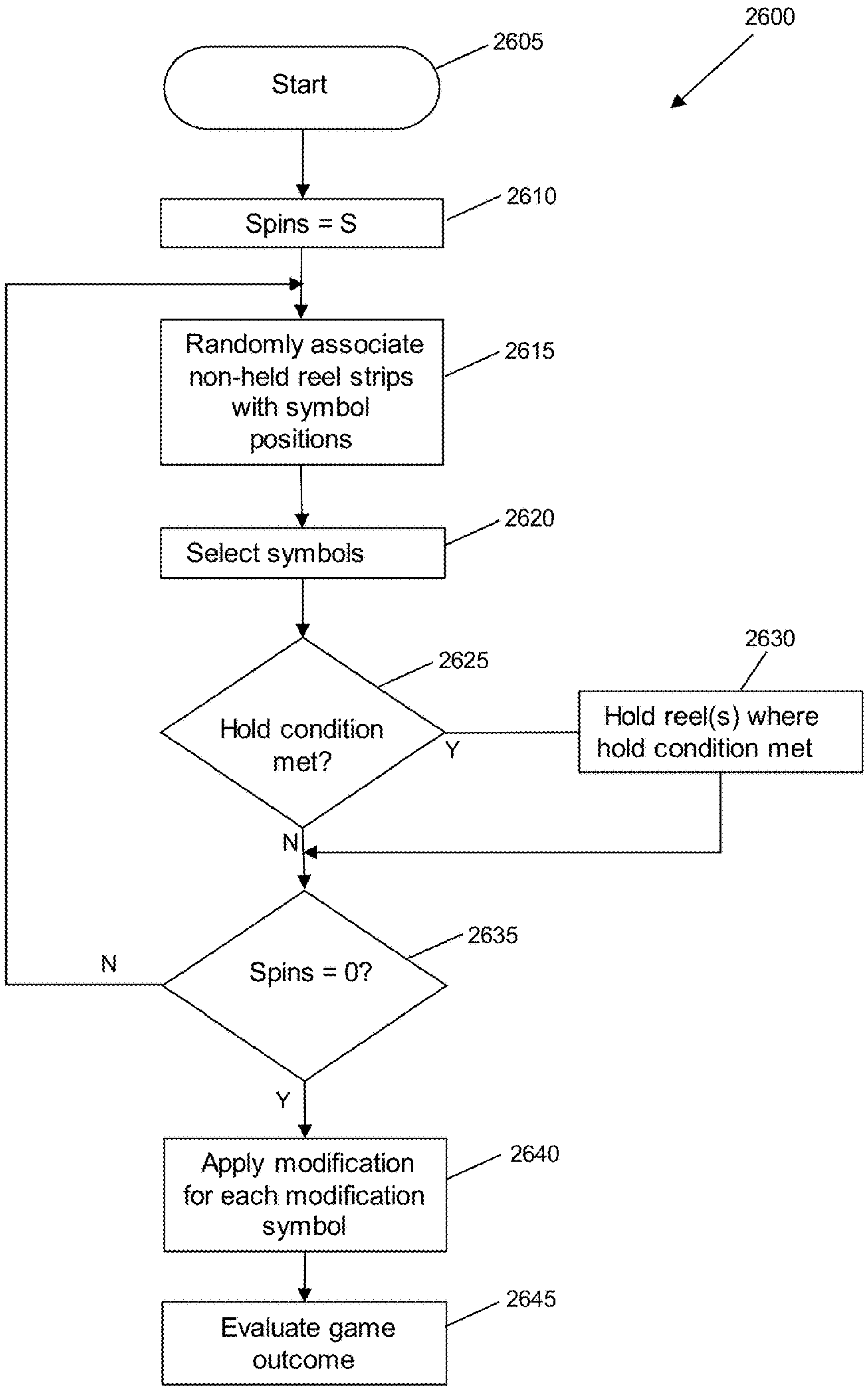
FIG. 25 is a flow chart of an embodiment.

FIG. 25 is a flowchart 2500 of a further method of operating a gaming device, where the gaming device implements a hold and spin game, for example, as a feature game. At step 2605, the processor 204 starts the hold and spin game and at step 2610 sets a spin counter to a number S of spins. In an example, the number of spins is fixed. In another example, the number of spins may be determined or modified by the outcome of the spins. For example, the appearance of a particular symbol may add a spin to the counter or reset the counter.

At step 2615, the processor 204 randomly associates a set of reel strips with a set of symbol positions. In an example, the association between reel strips and set of symbol positions may be with single symbol positions as described in relation to the "Jackpot Bonus" feature above. In other examples, the association may be with a column of symbol positions. The random association can be performed using the techniques described above.

A subset (Y) of the set of N reel strips have game play modification symbols; the remaining X reel strips of the set of N reel strips do not. This caps or limits the number of sets of symbol positions from which a game play modification symbol can be selected as once any of the Y reel strips are held, they cannot be selected from again during a play of the feature game. This is advantageous in a hold and spin type game as it allows a desired number of game play modifications to be offered for potential use without a particular game play modification symbol (or the game play modification associated therewith) being associated with a specific subset of symbol positions. For example, in the "Jackpot Bonus" feature, it controls the number of prize wheel increments that may potentially be won by a player during play of the feature game. It may be desirable, for example, to have only as many reel strips having a game play modification symbol on them as there are potential prize wheel increments available; this may avoid a scenario where a player uses up all of the prize wheel increments by obtaining a corresponding number of game play modification symbols during reel spins and then obtains an additional game play modification symbol that has no effect (since all prize wheel increments have already been used). By randomly assigning the reel strips to different symbol positions (or columns), the potential location of any potential game play modification symbol may not be predictable. To the player, it may appear that any of the reel strips has the opportunity to provide a game play modification symbol, but for any given spin of the reels, only a subset of the reel strips may offer such a possibility.

At step 2620, the processor 204 selects symbols for display, for example, using the technique outlined in respect of FIGS. 3 and 4 above.

At step 2625, the processor 204 determines whether a hold condition is met. One hold condition is that a game play modification symbol is selected for display. However, there may also be hold conditions for the other reel strips, such as the appearance of an index symbol as described above.

At step 2630, each reel strip meeting a hold condition is held in place by processor 204.

At step 2625, the processor 204 determines whether all spins have been conducted. If not, the processor 204 returns to step 2615 and randomly associates non-held reel strips with symbol positions. As a result, held reels are effectively removed from the set from which reel strips can be selected. As described above in relation to the “Jackpot Feature,” in some embodiments, this step may be bypassed once all reel strips having game play modification symbols on them have been held.

Once the processor 204 determines at step 2635 that all spins have been conducted, at step 2640, the processor applies a modification for each game play modification symbol that is displayed in a symbol position. As described above, the timing of the application of the modifications can be varied. For example, if the modification were to be a multiplier applied to wins and wins were evaluated after each spin, the modifications would be applied before conducting the next spin.

At step 2645, the processor 204 evaluates the game outcome based on the applied modification.

It will be understood that the present disclosure includes, but is not limited to, at least the following numbered implementations.

Implementation 1: A gaming device including: a user interface including a plurality of feature indicators associated with respective ones of a plurality of features of a game playable with the gaming device; a processor; and memory storing instructions which when executed by the processor, cause the processor to: receive a selection of a wagering option from among a plurality of wagering options, wherein the wagering options comprise at least two wagering options associated with different subsets of the plurality of features; and control each of the feature indicators to indicate whether or not the feature associated with the feature respective feature indicator is selected by selection of the wagering option.

Implementation 2: The gaming device as implemented in implementation 1, wherein the user interface is operable to initiate a play of the game, and upon play of the game being initiated, the instructions cause the processor to conduct the game with the features corresponding to the selected wagering option activated.

Implementation 3: The gaming device as implemented in implementation 1 or implementation 2, wherein the user interface includes a plurality of buttons that enable selection of the wagering options.

Implementation 4: The gaming device as implemented in implementation 3, wherein the plurality of buttons comprise a button associated with each one of the at least two wagering options associated with different subsets of the plurality of features.

Implementation 5: The gaming device as implemented in implementation 3 or implementation 4, wherein the user interface includes a touch screen display and the buttons are virtual buttons displayed on the touch screen display.

Implementation 6: The gaming device as implemented in implementation 3 or implementation 4, wherein the buttons are physical buttons of a button deck.

Implementation 7: The gaming device of implementations 3 to 6, wherein the feature indicators are located adjacent the buttons.

Implementation 8: A method of operating a gaming device including: providing a plurality of feature indicators associated with respective ones of a plurality of features of a game playable with the gaming device; receiving a selection of a wagering option from among a plurality of wagering options, wherein the wagering options comprise at least two wagering options associated with different subsets of the plurality of features; and controlling each of the feature indicators to indicate whether or not the feature associated with the feature respective feature indicator is selected by selection of the wagering options.

Implementation 9: The method as implemented in implementation 8, including conducting the game with the features corresponding to the selected wagering option activated in response to initiation of a play of the game.

Implementation 10: A gaming system including: a user interface including a plurality of feature indicators associated with respective ones of a plurality of features of a game playable with the gaming device; one or more processors; and at least one memory storing instructions which when executed by the processor, cause the processor to: receive a selection of a wagering option from among a plurality of wagering options, wherein the wagering options comprise at least two wagering options associated with different subsets of the plurality of features; and control each of the feature indicators to indicate whether or not the feature associated with the feature respective feature indicator is selected by selection of the wagering options.

Implementation 11: A gaming device including: a speaker; a processor; and memory storing (a) a plurality of voice-over messages in association with respective ones of a plurality of game events, wherein at least two voice-over messages are associated with a first game event and (b) instructions which when executed by the processor, cause the processor to: conduct a game; determine that the first game event has occurred during conduct of the game; select between the at least two voice-over messages associated with the first game event in accordance with a selection rule associated with the first game event; and play the selected voice-over message using the speaker.

Implementation 12: The gaming device of implementation 11, wherein during continued conduct of the game when the instructions are executed by the processor, they cause the processor to inhibit further selection of the selected voice-over message in response to a further first game event occurring. until a reset condition is met.

Implementation 13: The gaming device of implementation 11, where when the instructions are executed by the processor, they cause the processor to inhibit further selection of the selected voice-over message until a reset condition is met.

Implementation 14: The gaming device of implementation 13, wherein the reset condition is that each voice-over message of the at least two voice-over messages has been played.

Implementation 15: The gaming device of implementation 13, wherein the reset condition is that the game is completed.

Implementation 16: The gaming device of any one of implementations 12 to 15, wherein the selection rule defines an order of selection.

Implementation 17: The gaming device of any one of implementations 11 to 16, wherein the selection rule defines a random selection, and when the instructions are executed by the processor, the processor selects between the at least two voice-over messages by making a random selection.

Implementation 18: A method of operating a gaming device including a speaker and a memory, the method including: conducting a game on the gaming device; determining that the first game event has occurred during conduct of the game; selecting between at least two voice-over messages stored in the memory in association with the first game event in accordance with a selection rule associated with the first game event; and playing the selected voice-over message using the speaker.

Implementation 19: The method of implementation 18, including inhibiting further selection of the selected voice-over message in response to a further first game event occurring.

Implementation 20: The method of implementation 18, including inhibiting further selection of the selected voice-over message until a reset condition is met.

Implementation 21: The method of implementation 20, wherein the reset condition is that each voice-over message of the at least two voice-over messages has been played.

Implementation 22: The method of implementation 20, wherein the reset condition is that the game is completed.

Implementation 23: The method of any one of implementations 18 to 22, wherein the selection rule defines an order of selection.

Implementation 24: The method of any one of implementations 18 to 23, wherein the selection rule defines a random selection, and when the instructions are executed by the processor, the processor selects between the at least two voice-over messages by making a random selection.

Implementation 25: A gaming system including: a speaker; one or more processors; and at least one memory storing (a) a plurality of voice-over messages in association with respective ones of a plurality of game events, wherein at least two voice-over messages are associated with a first game event and (b) instructions which when executed by the one or more processor, cause the one or more processors to: conduct a game; determine that the first game event has occurred during conduct of the game; select between the at least two voice-over messages associated with the first game event in accordance with a selection rule associated with the first game event; and play the selected voice-over message using the speaker.

Implementation 26: A gaming device including: a speaker; a processor; and memory storing (a) a plurality of voice-over messages in association with respective ones of a plurality of game events including a first event and a second event; and (b) instructions which when executed by the processor, cause the processor to: conduct play of a game; upon the first game event occurring during conduct of the game without occurrence of the second event, play a voice-over message associated with the first event using the speaker; and upon the second game event occurring during conduct of the game in conjunction with the first event, play a voice-over message associated with the second event using the speaker.

Implementation 27: The gaming device as implemented in implementation 26, wherein there are a plurality of voice-over messages associated with the first game event.

Implementation 28: The gaming device as implemented in implementation 26, wherein there are a plurality of voice-over messages associated with the first game event.

Implementation 29: A method of operating a gaming device including a speaker, the method including: conducting play of a game; upon the first game event occurring during conduct of the game without occurrence of the second event, playing a voice-over message associated with the first event using the speaker; and upon the second game event occurring during conduct of the game in conjunction with the first event, playing a voice-over message associated with the second event using the speaker.

Implementation 30: The method as implemented in implementation 29, wherein there are a plurality of voice-over messages associated with the first game event.

Implementation 31: The method as implemented in implementation 29, wherein there are a plurality of voice-over messages associated with the first game event.

Implementation 32: A gaming system including: a speaker; one or more processors; and at least one memory storing (a) a plurality of voice-over messages in association with respective ones of a plurality of game events including a first event and a second event; and (b) instructions which when executed by the one or more processors, cause the one or more processors to: conduct play of a game; upon the first game event occurring during conduct of the game without occurrence of the second event, play a voice-over message associated with the first event using the speaker; and upon the second game event occurring during conduct of the game in conjunction with the first event, play a voice-over message associated with the second event using the speaker.

Implementation 33: A gaming device including: a display; a processor; and a memory storing instructions which when executed by the processor cause the processor to: control the display to display a first set of N first symbol positions, and a second set of N second symbol positions, each second symbol position adjacent a first symbol position; conduct a defined number of reel spins in respect of the second symbol positions using a set of N index reel strips, the set of N index reel strips including (a) a plurality of regular index reel strips, each of which includes an index symbol at at least one reel strip position of the respective reel strip, and (b) a plurality of prize increment index reel strips, each of which includes a prize increment symbol at at least one reel strip position, wherein in a first reel spin, each of the N index reel strips are spun to a stopping position, and in each subsequent reel spin, any of the N reel strips which are stopped with an index symbol or a prize increment symbol at a second symbol position are held in place while the remaining index reel strips are re-spun; determine a composition of a prize wheel based on the number of prize increment symbols displayed at the conclusion of the defined number of reel spins, wherein each increment symbol results in an increment of at least one prize of the prize wheel relative to a base prize wheel; spin and stop the determined prize wheel so that prizes of the prize wheel are displayed at respective ones of the first symbol positions; conduct a prize evaluation based on each prize displayed at a first symbol position that is adjacent a second symbol position at which a prize increment symbol or an index symbol was selected during the defined number of reel spins; and make a prize award based on the prize evaluation.

Implementation 34: The gaming device as implemented in implementation 33, wherein when the instructions are executed by the processor, they cause the processor to change each prize increment symbol to an index symbol prior to conducting the prize evaluation.

Implementation 35: The gaming device as implemented in implementation 33 or implementation 34, wherein when the instructions are executed by the processor, they cause the processor to, prior to each spin in respect of the second symbol positions, randomly associate each non-held reel strip of the set of index reel strip with one of the second symbol positions not occupied by an index symbol or prize increment symbol.

Implementation 36: The gaming device as implemented in any one of implementations 33 to 35, wherein each reel strip position of an index reel strip not occupied by an index symbol is blank.

Implementation 37: The gaming device as implemented in any one of implementations 33 to 36, wherein each reel strip position of a prize increment reel strip not occupied by an index symbol is blank.

Implementation 38: The gaming device as implemented in any one of implementations 33 to 37, wherein when the instructions are executed by the processor, they cause the processor to determine the composition of the prize wheel by selecting from among a plurality of prize wheels stored in the memory based on the number of prize increment symbols.

Implementation 39: The gaming device as implemented in implementation 38, wherein three reel strips of the set of index reel strips have prize increment symbols and there are four prize wheels including the base prize wheel.

Implementation 40: The gaming device as implemented in any one of implementations 33 to 39, wherein the prize wheel is spun horizontally and reel strips of the set of N index reel strips are spun vertically.

Implementation 41: The gaming device as implemented in any one of implementations 33 to 40, wherein when the instructions are executed by the processor, they cause the processor to evaluate the prizes by summing amounts of the prizes together.

Implementation 42: The gaming device as implemented in any one of implementations 33 to 40, wherein when the instructions are executed by the processor, they cause the processor to evaluate the prizes by determining a largest prize.

Implementation 43: The gaming device as implemented in any one of implementations 33 to 42, wherein the processor employs values obtained from a random number generator to determine stopping positions of the prize wheel and each of the index reels.

Implementation 44: A method of operating a gaming device including a display, the method including: controlling the display to display a first set of N first symbol positions, and a second set of N second symbol positions, each second symbol position adjacent a first symbol position; conducting a defined number of reel spins in respect of the second symbol positions using a set of N index reel strips, the set of N index reel strips including: (a) a plurality of regular index reel strips, each of which includes an index symbol at at least one reel strip position of the respective reel strip, and (b) a plurality of prize increment index reel strips, each of which includes a prize increment symbol at at least one reel strip position, wherein in a first reel spin, each of the N index reel strips are spun to a stopping position, and in each subsequent reel spin, any of the N reel strips which are stopped with an index symbol or a prize increment symbol at a second symbol position are held in place while the remaining index reel strips are re-spun; determining a composition of a prize wheel based on the number of prize increment symbols displayed at the conclusion of the defined number of reel spins, wherein each increment symbol results in an increment of at least one prize of the prize wheel relative to a base prize wheel; spinning and stopping the determined prize wheel so that prizes of the prize wheel are displayed at respective ones of the first symbol positions; conducting a prize evaluation based on each prize displayed at a first symbol position that is adjacent a second symbol position at which a prize increment symbol or an index symbol was selected during the defined number of reel spins; and making a prize award based on the prize evaluation.

Implementation 45: The method as implemented in implementation 44, including changing each prize increment symbol to an index symbol prior to conducting the prize evaluation.

Implementation 46: The method as implemented in implementation 44 or implementation 45, including prior to each spin in respect of the second symbol positions, randomly associating each non-held reel strip of the set of index reel strip with one of the second symbol positions not occupied by an index symbol or prize increment symbol.

Implementation 47: The method as implemented in any one of implementations 44 to 46, wherein each reel strip position of an index reel strip not occupied by an index symbol is blank.

Implementation 48: The method as implemented in any one of implementations 44 to 47, wherein each reel strip position of a prize increment reel strip not occupied by an index symbol is blank.

Implementation 49: The method as implemented in any one of implementations 44 to 48, including determining the composition of the prize wheel by selecting from among a plurality of prize wheels stored in the memory based on the number of prize increment symbols.

Implementation 50: The method as implemented in implementation 49, wherein three reel strips of the set of index reel strips have prize increment symbols and there are four prize wheels including the base prize wheel.

Implementation 51: The method as implemented in any one of implementations 44 to 51, wherein the prize wheel is spun horizontally and reel strips of the set of N index reel strips are spun vertically.

Implementation 52: The method as implemented in any one of implementations 44 to 51, including evaluating the prizes by summing amounts of the prizes together.

Implementation 53: The method as implemented in any one of implementations 44 to 51, including evaluating the prizes by determining a largest prize.

Implementation 54: The method as implemented in any one of implementations 44 to 54, wherein the processor employs values obtained from a random number generator to determine stopping positions of the prize wheel and each of the index reels.

Implementation 55: A gaming system including: a display; one or more processors; and at least one memory storing instructions which when executed by the one or more processors cause the one or more processors to: control the display to display a first set of N first symbol positions, and a second set of N second symbol positions, each second symbol position adjacent a first symbol position; conduct a defined number of reel spins in respect of the second symbol positions using a set of N index reel strips, the set of N index reel strips including (a) a plurality of regular index reel strips, each of which includes an index symbol at at least one reel strip position of the respective reel strip, and (b) a plurality of prize increment index reel strips, each of which includes a prize increment symbol at at least one reel strip position, wherein in a first reel spin, each of the N index reel strips are spun to a stopping position, and in each subsequent reel spin, any of the N reel strips which are stopped with an index symbol or a prize increment symbol at a second symbol position are held in place while the remaining index reel strips are re-spun; determine a composition of a prize wheel based on the number of prize increment symbols displayed at the conclusion of the defined number of reel spins, wherein each increment symbol results in an increment of at least one prize of the prize wheel relative to a base prize wheel; spin and stop the determined prize wheel so that prizes of the prize wheel are displayed at respective ones of the first symbol positions; conduct a prize evaluation based on each prize displayed at a first symbol position that is adjacent a second symbol position at which a prize increment symbol or an index symbol was selected during the defined number of reel spins; and make a prize award based on the prize evaluation.

Implementation 56: A gaming device including: a display; a processor; and a memory storing (a) a set of patterns of WILD symbols, each pattern defining where a plurality of WILD symbols are to be added to an array of symbol positions, (b) a set of reel strips, and (c) instructions which when executed by the processor cause the processor to: control the display to display the array of symbol positions, wherein the array includes a plurality of columns of symbol positions and respective ones of the reel strips are associated with respective ones of the columns; select symbols from the reel strips for the symbol positions of the columns with which the respective reel strips are associated and display the selected symbols at the symbol positions; upon a trigger condition being met, randomly select a pattern of the set of patterns; at least when the WILD symbols of the selected pattern will result in an additional or improved winning outcome when the selected symbols are modified to incorporate the WILD symbols as defined by the pattern, modify the symbol array to incorporate the WILD symbols of the selected pattern; and make an award for each winning combination in the modified symbol array.

Implementation 57: The gaming device as implemented in implementation 56, wherein the set of patterns include patterns having different numbers of WILD symbols.

Implementation 58: The gaming device as implemented in implementation 57, wherein the random selection process used by the processor is weighted so that patterns of the set of patterns having relatively more symbols are less likely to be selected than patterns having relatively fewer symbols.

Implementation 59: The gaming device of any one of implementations 56 to 58, wherein at least some of the patterns contain WILD symbols that are clustered.

Implementation 60: The gaming device of any one of implementations 56 to 59, wherein at least some of the patterns contain WILD symbols that correspond to a plurality of columns of symbol positions.

Implementation 61: The gaming device as implemented in any one of implementations 56 to 60, wherein when the instructions are executed by the processor, they cause the processor to evaluate the selected symbols based on a set of pay lines, and wherein at least some of the patterns are arranged to enhance multiple pay lines.

Implementation 62: The gaming device of any one of implementations 56 to 61, wherein when the instructions are executed by the processor, they cause the processor to only modify the symbol array to incorporate the WILD symbols of the selected pattern when the WILD symbols of the selected pattern will result in an additional or improved winning outcome.

Implementation 63: A method of operating a gaming device including a display and a memory storing (a) a set of patterns of WILD symbols, each pattern defining where a plurality of WILD symbols are to be added to an array of symbol positions, and (b) a set of reel strips, the method including: controlling the display to display the array of symbol positions, wherein the array includes a plurality of columns of symbol positions and respective ones of the reel strips are associated with respective ones of the columns; selecting symbols from the reel strips for the symbol positions of the columns with which the respective reel strips are associated and display the selected symbols at the symbol positions; upon a trigger condition being met, randomly selecting a pattern of the set of patterns; at least when the WILD symbols of the selected pattern will result in an additional or improved winning outcome when the selected symbols are modified to incorporate the WILD symbols as defined by the pattern, modifying the symbol array to incorporate the WILD symbols of the selected pattern; and make an award for each winning combination in the modified symbol array.

Implementation 64: The method as implemented in implementation 63, wherein the set of patterns include patterns having different numbers of WILD symbols.

Implementation 65: The method as implemented in implementation 64, including weighting the random selection process so that patterns of the set of patterns having relatively more symbols are less likely to be selected than patterns having relatively fewer symbols.

Implementation 66: The method of any one of implementations 63 to 65, wherein at least some of the patterns contain WILD symbols that are clustered.

Implementation 67: The method of any one of implementations 63 to 66, wherein at least some of the patterns contain WILD symbols that correspond to a plurality of columns of symbol positions.

Implementation 68: The method as implemented in any one of implementations 63 to 67, including evaluating the selected symbols based on a set of pay lines, and wherein at least some of the patterns are arranged to enhance multiple pay lines.

Implementation 69: The method as implemented in any one of implementations 63 to 68, including only modifying the symbol array to incorporate the WILD symbols of the selected pattern when the WILD symbols of the selected pattern will result in an additional or improved winning outcome.

Implementation 70: A gaming device including: a display; a processor; and a memory storing (a) a set of reel strips, and (b) instructions which when executed by the processor cause the processor to: control the display to display two game windows, each having an identical array of symbol positions, wherein each array includes a plurality of columns of symbol positions; independently select symbols from the set of reel strips for each array of symbol positions; upon the selected symbols of one or more columns of symbol positions in either of the two game windows meeting a criterion, change, if necessary, the subset of symbols at a corresponding column of symbol positions to match the selected symbols meeting the criterion; and upon each of the columns of each of the two game windows meeting the criterion, make a designated award.

Implementation 71: The gaming device as implemented in implementation 70, wherein the designated award is a jackpot prize.

Implementation 72: The gaming device as implemented in implementation 70 or implementation 71, wherein when the instructions are executed by the processor, they cause the processor to change selected symbols meeting the criterion to act as WILD symbols.

Implementation 73: The gaming device as implemented in any one of implementations 70 to 72, wherein the array of symbol positions in each game window is a five column array, each column having five symbols.

Implementation 74: The gaming device as implemented in any one of implementations 70 to 73, wherein the criterion is that the subset of symbols is as stack of symbols that fills each symbol position of the column.

Implementation 75: The gaming device as implemented in implementation 74, wherein the processor controls the display to represent the stack of symbols as a single symbol that occupies the column of symbol positions.

Implementation 76: The gaming device as implemented in implementation 75, wherein the processor changes the representation of the single symbol to show that it is acting as a WILD symbol.

Implementation 77: A method of operating a gaming device including a display and a memory storing a set of reel strips, the method including: controlling the display to display two game windows, each having an identical array of symbol positions, wherein each array includes a plurality of columns of symbol positions; independently selecting symbols from the set of reel strips for each array of symbol positions; upon the selected symbols of one or more columns of symbol positions in either of the two game windows meeting a criterion, changing, if necessary, the subset of symbols at a corresponding column of symbol positions to match the selected symbols meeting the criterion; and upon each of the columns of each of the two game windows meeting the criterion, making a designated award.

Implementation 78: The method as implemented in implementation 77, wherein the designated award is a jackpot prize.

Implementation 79: The method as implemented in implementation 77 or implementation 78, including changing selected symbols meeting the criterion to act as WILD symbols.

Implementation 80: The method as implemented in any one of implementations 77 to 79, wherein the array of symbol positions in each game window is a five column array, each column having five symbols.

Implementation 81: The method as implemented in any one of implementations 77 to 80, wherein the criterion is that the subset of symbols is as stack of symbols that fills each symbol position of the column.

Implementation 82: The method as implemented in implementation 81, including controlling the display to represent the stack of symbols as a single symbol that occupies the column of symbol positions.

Implementation 83: The method as implemented in any one of implementations 77 to 82, including changing the representation of the single symbol to show that it is acting as a WILD symbol.

Implementation 84: A gaming system including: at least one display; one or more processors; and at least one memory storing (a) a set of reel strips, and (b) instructions which when executed by the one or more processors cause the one or more processors to: control the at least one display to display two game windows, each having an identical array of symbol positions, wherein each array includes a plurality of columns of symbol positions; independently select symbols from the set of reel strips for each array of symbol positions; upon the selected symbols of one or more columns of symbol positions in either of the two game windows meeting a criterion, change, if necessary, the subset of symbols at a corresponding column of symbol positions to match the selected symbols meeting the criterion; and upon each of the columns of each of the two game windows meeting the criterion, make a designated award.

Implementation 85: A gaming device including: a display; a processor; and a memory storing (a) a set of reel strips, and (b) instructions which when executed by the processor cause the processor to: control the display to display two game windows, each having an identical array of symbol positions, wherein each array includes a plurality of columns of symbol positions; independently select symbols from the set of reel strips for each array of symbol positions; upon the selected symbols of one or more columns of symbol positions in either of the two game windows meeting a criterion, modify the selected symbol of the one or more columns of symbol positions meeting the criterion and, if necessary, making the same modification to the subset of symbols at a corresponding column of symbol positions; and evaluate both game windows for winning combinations.

Implementation 86: The gaming device as implemented in implementation 85, wherein when the instructions are executed by the processor, they cause the processor to modify symbols of the one or more columns of symbol positions meeting the criterion to act as WILD symbols.

Implementation 87: The gaming device as implemented in implementation 85 or implementation 86, wherein the array of symbol positions in each game window is a five column array, each column having five symbols.

Implementation 88: The gaming device as implemented in any one of implementations 85 to 87, wherein the criterion is that the subset of symbols is as stack of symbols that fills each symbol position of the column.

Implementation 89: The gaming device as implemented in implementation 88, wherein the processor controls the display to represent the stack of symbols as a single symbol that occupies the column of symbol positions.

Implementation 90: A method of operating a gaming device including a display and a memory storing a set of reel strips, the method including: controlling the display to display two game windows, each having an identical array of symbol positions, wherein each array includes a plurality of columns of symbol positions; independently selecting symbols from the set of reel strips for each array of symbol positions; upon the selected symbols of one or more columns of symbol positions in either of the two game windows meeting a criterion, modifying the selected symbol of the one or more columns of symbol positions meeting the criterion and, if necessary, making the same modification to the subset of symbols at a corresponding column of symbol positions; and evaluating both game windows for winning combinations.

Implementation 91: The method as implemented in implementation 90, wherein when the instructions are executed by the processor, they cause the processor to change selected symbols meeting the criterion to act as WILD symbols.

Implementation 92: The method as implemented in implementation 90 or implementation 91, wherein the array of symbol positions in each game window is a five column array, each column having five symbols.

Implementation 93: The method as implemented in any one of implementations 90 to 92, wherein the criterion is that the subset of symbols is as stack of symbols that fills each symbol position of the column.

Implementation 94: The method as implemented in implementation 93, including controlling the display to represent the stack of symbols as a single symbol that occupies the column of symbol positions.

Implementation 95: A gaming system including: at least one display; one or more processors; and at least one memory storing (a) a set of reel strips, and (b) instructions which when executed by the one or more processors cause the one or more processors to: control the at least one display to display two game windows, each having an identical array of symbol positions, wherein each array includes a plurality of columns of symbol positions; independently select symbols from the set of reel strips for each array of symbol positions; upon the selected symbols of one or more columns of symbol positions in either of the two game windows meeting a criterion, modify the selected symbol of the one or more columns of symbol positions meeting the criterion and, if necessary, making the same modification to the subset of symbols at a corresponding column of symbol positions; and evaluate both game windows for winning combinations.

Implementation 96: A gaming device including: a display; a processor; and a memory storing instructions which when executed by the processor cause the processor to: control the display to display a set of symbol positions; conduct a plurality of reel spins in respect of the symbol positions using a set of N reel strips, the set of N reel strips including (a) X reel strips, and (b) Y second reel strips, each including at least one game play modification symbol that modifies game play if selected, wherein in a first reel spin, each of the N reel strips are spun to a stopping position, and in each subsequent reel spin, at least each second reel strip which was, in a previous reel spin, stopped with the modification symbol selected for display is held in place; prior to each reel spin, randomly associate at least each non-held second reel strip with a subset of the set of symbol positions; and modify game play in accordance with each modification symbol selected for display, wherein the number of Y second reel strip places a limit on a number modifications to game play.

Implementation 97: A gaming device as implemented in implementation 96, wherein the second reel strips are associated with individual ones of the set of symbol positions.

Implementation 98: A gaming device as implemented in implementation 96 or implementation 97, wherein a number of the plurality reel spins is fixed.

Implementation 99: A gaming device as implemented in any one of implementations 96 to 98, wherein, in each subsequent reel spin, each first reel strip which meets a hold condition is held in place.

Implementation 100: A method of operating a gaming device including a display, and a processor, the method including: controlling the display to display a set of symbol positions; conducting a plurality of reel spins in respect of the symbol positions using a set of N reel strips, the set of N reel strips including (a) X reel strips, and (b) Y second reel strips, each including at least one game play modification symbol that modifies game play if selected, wherein in a first reel spin, each of the N reel strips are spun to a stopping position, and in each subsequent reel spin, at least each second reel strip was, in a previous reel spin, stopped with the modification symbol selected for display is held in place; prior to each reel spin, randomly associating at least each non-held second reel strip with a subset of the set of symbol positions; and modifying game play in accordance with each modification symbol selected for display, wherein the number of Y second reel strip places a limit on a number modifications to game play.

Implementation 101: A method as implemented in implementation 100, wherein the second reel strips are associated with individual ones of the set of symbol positions.

Implementation 102: A method as implemented in implementation 100 or implementation 101, wherein a number of the plurality reel spins is fixed.

Implementation 103: A method as implemented in any one of implementations 100 to 102, including in each subsequent reel spin, holding in place each first reel strip which meets a hold condition.

Implementation 104: A gaming system including: a display; one or more processor; and at least one memory storing instructions which when executed by the one or more processors cause the processor to: control the display to display a set of symbol positions; conduct a plurality of reel spins in respect of the symbol positions using a set of N reel strips, the set of N reel strips including (a) X reel strips, and (b) Y second reel strips, each including at least one game play modification symbol that modifies game play if selected, wherein in a first reel spin, each of the N reel strips are spun to a stopping position, and in each subsequent reel spin, at least each second reel strip which was, in a previous reel spin, stopped with the modification symbol selected for display is held in place; prior to each reel spin, randomly associate at least each non-held second reel strip with a subset of the set of symbol positions; and modify game play in accordance with each modification symbol selected for display, wherein the number of Y second reel strip places a limit on a number modifications to game play.

The use, if any, of ordinal indicators, e.g., (a), (b), (c) . . . or the like, in this disclosure and claims is to be understood as not conveying any particular order or sequence, except to the extent that such an order or sequence is explicitly indicated. For example, if there are three steps labeled (i), (ii), and (iii), it is to be understood that these steps may be performed in any order (or even concurrently, if not otherwise contraindicated) unless indicated otherwise. For example, if step (ii) involves the handling of an element that is created in step (i), then step (ii) may be viewed as happening at some point after step (i). Similarly, if step (i) involves the handling of an element that is created in step (ii), the reverse is to be understood.

Terms such as "about," "approximately," "substantially," "nominal," or the like, when used in reference to quantities or similar quantifiable properties, are to be understood to be inclusive of values within ±10% of the values specified, unless otherwise indicated.

It is to be understood that the phrases "for each <item> of the one or more <items>," "each <item> of the one or more <items>," or the like, if used herein, should be understood to be inclusive of both a single-item group and multiple-item groups, i.e., the phrase "for . . . each" is used in the sense that it is used in programming languages to refer to each item of whatever population of items is referenced. For example, if the population of items referenced is a single item, then "each" would refer to only that single item (despite the fact that dictionary definitions of "each" frequently define the term to refer to "every one of two or more things") and would not imply that there must be at least two of those items.

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein. While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. A gaming system comprising:

one or more displays;

one or more processors; and at least one memory storing (a) a set of reel strips, and (b) instructions which, when executed by the one or more processors, cause the one or more processors to:

control the one or more displays to display two game windows, wherein:

each game window has an identical array of symbol positions, each array includes a plurality of columns of symbol positions, and for each game window, each column of symbol positions in that game window has a corresponding column of symbol positions in the other game window;

independently select symbols from the set of reel strips for each array of symbol positions;

for each individual column of the columns of symbol positions:

determine whether the symbols selected for the symbol positions in that individual column meet a criterion, determine whether the symbols selected for the symbol positions in the corresponding column for that individual column meet the criterion, and cause, responsive to determining that the symbols selected for the symbol positions in that individual column meet the criterion and that the symbols selected for symbol positions in the corresponding column for that individual column do not meet the criterion, the symbols selected for the symbol positions of the corresponding column to be changed to match the symbols selected for the symbol positions of that individual column that meet the criterion;

determine whether all of the columns of the game windows have selected symbols for their respective symbol positions that meet the criterion; and present, responsive to determining that all of the columns of the game windows have selected symbols for their respective symbol positions that meet the criterion, an indication on the one or more displays that a designated award has been won.

2. The gaming system as claimed in claim 1, wherein the designated award is a jackpot prize.

3. The gaming system as claimed in claim 1, wherein the at least one memory stores further instructions which, when executed by the one or more processors, cause the one or more processors to cause the selected symbols meeting the criterion to act as wild symbols.

4. The gaming system as claimed in claim 1, wherein the array of symbol positions in each game window is a five-column array, each column having five symbols.

5. The gaming system as claimed in claim 1, wherein the criterion is that the symbols selected for the symbol positions are a predetermined pattern of symbols that fills each symbol position of the column.

6. The gaming system as claimed in claim 5, wherein the predetermined pattern is a predetermined pattern of identical symbols that fills each symbol position of the column.

7. The gaming system as claimed in claim 6, wherein the at least one memory stores further instructions which, when executed by the one or more processors, cause the one or more processors to control the one or more displays to represent the predetermined pattern of symbols as a single symbol that spans across all of the symbol positions for the column.

8. The gaming system as claimed in claim 6, wherein the at least one memory stores further instructions which, when executed by the one or more processors, causes the one or more processors to change the representation of the single symbol to show that it is acting as a wild symbol.

9. The gaming system as claimed in claim 1, wherein the at least one memory stores further instructions which, when executed by the one or more processors, causes the one or more processors to:

determine whether a winning pattern is formed by the selected symbols for a given arrangement of symbol positions, wherein:

the given arrangement of symbol positions includes one symbol position from each column of the array of symbol positions for one of the game windows, and any symbol position that is indicated by a symbol indicating that it is acting as a wild symbol is treated as fulfilling a portion of the winning pattern corresponding with that symbol position; and cause an indication of a won award to be presented on the one or more displays responsive to determining that the winning pattern is formed.

10. The gaming system as claimed in claim 9, wherein the at least one memory stores further instructions which, when executed by the one or more processors, causes the one or more processors to determine whether a winning pattern is formed by the selected symbols for a given arrangement of symbol positions for both display windows.

11. A method of operating a gaming system comprising one or more displays and at least one memory storing a set of reel strips, the method comprising:

controlling the one or more displays to display two game windows, wherein:

each game window has an identical array of symbol positions, each array includes a plurality of columns of symbol positions, and for each game window, each column of symbol positions in that game window has a corresponding column of symbol positions in the other game window;

independently selecting symbols from the set of reel strips for each array of symbol positions;

for each individual column of the columns of symbol positions:

determining whether the symbols selected for the symbol positions in that individual column meet a criterion;

determining whether the symbols selected for the symbol positions in the corresponding column for that individual column meet the criterion;

causing, responsive to determining that the symbols selected for the symbol positions in that individual column meet the criterion and that the symbols selected for symbol positions in the corresponding column for that individual column do not meet the criterion, the symbols selected for the symbol positions of the corresponding column to be changed to match the symbols selected for the symbol positions of that individual column that meet the criterion;

determining whether all of the columns of the game windows have selected symbols for their respective symbol positions that meet the criterion; and presenting, responsive to determining that all the columns of the game windows have selected symbols for their respective symbol positions that meet the criterion, an indication on the one or more displays that a designated award has been won.

12. The method as claimed in claim 11, wherein the designated award is a jackpot prize.

13. The method as claimed in claim 11, further comprising causing the selected symbols meeting the criterion to act as wild symbols.

14. The method as claimed in claim 11, wherein the array of symbol positions in each game window is a five-column array, each column having five symbols.

15. The method as claimed in claim 11, wherein the criterion is that the symbols selected for the symbol positions are a predetermined pattern of symbols that fills each symbol position of the column.

16. The method as claimed in claim 15, wherein the predetermined pattern is a predetermined pattern of identical symbols that fills each symbol position of the column.

17. The method as claimed in claim 15, further comprising controlling the one or more displays to represent the predetermined pattern of symbols as a single symbol that spans across all of the symbol positions for the column.

18. The method as claimed in claim 13, further comprising changing the representation of the single symbol to show that it is acting as a wild symbol.

19. The method as claimed in claim 18, further comprising:

determining whether a winning pattern is formed by the selected symbols for a given arrangement of symbol positions, wherein:

the given arrangement of symbol positions includes one symbol position from each column of the array of symbol positions for one of the game windows, and any symbol position that is indicated by a symbol indicating that it is acting as a wild symbol is treated as fulfilling a portion of the winning pattern corresponding with that symbol position; and causing an indication of a won award to be presented on the one or more displays responsive to determining that the winning pattern is formed.

20. The method as claimed in claim 9, further comprising determining whether a winning pattern is formed by the selected symbols for a given arrangement of symbol positions for both display windows.

21. A gaming system comprising:

one or more displays;

one or more processors; and at least one memory storing (a) a set of reel strips, and (b) instructions which, when executed by the one or more processors, cause the one or more processors to:

control the one or more displays to display two game windows, wherein:

each game window has an identical array of symbol positions, each array includes a plurality of columns of symbol positions, and for each game window, each column of symbol positions in that game window has a corresponding column of symbol positions in the other game window;

independently select symbols from the set of reel strips for each array of symbol positions;

for each individual column of the columns of symbol positions:

determine whether the symbols selected for the symbol positions in that individual column meet a criterion, wherein the criterion is met when the symbols selected for the symbol positions are a predetermined pattern of identical symbols that fills each symbol position of the column, determine whether the symbols selected for the symbol positions in the corresponding column for that individual column meet the criterion, and cause, responsive to determining that the symbols selected for the symbol positions in that individual column meet the criterion and that the symbols selected for symbol positions in the corresponding column for that individual column do not meet the criterion, the symbols selected for the symbol positions of the corresponding column to be changed to match the symbols selected for the symbol positions of that individual column that meet the criterion and to represent the predetermined pattern of symbols as a single symbol that spans across all of the symbol positions for the column;

determine whether all of the columns of the game windows have selected symbols for their respective symbol positions that meet the criterion; and present, responsive to determining that all of the columns of the game windows have selected symbols for their respective symbol positions that meet the criterion, an indication on the one or more displays that a designated award has been won.

* * * * *